US011920397B1

(12) United States Patent
MacKarvich et al.

(10) Patent No.: US 11,920,397 B1
(45) Date of Patent: Mar. 5, 2024

(54) HATCH LIFT ASSIST DEVICE

(71) Applicant: Tie Down, Inc., Atlanta, GA (US)

(72) Inventors: Charles J. MacKarvich, Atlanta, GA (US); Mohammed Aamir, Atlanta, GA (US); Troy Daniel Hayden, Atlanta, GA (US)

(73) Assignee: Tie Down, Inc., Atlanta, GA (US)

( * ) Notice: Subject to any disclaimer, the term of this patent is extended or adjusted under 35 U.S.C. 154(b) by 0 days.

(21) Appl. No.: 18/104,075

(22) Filed: Jan. 31, 2023

Related U.S. Application Data

(60) Provisional application No. 63/420,342, filed on Oct. 28, 2022.

(51) Int. Cl.

| | |
|---|---|
| ***E05F 11/00*** | (2006.01) |
| ***E05F 11/20*** | (2006.01) |
| ***E06C 7/00*** | (2006.01) |
| *E06C 9/02* | (2006.01) |

(52) U.S. Cl.
CPC ................ *E05F 11/20* (2013.01); *E06C 7/00* (2013.01); *E05Y 2201/656* (2013.01); *E05Y 2201/668* (2013.01); *E05Y 2201/686* (2013.01); *E05Y 2201/716* (2013.01); *E05Y 2201/722* (2013.01);
(Continued)

(58) Field of Classification Search
CPC . E05F 11/00; E05F 11/04; E05F 11/08; E05F 11/12; E05F 11/20; E05F 11/28; E06C 7/00; E06C 7/10; E06C 7/12; E06C 7/16; E06C 9/02; E05Y 2201/656; E05Y 2201/668; E05Y 2201/686; E05Y 2201/716; E05Y 2201/72; E05Y 2201/722; E05Y 2800/122; E05Y 2900/13; E05Y 2900/131
See application file for complete search history.

(56) References Cited

U.S. PATENT DOCUMENTS

| | | | | |
|---|---|---|---|---|
| 767,388 A * | 8/1904 | Cirigliano | ................ | E06C 7/16 182/103 |
| 1,488,624 A | 4/1924 | Sperl | | |
| 1,767,148 A | 6/1930 | Marschke | | |

(Continued)

FOREIGN PATENT DOCUMENTS

| | | |
|---|---|---|
| DE | 1509491 | 6/1969 |
| EP | 2281966 | 2/2011 |

(Continued)

OTHER PUBLICATIONS

Belmont Saftey Products; Article entitled: "If you have roof access hatches, our goal is to reduce risk for your workers and liability for you, while increasing the security of your facility.", located at <https://www.belmontsafetyproducts.com>, accessed on Jan. 25, 2023, 3 pgs.

(Continued)

*Primary Examiner* — Chi Q Nguyen
(74) *Attorney, Agent, or Firm* — Taylor English Duma LLP

(57) ABSTRACT

A hatch actuating device can include a housing; a sliding portion received within the housing; a gear assembly at least partially received within the housing and movably coupled to the sliding portion; and a flexible drive element coupled to the gear assembly; wherein the gear assembly is configured to open a hatch lid of a hatch through rotation of a portion of the gear assembly by pulling of the drive element.

36 Claims, 38 Drawing Sheets

(52) U.S. Cl.
CPC ..... *E05Y 2800/122* (2013.01); *E05Y 2900/13* (2013.01); *E06C 9/02* (2013.01)

(56) References Cited

U.S. PATENT DOCUMENTS

| | | | | | |
|---|---|---|---|---|---|
| 2,034,445 | A | | 3/1936 | Robinson | |
| 4,729,453 | A | | 3/1988 | Lyons, Sr. | |
| 6,135,419 | A | * | 10/2000 | Hutson, Jr. | B66F 3/24 254/133 R |
| 6,442,896 | B1 | * | 9/2002 | Chapin, III | E04D 13/0354 49/192 |
| 6,516,478 | B2 | * | 2/2003 | Cook | A47C 19/045 5/616 |
| 7,708,037 | B2 | * | 5/2010 | Smith | A01G 23/099 144/34.2 |
| 7,819,389 | B2 | * | 10/2010 | Takeuchi | B66F 7/0666 254/362 |
| 7,980,978 | B2 | * | 7/2011 | Takashima | B66F 7/0666 474/230 |
| 10,676,966 | B2 | * | 6/2020 | Whiting | E06C 7/182 |
| 11,293,226 | B2 | * | 4/2022 | Rogers, III | E06C 9/10 |
| 2008/0315168 | A1 | * | 12/2008 | Takeuchi | B66F 3/06 254/358 |
| 2009/0118048 | A1 | * | 5/2009 | Takashima | B66F 3/06 474/215 |
| 2010/0059727 | A1 | * | 3/2010 | Suko | B66D 3/20 254/362 |
| 2014/0000168 | A1 | | 1/2014 | Uehara et al. | |
| 2019/0226280 | A1 | | 7/2019 | Rogers, III | |
| 2022/0254019 | A1 | * | 8/2022 | Connor | G06T 7/0012 |

FOREIGN PATENT DOCUMENTS

| | | |
|---|---|---|
| EP | 3051049 | 8/2016 |
| FR | 368262 | 11/1906 |
| FR | 2639057 | 5/1990 |
| FR | 3033347 | 9/2016 |
| FR | 3073887 | 5/2019 |
| GB | 320678 | 10/1929 |
| GB | 963032 | 7/1964 |
| KR | 20130034371 | 4/2013 |

OTHER PUBLICATIONS

Belmont Saftey Products; Brochure entitled: "Roof Access Safety and Security System", published Jun. 2021, 1 pg.

Belmont Saftey Products; Installation Measurements for Roof Hatch Safety System, published Jan. 6, 2020, 1 pg.

Re-Source Industries; Article entitled: "Reduced Drive Shaft Measured Hoists", located at <https://re-sourceind.com/catalog_data.php?data=Z&page=116>, accessed on Jan. 30, 2023, 3 pgs.

Mackarvich, Charles J.; Extended European Search Report for application No. 23168896.1, filed Apr. 20, 2023, dated Sep. 29, 2023, 12 pgs.

Mackarvich, Charles J.; Extended European Search Report for application No. 23168896.1, filed Apr. 20, 2023, dated Oct. 25, 2023, 12 pgs.

* cited by examiner

HATCH LIFT ASSIST DEVICE

REFERENCE TO RELATED APPLICATIONS

This application claims the benefit of U.S. Provisional Application No. 63/420,342, filed Oct. 28, 2022, which is hereby specifically incorporated by reference herein in its entirety.

TECHNICAL FIELD

Field of Use

This disclosure relates to roof hatch access systems. More specifically, this disclosure relates to hatch actuating devices and, more specifically, hatch lift assist devices for hatch access systems.

Related Art

A building, including but not limited to the commercial and industrial variety, is typically provided with a system for accessing a roof thereof. Such access can be provided by a stairwell, which can be built beyond the highest story of the building so that the top of the stairwell opens onto the roof, or by a ladder (e.g., a vertical ladder such as a ship's ladder) leading to a roof hatch which, when opened, allows the user to climb out through the hatch onto the roof. Roof access ladders are usually steel or aluminum fabrications which meet, to some degree or another, Occupational Safety and Health Administration (OSHA) regulations governing dimensions and attachment, etc. A typical roof hatch is hinged on one side and can be built with a latching mechanism, which allows the hatch to be locked from the inside (e.g., by use of a padlock). In addition, the hatch can be outfitted with gas shocks (like those on a rear lift gate of a motor vehicle) to assist in the opening and closing of the hatch. Because of the weight of the hatch and the height involved and the steps often required to pass through the hatch (e.g., opening the lock and physically traversing the hatch structure including, for example, a hatch curb positioned between the ladder and the roof), opening and closing a hatch and passage through the hatch opening can be difficult for a user.

SUMMARY

It is to be understood that this summary is not an extensive overview of the disclosure. This summary is exemplary and not restrictive and is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a hatch actuating device comprising: a support portion defining a device axis, the support portion configured to rotate about the device axis during operation of the device; a sliding portion slideably coupled to the support portion; a gear assembly fixably coupled to the support portion and movably coupled to the sliding portion; and a linkage portion rotatably coupled to the sliding portion, the linkage portion configured to be connected to a hatch lid of a hatch assembled to an elevated structure; wherein the gear assembly is configured to open the hatch lid through rotation of a portion of the gear assembly.

In a further aspect, disclosed is a hatch actuating device comprising: a housing; a sliding portion received within the housing; a gear assembly at least partially received within the housing and movably coupled to the sliding portion; and a flexible drive element coupled to the gear assembly; wherein the gear assembly is configured to open a hatch lid of a hatch through rotation of a portion of the gear assembly by pulling of the drive element.

In yet another aspect, disclosed is a hatch actuating device comprising: a sliding portion; a hand post; and a gear assembly movably coupled to each of the sliding portion and the hand post, the gear assembly comprising: a first gear coupled to an actuator of the device and configured to rotate with the actuator about a device axis; a second gear movably coupled to the first gear, the second gear being a rack gear secured to or defining a portion of the sliding portion; a third gear; and a fourth gear movably coupled to the third gear, the fourth gear being a rack gear secured to or defining a portion of the hand post; wherein the gear assembly is configured to open a hatch lid of a hatch through rotation of a portion of the gear assembly.

In yet another aspect, disclosed is a hatch access system comprising: a ladder; and a hatch actuating device secured to one of the ladder and a stationary structure positioned proximate to the ladder, the device comprising: a housing; a sliding portion; a gear assembly movably coupled to the sliding portion; and a flexible drive element coupled to the gear assembly; wherein the gear assembly is configured to open a hatch lid of a hatch through rotation of a portion of the gear assembly by pulling of the drive element.

In yet another aspect, disclosed is a method of using a hatch actuating device, the method comprising: rotating an actuator of the device with a flexible drive element; converting rotational motion of the actuator into translational motion of a sliding portion of the device; converting the translational motion of the sliding portion into rotational motion of a linkage portion of the device; and converting rotational motion of the linkage portion into rotational motion of a hatch lid of a hatch access system to thereby open the hatch lid.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and, together with the description, explain various principles of the disclosure. The drawings are not necessarily drawn to scale. Corresponding features and components throughout the figures may be designated by matching reference characters for the sake of consistency and clarity.

DETAILED DESCRIPTION

Figure 1:
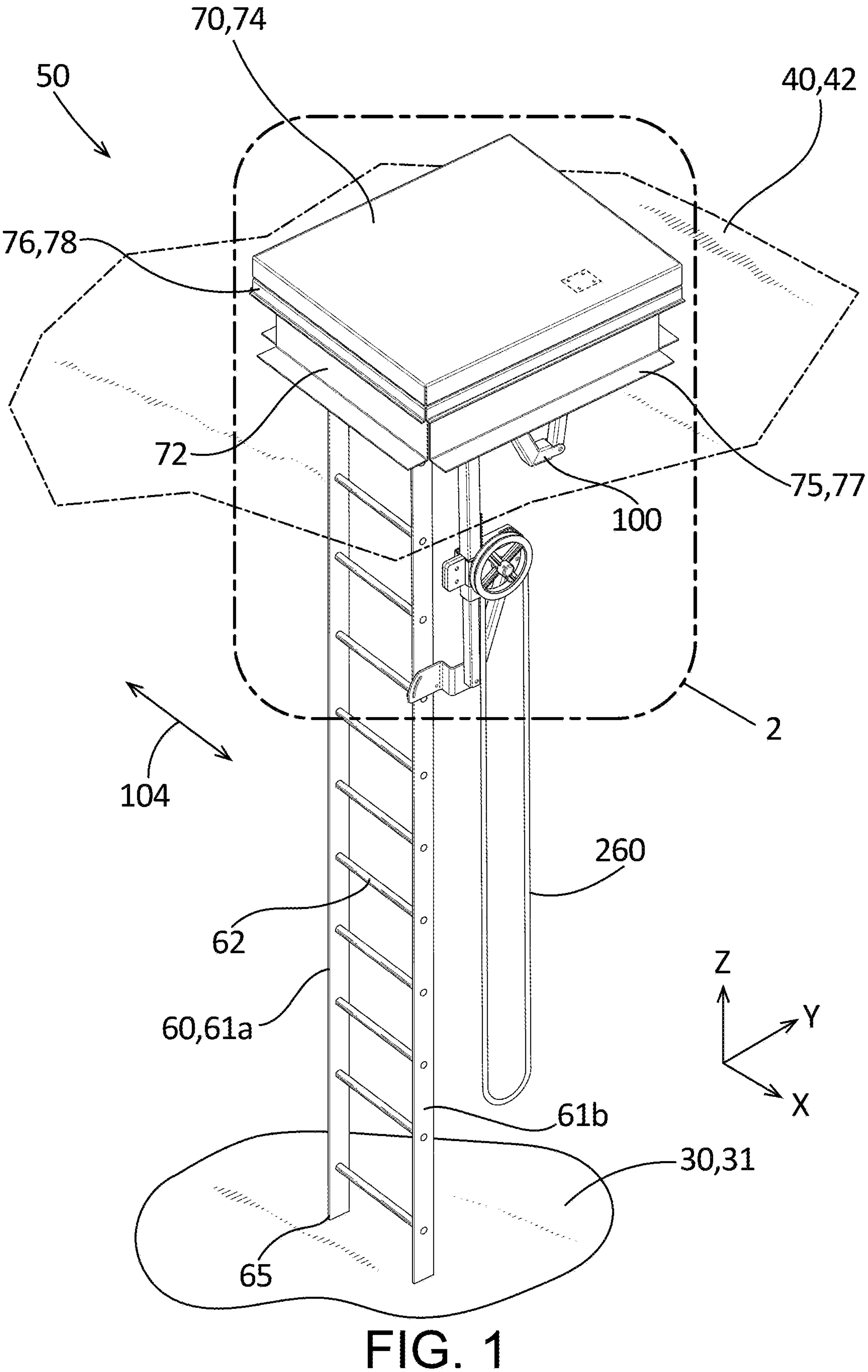
FIG. 1 is a top side perspective view of a hatch access system in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes, and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

As used herein, unless the context clearly dictates otherwise, the term "monolithic" in the description of a component means that the component is formed as a singular component that constitutes a single material without joints or seams. Unless otherwise specified herein, any structure disclosed in the drawings or in the written description as being so formed can be monolithic whether or not such an explicit description of the structure is included herein.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the hatch access system nearest to and occupied by a user of the system while using and facing the ladder; "rear" is that end of the system that is opposite or distal the front; "left" is that which is to the left of or facing left from a person facing towards the front; and "right" is that which is to the right of or facing right from that same person while facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

The hatch access system can also be described using a coordinate axis of X-Y-Z directions shown in FIG. 1. An X-axis direction can be referred to as a left-right or horizontal direction. An upper-lower direction is a Z-axis direction orthogonal to the X-axis direction and to a Y-axis direction. The Y-axis direction is orthogonal to the X-axis direction (left-right direction) and the Z-axis direction (upper-lower direction) and can also be referred to as a front-rear direction. A surface of a structural element that is parallel with the front-rear direction can be referred to as a lateral side.

In one aspect, a hatch access system and associated methods, systems, devices, and various apparatuses are disclosed herein. In one aspect, the hatch access system can comprise a hatch actuating device.

Figure 3:
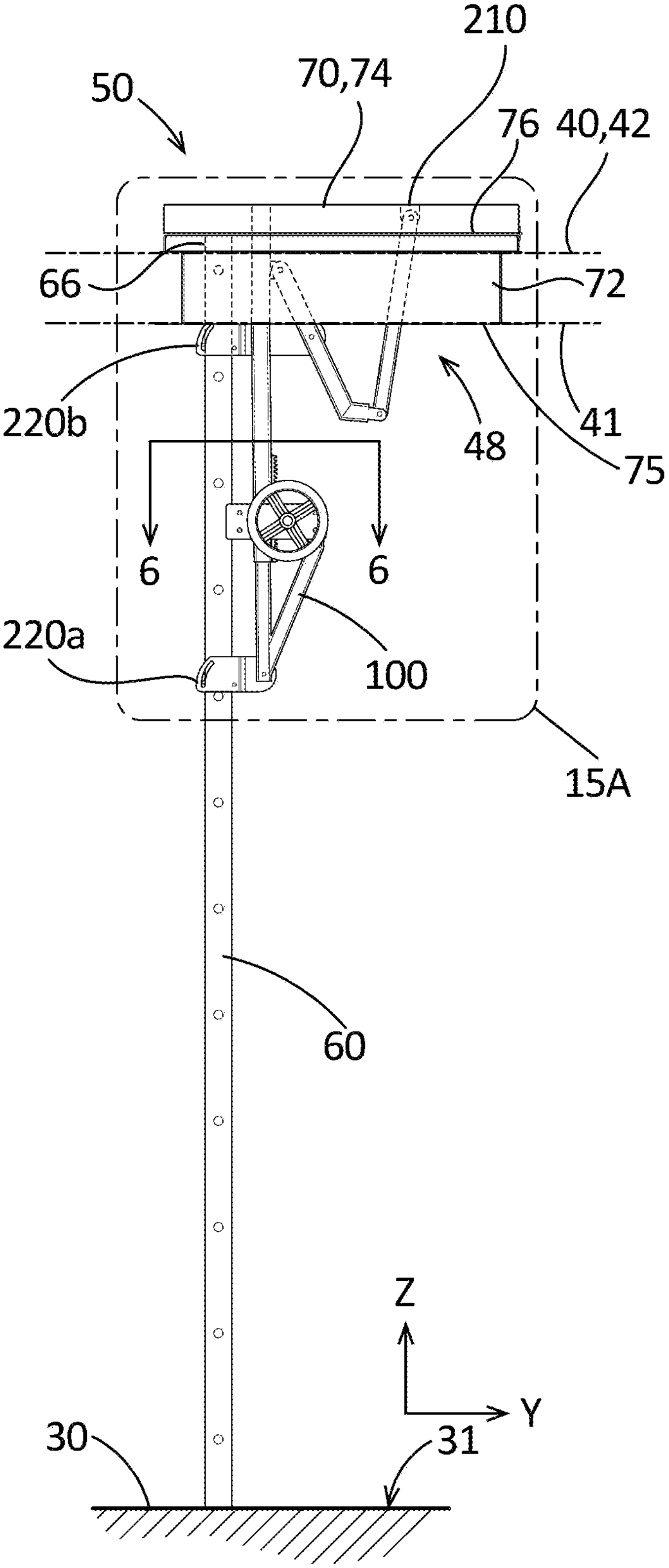
FIG. 3 is a side view of the hatch access system of FIG. 1.

FIG. 1 is a top side perspective view of a hatch access system 50 in accordance with one aspect of the current disclosure. As shown, the system 50 can comprise an ascent device or ladder 60, a hatch 70, and a hatch actuating device or device 100. The ladder 60 can be configured to provide access to an elevated structure 40 such as, for example and without limitation, a roof of a building. The ladder 60, which can be a fixed ladder, can define a first end 65 and a second end 66 (shown in FIG. 3). The ladder 60 can comprise or define a pair of rails 61*a,b* and a plurality of ladder rungs 62. The pair of rails 61*a,b* can extend from the first end 65 of the ladder to the second end 66 of the ladder 60 distal from the first end 65, and each of the plurality of ladder rungs 62 can extend from a first rail 61*a* of the pair of rails 61*a,b* to a second rail 61*b* of the pair of rails 61*a,b*. Separate or integral feet can stabilize the rails 61*a,b* and, more generally, the ladder 60. A base of the ladder 60, which can be defined by the first end 65 thereof, can contact a floor surface 31 of a floor 30 of the building or, as shown in FIG. 3, can be offset from the floor surface 31. In some aspects, as shown, the ladder 60 can be permanently secured to the elevated structure 40 or to a surrounding portion of the building and need not lean at angle. In some aspects, the ladder can be stationary with respect to surrounding structure. The ladder 60 can define a length measured from the first end 65 to the second end 66, which length can measure 10 feet or more in some aspects. The ladder 60 can define a lateral direction 104, which can be parallel to a direction in which the ladder rungs 62 extend.

The hatch 70 can comprise a hatch curb 72 and a hatch lid 74. The hatch curb 72 can comprise or define a frame, which can be configured to frame an inside of an opening 48 (shown in FIG. 3) defined in the elevated structure 40. The hatch curb 72, which can comprise a first end or lower end 75 and a second end or upper end 76, can extend from a lower surface 41 (e.g., a ceiling or frame or other portion, shown in FIG. 3) of the elevated structure 40 to an upper surface 42 (e.g., a roof surface). As shown, the lower end 75 can define one or more mounting flanges 77, and the upper end 76 can define one or more mounting flanges 78. The hatch lid 74 can be solid and can close off the opening 48. More specifically, the hatch lid 74 can be weather-tight and, more specifically, can form a weather-tight seal with the hatch curb 72 when closed and thereby can prevent wind, rain, and snow from leaking inside. The hatch lid 74 can prevent unauthorized access both to and from the upper surface 42 of the elevated structure 40. When unlocked and opened, the hatch lid 74 can allow authorized personnel to climb onto the elevated structure 40 (e.g., for inspection or maintenance). The hatch lid 74 can be secured to the hatch curb 72. More specifically, the hatch lid 74 can be hingedly secured to the hatch curb 72 (e.g., with a single piano-style or continuous hinge or with a plurality of hinges). As shown, the hatch 70 and the components thereof can define a rectangular shape in cross-section, including in any one or more of the X-Y, X-Z, or Y-Z planes. In some aspects, a top of the ladder 60, which can be defined by the second end 66, can terminate in or at the lower end 75 of the hatch curb 72 of the hatch 70. In some aspects, as shown in FIG. 3, the top of the ladder 60 can terminate at a position above the lower end 75 of the hatch curb 72 of the hatch 70 and, more specifically, can extend to or past the upper end 76 of the hatch curb 72.

Passage through the hatch 70 can sometimes be challenging. The hatch lid 74 can be locked on the inside (e.g., with a padlock to prevent unauthorized in or out, for example) and simply opening the hatch 70 while at the top of the ladder can sometimes require extra dexterity or care. Moreover, exiting onto the roof through the hatch 70 and entering back through the hatch 70 can be difficult without a user having something to hold onto throughout the entire passage. Any improvements to a user's opening of the hatch 70 and passage therethrough can be beneficial.

Figure 2:
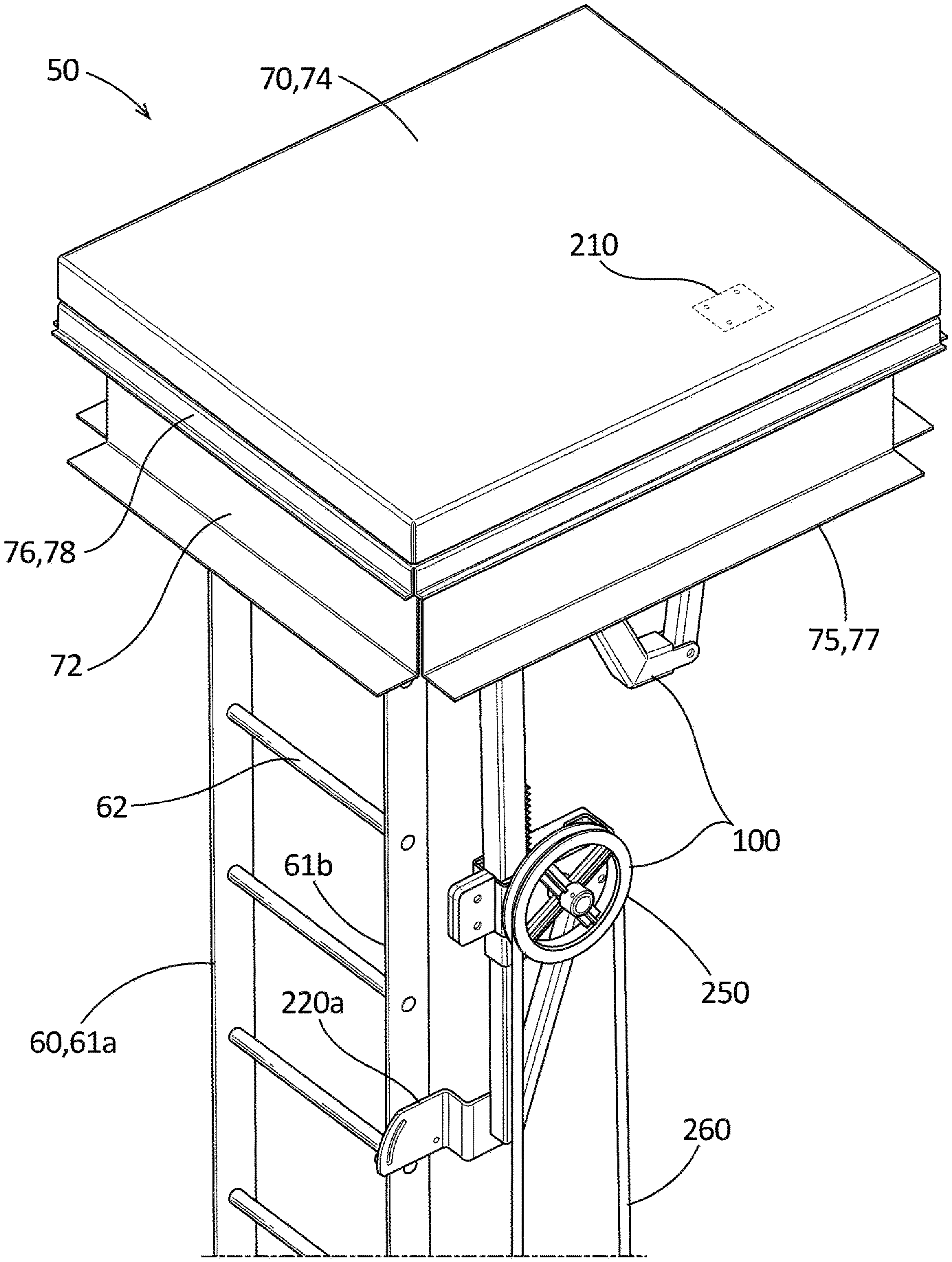
FIG. 2 is a detail top side perspective view of the hatch access system of FIG. 1 taken from detail 2 of FIG. 1.

FIG. 2 is a detail top side perspective view of the hatch access system 50 of FIG. 1 taken from detail 2 of FIG. 1. In some aspects, the device 100 can be coupled to the hatch 70 and, more specifically, the hatch lid 74 at one or more mounting locations 210, which can be an inside surface or other inside portion of the hatch lid 74. In some aspects, the device 100 can be coupled to the ladder 60 and, more specifically, one or more of the rails 61*a,b* of the ladder 60 at one or more mounting locations 220*a,b* (220*b* shown in FIG. 3). In some aspects, the device 100 can be coupled to another portion of the building (e.g., a floor, a ceiling, a column, or other stationary structure thereof).

The device 100 can comprise an actuator 250, which can be a driven element and, in some aspects can be driven by a drive element 260. In some aspects, the actuator 250 can comprise or can be a wheel or, more specifically, a pulley. In some aspects, the actuator 250 can comprise or can be a gear-broadly defined as a wheel with a plurality of teeth. In some aspects, more specifically, the actuator 250 can comprise or can be a sprocket, which can be configured to receive and engage the drive element 260. The drive element 260 can be flexible. The drive element 260 can extend around and engage with a circumferential portion of the actuator 250. In some aspects, the drive element 260 can be a chain. In some aspects, the drive element 260 can be a rope or belt or other flexible element.

In some aspects, a motor—not shown, but broadly defined as any machine able to produce rotary motion—can drive the drive element 260 and thereby also the actuator 250. In some aspects, the motor can be an electric motor, which can be powered by electricity and/or battery power. In some aspects, the motor can be otherwise and can be powered by any other power source, e.g., solar power, pneumatic power, hydraulic power, steam power, and fossil fuel. In some aspects, the actuator 250 can be or can comprise a hand crank for manual operation and articulation of the device 100. In some aspects, similar to a user's operation of a looped cord of a curtain or vertical blinds in a hotel room, a user can simply pull on one side or another side of the drive element 260 and thereby cause rotation of the actuator 250 in one direction or the other by a pulling motion. The user can, as desired, use their own weight to facilitate pulling on the drive element 260. The user need not push any component of the device 100 during operation. More specifically, as shown, the drive element 260 can be flexible and can be configured to only be pulled during operation of the device 100. Rotation of the actuator 250 can cause movement of one or more parts of the device 100. As will be described further below, movement and, more specifically, rotation of the actuator 250 can cause articulation or other movement of other portions of the device 100, which can raise the hatch lid 74.

FIG. 3 is a side view of the hatch access system 50 of FIG. 1. In some aspects, as shown, the upper surface 42 of the elevated structure 40 can be closer to the upper end 76 of the hatch curb 72 than to the bottom end 75. In some aspects, the upper surface 42 of the elevated structure 40 can be closer to the lower end 75 of the hatch curb 72 than to the top end 76.

Figure 4:
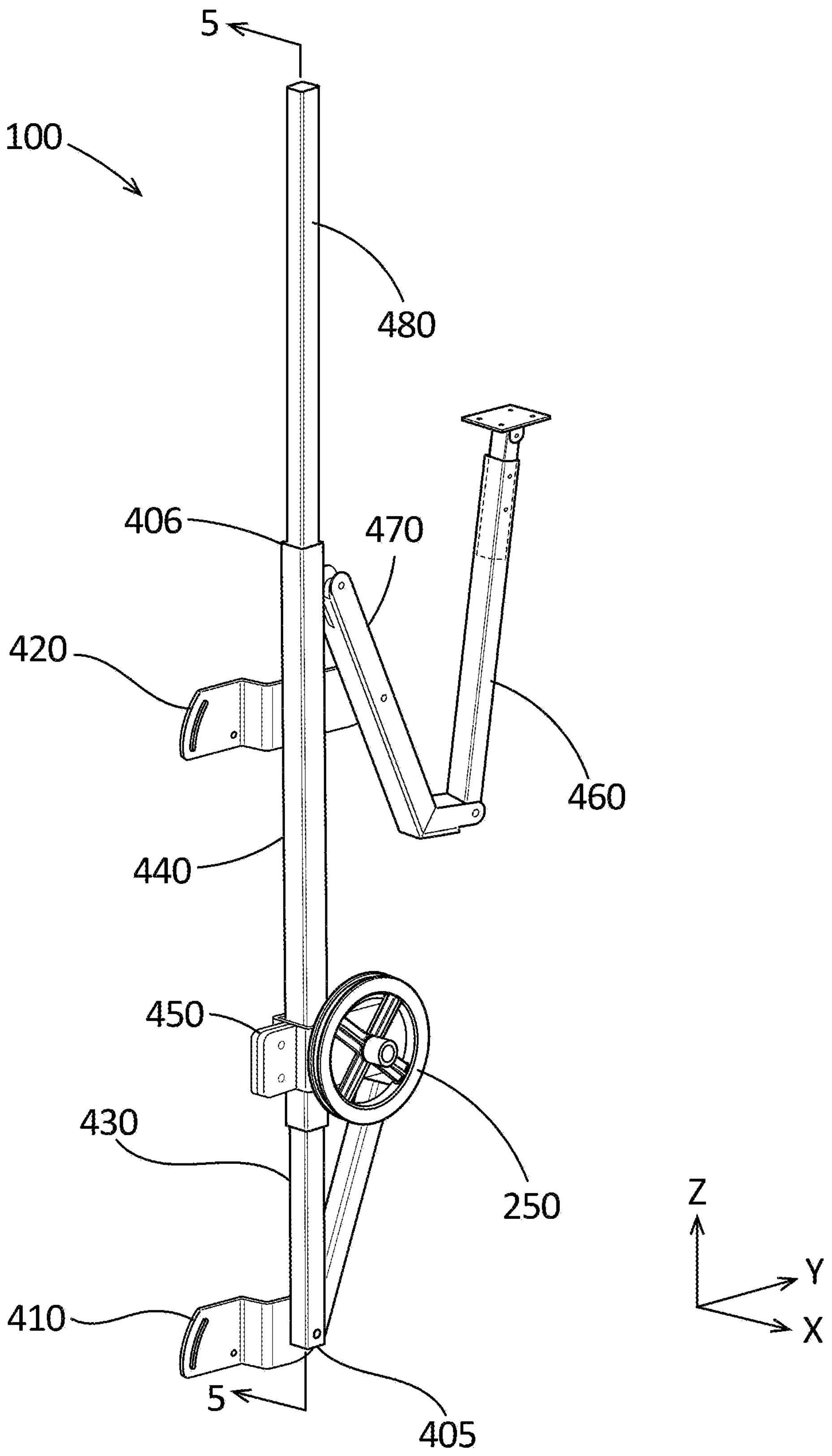
FIG. 4 is a side perspective view of a hatch actuating device of the hatch access system of FIG. 1.

FIG. 4 is a top perspective view of the hatch actuating device 100 of the hatch access system 50 of FIG. 1. The device 100 can comprise a support portion 430. The device 100 can comprise a sliding portion 440, which can be slideably coupled to the support portion 430. The device 100 can comprise a gear mechanism or gear assembly 450, which can extend from the support portion 430 to the sliding portion 440 and can cause the sliding portion 440 to slide with respect to the support portion 430. The device 100 can comprise a stay portion 460, which can be coupled to and can extend from the hatch lid 74 (shown in FIG. 3). The device 100 can comprise a linkage portion 470, which can couple the stay portion 460 to the sliding portion 440. The device 100 can comprise a safety pole, guide portion, guide post, or hand post 480, which can be slideably coupled to the sliding portion 440. Any of the portions 430,440,460,470, 480 can be a bar or rod or tube.

In some aspects, one or more of the aforementioned portions of the device 100 need not be directly coupled to the ladder 60 (or, as the case may be here and in any other aspects throughout, to other surrounding structure) and can be coupled to the ladder 60 through another structure. More specifically, the device 100 can comprise a first mounting bracket or first bracket 410, which can be configured to couple a first end or first portion 405 of the device 100 to the ladder 60. Likewise, the device 100 can comprise a second mounting bracket or second bracket 420, which can be configured to couple a second end or second portion 406 of the device 100 to the ladder 60. In some aspects, one or more of the aforementioned portions of the device 100 such as, for example and without limitation, the support portion 430 or the linkage portion 470 or both the support portion 430 and the linkage portion 470 can be directly coupled to the ladder 60.

Figure 5A:
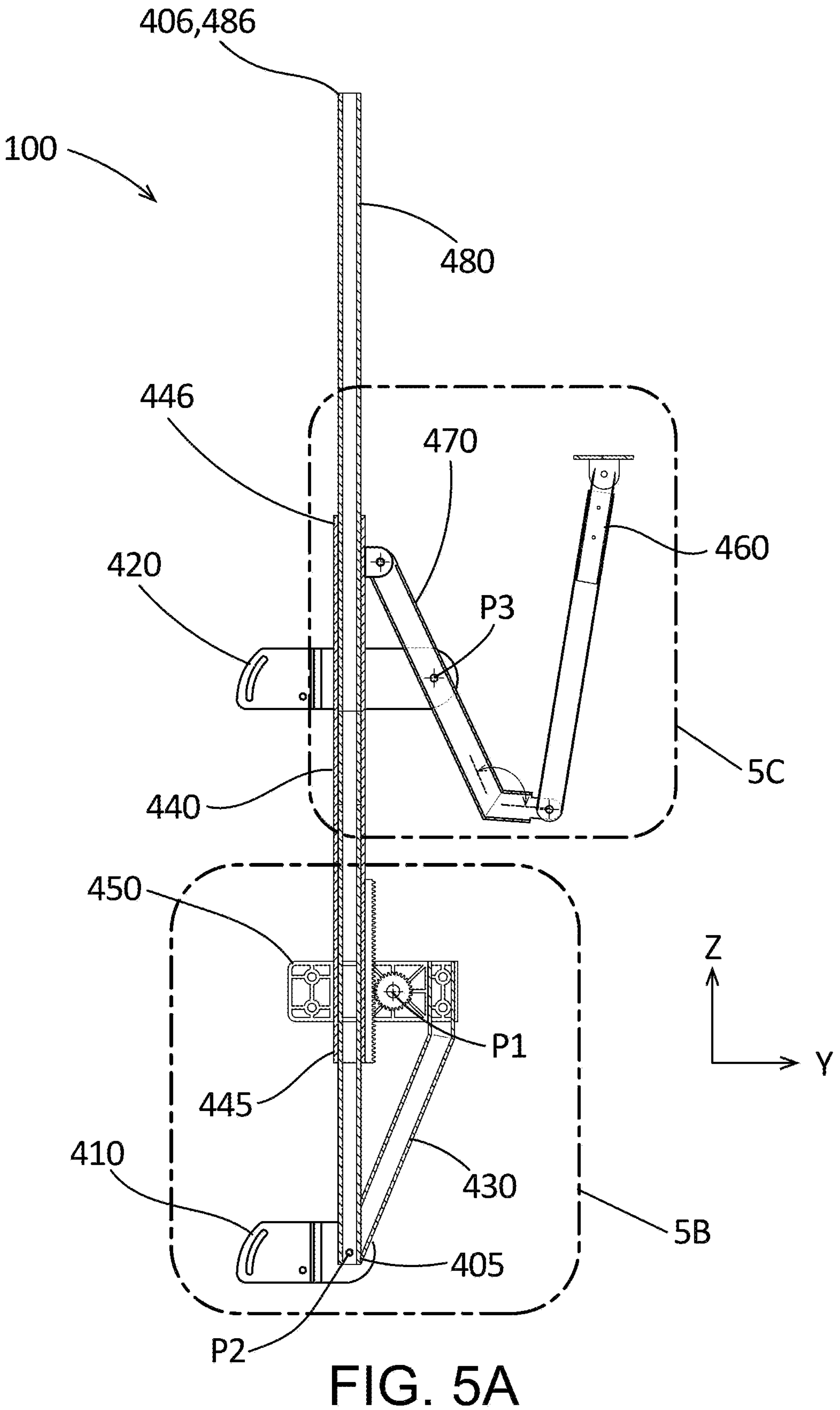
FIG. 5A is a sectional view of the hatch actuating device of FIG. 4 taken along line 5-5 of FIG. 4.
Figure 5B:
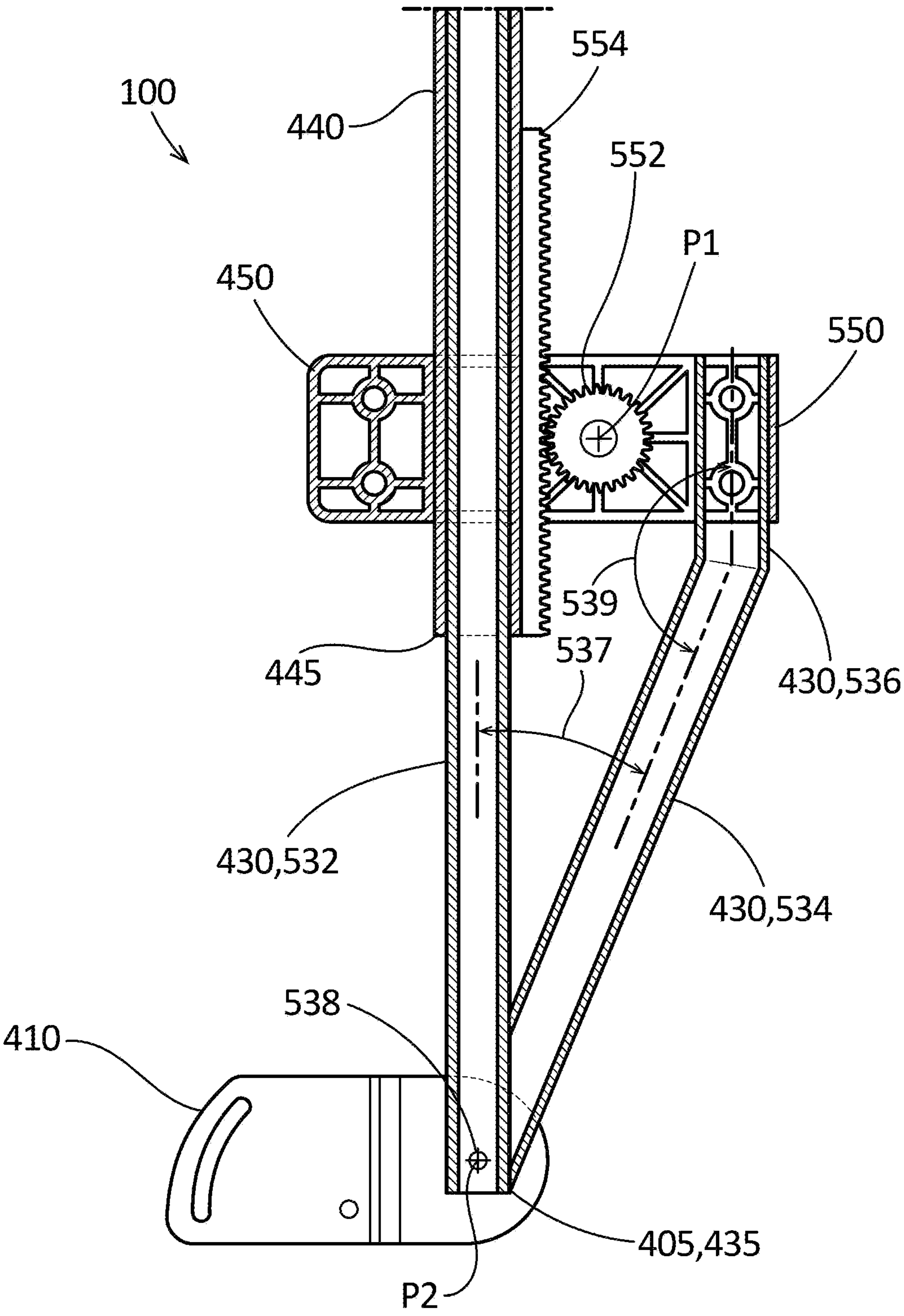
FIG. 5B is a detail sectional view of a first or lower portion of the hatch actuating device of FIG. 4 taken from detail 5B of FIG. 5A.
Figure 5C:
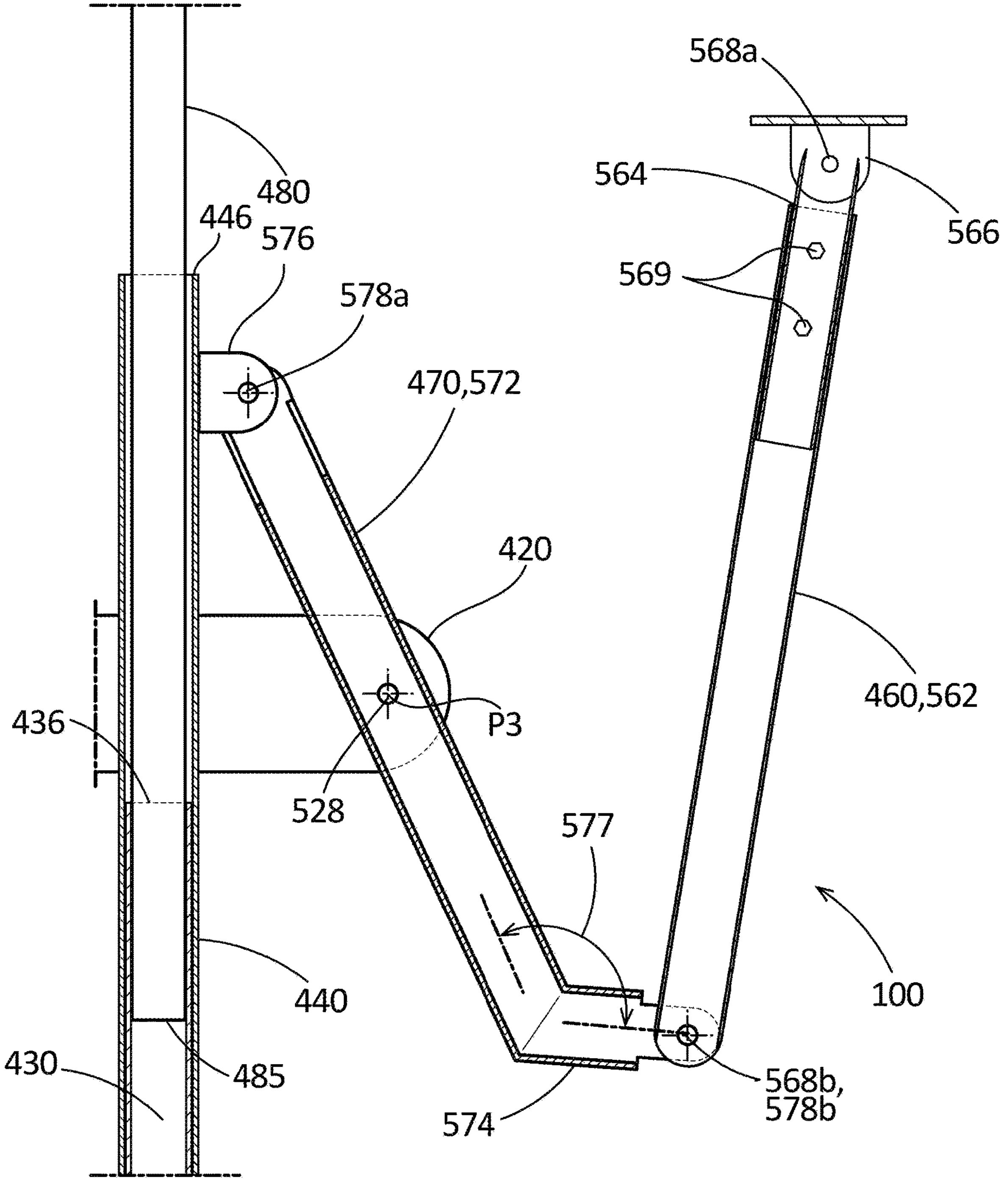
FIG. 5C is a detail sectional view of a second or upper portion of the hatch actuating device of FIG. 4 taken from detail 5C of FIG. 5A.

FIG. 5A is a sectional view of the hatch actuating device 100 of FIG. 4 taken along line 5-5 of FIG. 4, and FIGS. 5B and 5C are detail sectional view of a first or lower portion and a second or upper portion of the hatch actuating device 100 of FIG. 4 taken from details 5B and 5C, respectively, of FIG. 4. One or more of the support portion 430, the sliding portion 440, the stay portion 460, the linkage portion 470, and the hand post 480 can be formed from a member defining a rectangular cross-section when viewed along a direction parallel to the respective member. More specifically, one or more of the support portion 430, the sliding portion 440, the stay portion 460, the linkage portion 470, and the hand post 480 can be formed from one or more square tubes. One or more of the support portion 430, the sliding portion 440, the stay portion 460, the linkage portion 470, and the hand post 480 can comprise multiple rectilinear members welded or otherwise joined or coupled together and thereby fixed with respect to each other. Each of the members can comprise a rigid material. The hatch actuating device 100 can define one or more of an actuator pivot axis, actuator pivot point P1, a device pivot axis or device pivot point P2, and a linkage portion axis or linkage pivot point P3, any of which (i.e., P1, P2, or P3) can be pivot axis or pivot point or center rotation of the corresponding components or assemblies.

As shown in FIG. 5B, the support portion 430 can comprise a plurality of rectilinear members such as, for example and without limitation, members 532,534,536. The support portion 430 can define a first end 435 and a second end 436 (shown in FIG. 5C). More specifically, a first member 532 and a second member 534 can be joined to each other and angled with respect to each other by an angle 537, which can be an acute angle, i.e., less than 90 degrees. A second member 534 and a third member 536 can be joined to each other and angled with respect to each other by an angle 539, which can be an obtuse angle, i.e., greater than 90 degrees and less than 180 degrees. The angles 537 and 539 can add up to 180 degrees, i.e., the angles 537 and 539 can be supplementary angles. Accordingly, the first member 532 and the third member 536 or longitudinal axes thereof can be parallel to each other. The support portion 430 can define an opening or bore 538 through which a fastener (not shown) can couple the support portion 430 to the first bracket 410 or, in some aspects, directly to the ladder 60 (shown in FIG. 1) or other surrounding structure. The bore 538 can additionally define the device pivot axis or device pivot point P2 about which the device 100 can be allowed to rotate and configured to rotate during operation thereof. Similarly, the support portion 430 can define one or more openings or bores through which corresponding fastener (not shown) can couple the support portion 430 to a housing 550 of the gear assembly 450.

As shown, the sliding portion 440 can comprise a single rectilinear member defining a first end 445 and a second end 446 (shown in FIG. 5C). The first end 445 of the sliding portion 440 can slideably receive the first member 532 of the support portion 430 therein.

As shown, the gear assembly 450 can receive each of the support portion 430 and the sliding portion 440 therein. A portion of the support portion 430 such as, for example and without limitation, the third member 536 can be fixably received within the gear assembly 450 and, more specifically, the housing 550 thereof. A portion of the sliding portion 440 can be slidably received within the gear assembly 450 and, more specifically, the housing 550. The gear assembly 450 can comprise a first gear 552, which can be a spur gear or pinion gear. The gear assembly 450 can comprise a second gear 554, which can be a rack gear defining teeth along a linear direction, which can align with a longitudinal direction of the sliding portion 440. More specifically, the rack gear can inherently comprise a portion of a circular gear defining gear an infinite radius. The first gear 552 can be configured to engage and can engage the second gear 554, and upon rotation of the first gear 552 about the actuator pivot axis P1 the first gear 552 can cause translation (i.e., movement in a linear direction) of the sliding portion 440. The gear assembly 450 can thus comprise a rack-and-pinion mechanism configured to regulate translational movement of the sliding portion 440 with respect to the support portion 430. More specifically, the sliding portion 440 can rise and fall and the hatch lid 74 close and open with, respectively, clockwise and counterclockwise rotation of the first gear 552.

Figure 15A:
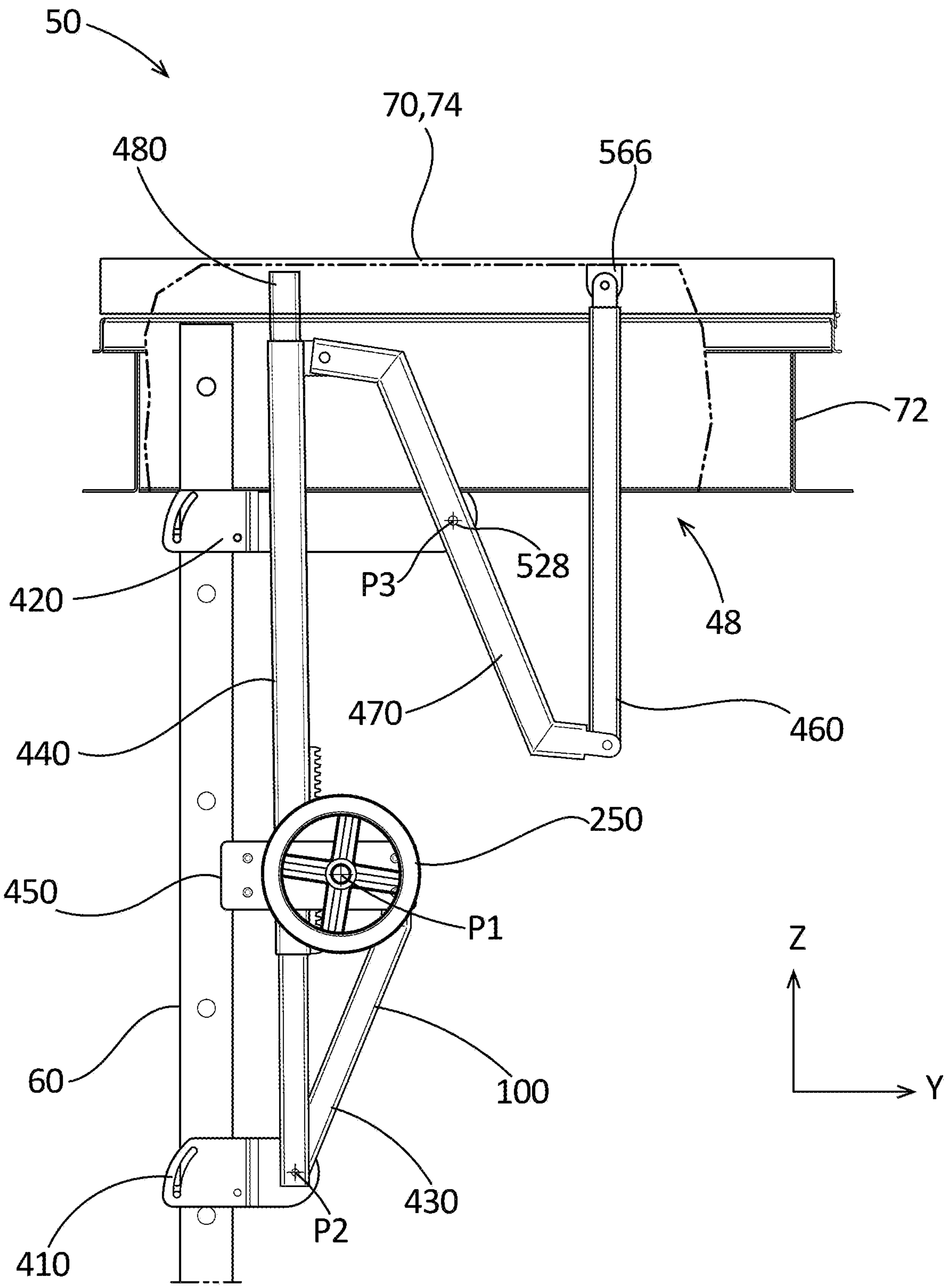
FIG. 15A is a side view of the hatch access system of FIG. 1 taken from detail 15A of FIG. 3 showing the hatch actuating device thereof in a first position and the hatch lid in a closed position in accordance with another aspect of the current disclosure.

As shown in FIG. 5C, the stay portion 460 can be configured to be hingedly coupled—and, as shown in FIG. 15A, can be coupled—to the hatch lid 74 (shown in FIG. 3) through a mounting bracket 566. As also shown, the stay portion 460 can comprise a plurality of rectilinear members such as, for example and without limitation, members 562, 564. More specifically, a first member 562 and a second member 564 can be joined to each other. In some aspects, as shown, the first member 562 can be received about the second member 564. In some aspects, the members 562,564 can be joined to each other and relative positions of the members 562,564 can be adjusted with respect to each other by selectably installing one or more fasteners 569 in one or more openings or bores (not shown) and through the members 562,564. In some aspects, the first member 562 can be received within the second member 564. The stay portion 460 can define openings or bores 568*a,b* through which a fastener (not shown) can couple the stay portion 460 to the mounting bracket 566 or, in some aspects, directly to the hatch lid 74. The mounting bracket 566 can comprise a mounting surface or panel and one or more attachment flanges extending from the mounting panel and configured to be coupled to the stay portion 460.

As shown, the linkage portion 470 can comprise a plurality of rectilinear members such as, for example and without limitation, members 572,574. More specifically, a first member 572 and a second member 574 can be joined to each other and can be angled with respect to each other by an angle 577, which can be an obtuse angle, i.e., greater than 90 degrees and less than 180 degrees. The linkage portion 470 can be free to rotate about a stationary portion of the device 100 such as, for example and without limitation, a pivot bore 528 defined in the second bracket 420 and defining a linkage portion pivot axis or pivot point P2. The linkage portion 470 can define openings or bore 578*a,b*. A fastener (not shown) can couple the linkage portion 470 to the sliding portion 440 through a mounting bracket 576 or, in some aspects, directly to the sliding portion 440, e.g., through the bore 578*a*. A fastener (not shown) can couple the linkage portion 470 to the stay portion 460 through the bore 578*b*.

As shown, the hand post 480 can comprise a single rectilinear member defining a first end 485 and a second end 486 (shown in FIG. 5A). The hand post 480 can be slideably received within the sliding portion 440. More specifically, the second end 446 of the sliding portion 440 can slideably receive the first end 485 of the hand post 480 therein.

Figure 6:
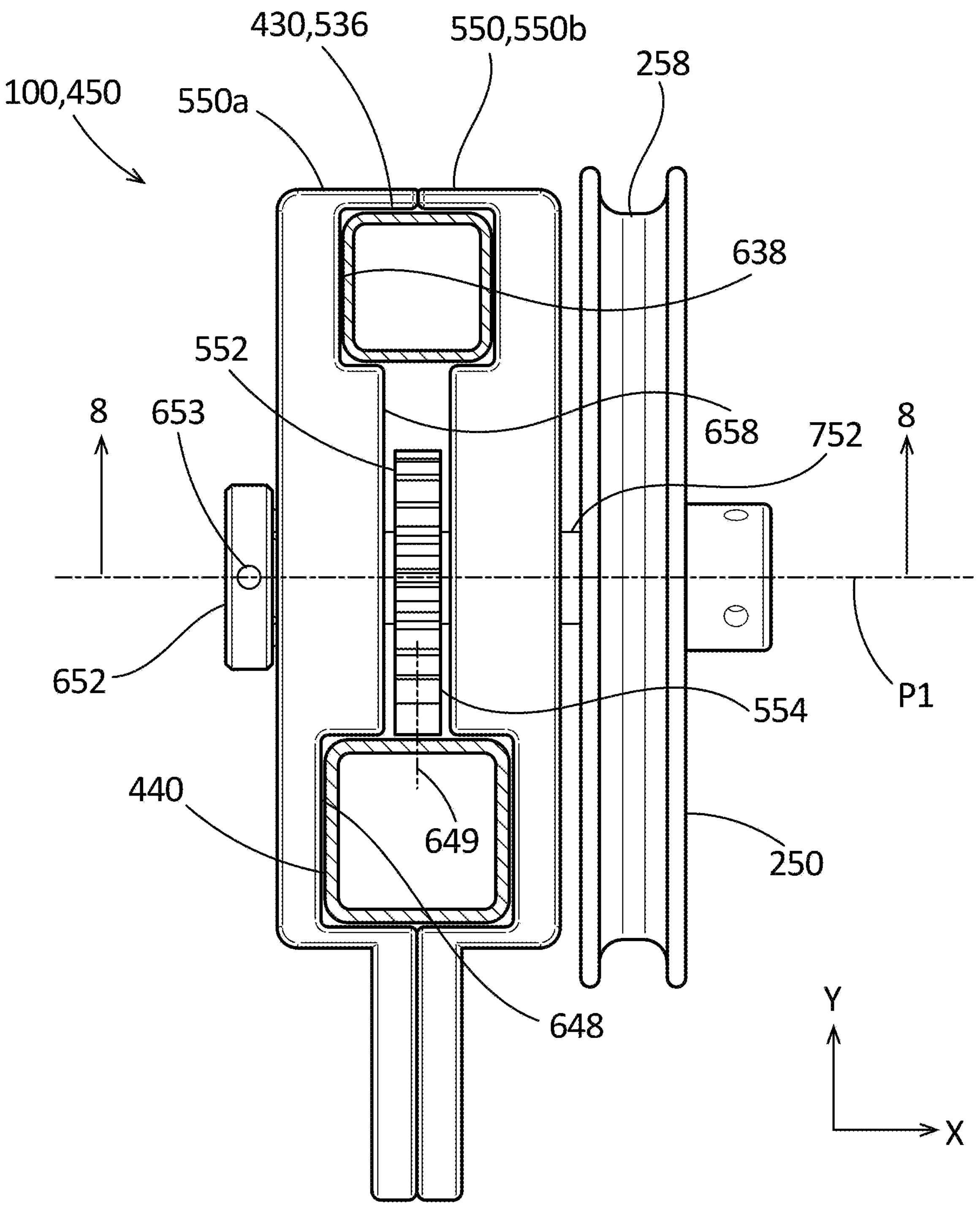
FIG. 6 is a top sectional view of a gear assembly of the hatch actuating device of FIG. 4 taken along line 6-6 of FIG. 3.

FIG. 6 is a top sectional view of the gear assembly 450 of the hatch actuating device 100 of FIG. 4 taken along line 6-6 of FIG. 3. The housing 550 can comprise a first portion 550*a* and a second portion 550*b*, each of which can be a housing half and can define a clam-shell construction. The housing 550 can define a cavity 638, which can receive the support portion 430 and, more specifically, a portion thereof such as the third member 536. The housing 550 can define a cavity 648, which can receive the sliding portion 440. The housing 550 can define a cavity 658, which can be defined between the cavities 638,648 and can receive the first gear 552 and the second gear 554. As shown, two or more of the cavities 638,648,658 can be aligned with the support portion 430 and the sliding portion 440 and, more specifically, centerlines thereof along the Y-axis direction. The second gear 554 can be fixably secured to the sliding portion 440 with fasteners 649. The gear assembly 450 can comprise a stop collar or fitting 652, which can be secured to a shaft 752 of the gear assembly with a fastener 653. The actuator 250 can define a groove or recess 258, which can be configured to receive and can receive the drive element 260 (shown in FIG. 2). The gear assembly 450 can define the actuator axis P1.

Figure 7:
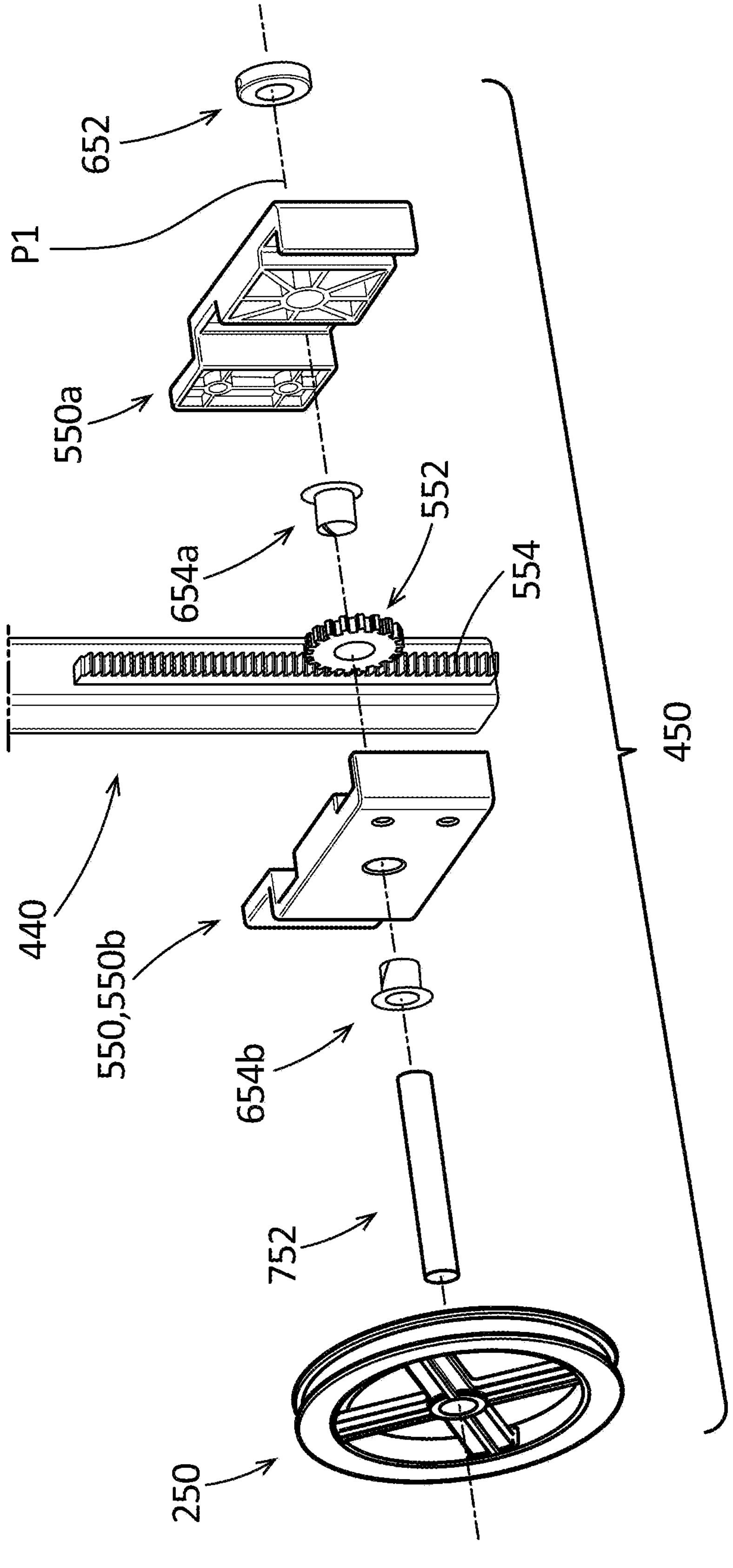
FIG. 7 is an exploded top perspective view of the gear assembly of FIG. 6 and a surrounding portion of the hatch actuating device of FIG. 4.

FIG. 7 is an exploded top perspective view of the gear assembly 450 of FIG. 6 and a surrounding portion of the hatch actuating device 100 of FIG. 4. The gear assembly 450 can comprise a first bushing 654*a* and a second bushing 654*b*, each of which can comprise a cylindrical or substantially cylindrical portion and a flange extending in a radial direction from the cylindrical or substantially cylindrical portion ("substantially cylindrical" meaning cylindrical except for circumferential breaks or edge treatments to aid performance, assembly, and/or serviceability or other features that do not adversely impact the ability of the bushings 654*a,b* to function as bushings.

Each of the first gear 552, the stop collar 652, the bushings 654*a,b*, the actuator 250, and the shaft 752 can be aligned along the actuator axis P1. Moreover, each of the portions 550*a,b* of the housing 550, the first gear 552, the stop collar 652, the bushings 654*a,b*, and the actuator 250 can define a bore through which the shaft 752 can be received. Sufficient clearance can be provided between the assembled parts, including where the shaft 752 is configured to turn freely with respect to another component such as, for example and without limitation, the bushings 654*a,b*. Where the shaft 752 is configured to be fixed with respect to another component such as, for example and without limitation, the actuator 250 or the first gear 552 an interference fit, a press fit, a key or other anti-rotation configuration can be provided between the assembled parts.

Figure 8:
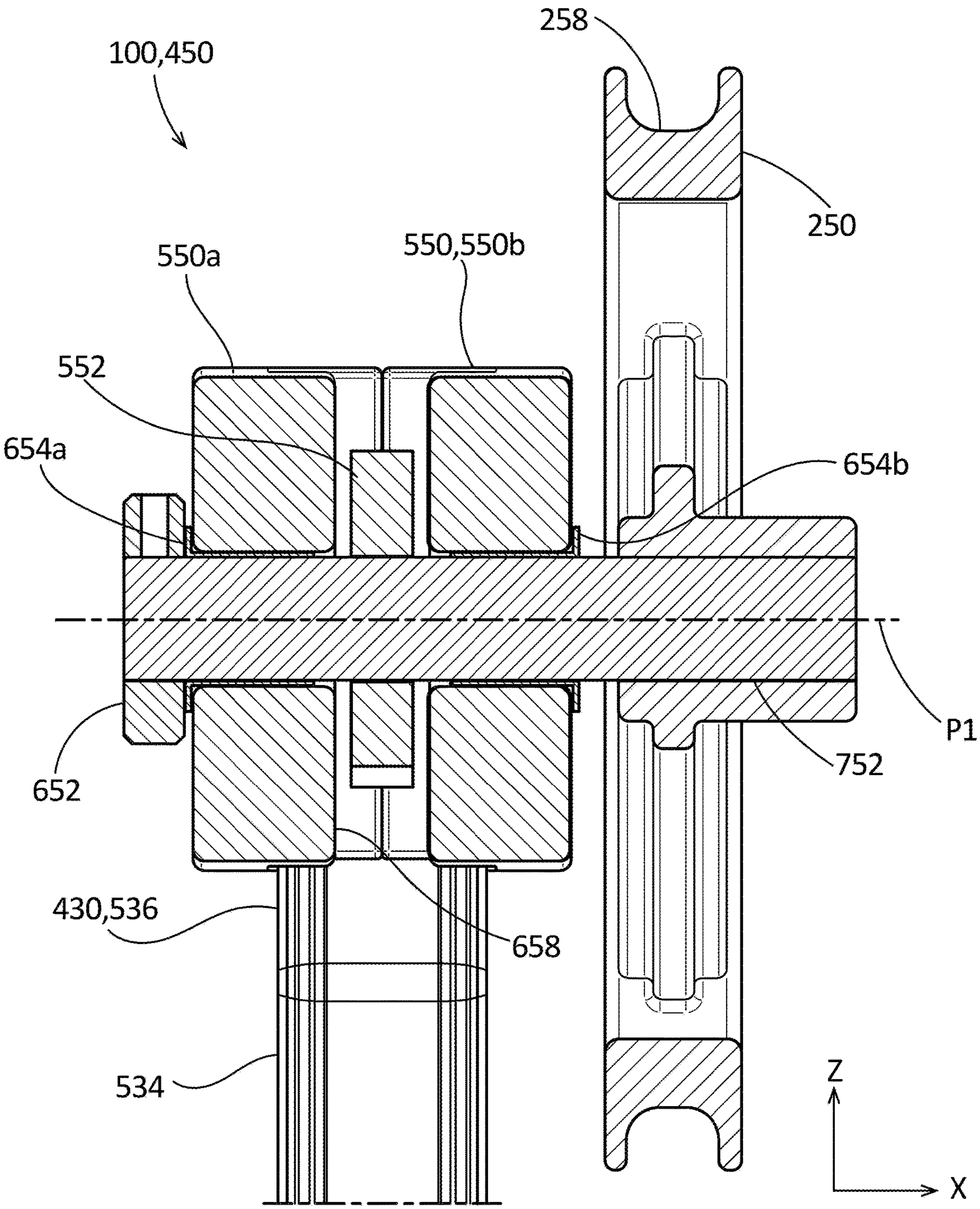
FIG. 8 is a sectional view of a gear assembly of the hatch actuating device of FIG. 4 in an assembled condition and taken along line 8-8 of FIG. 6.

FIG. 8 is a sectional view of the gear assembly 450 of the hatch actuating device 100 of FIG. 4 in an assembled condition and taken along line 8-8 of FIG. 6.

Figure 9:
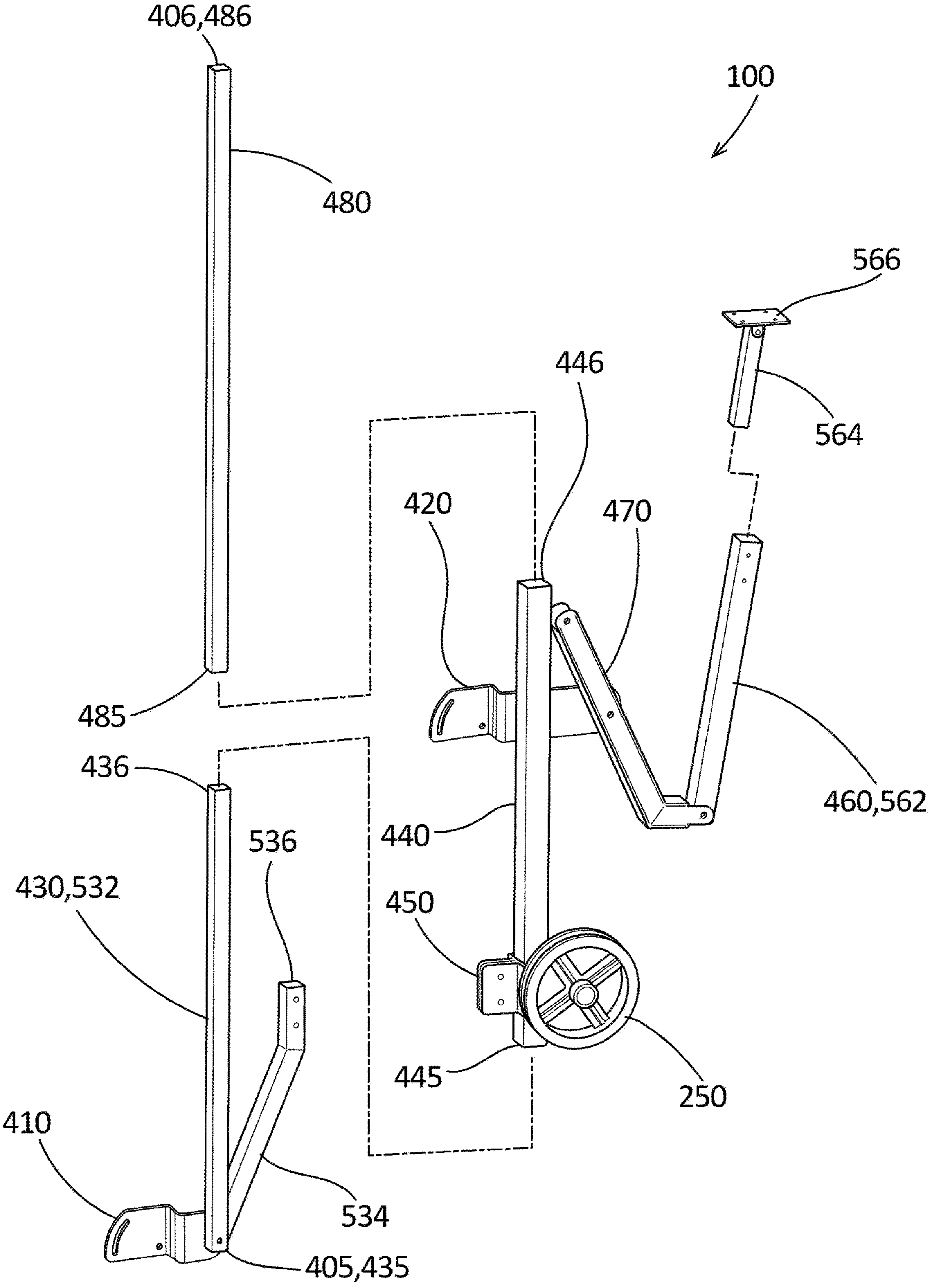
FIG. 9 is a partially exploded top side perspective view of the hatch actuating device of FIG. 4.

FIG. 9 is a partially exploded top side perspective view of the hatch actuating device 100 of FIG. 4. Again, as shown, each of the support portion 430 and the hand post 480 can be received within the sliding portion 440. In some aspects, the hand post 480 can also be received within the support portion 430.

Figure 10:
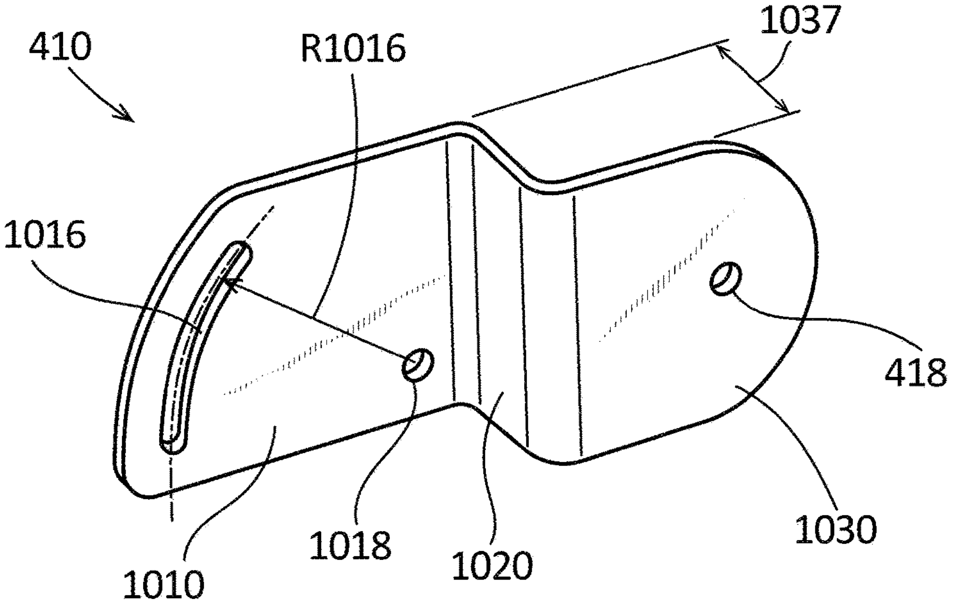
FIG. 10 is an outside perspective view of a first bracket of the hatch actuating device of FIG. 4.
Figure 11:
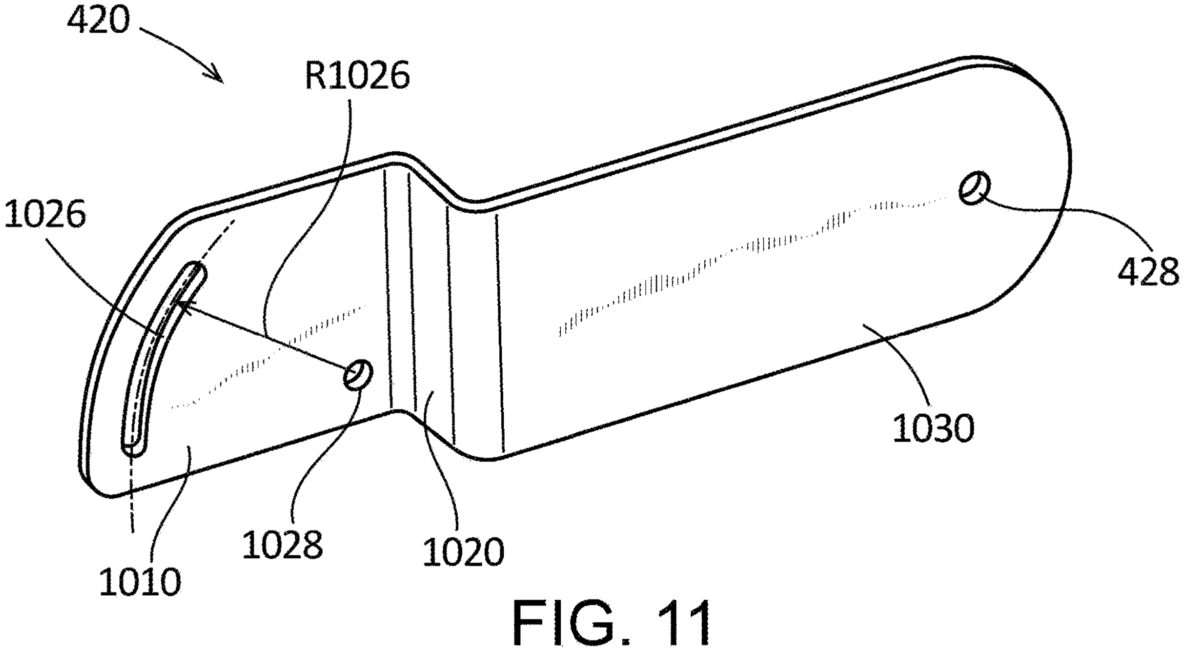
FIG. 11 is an outside perspective view of a second bracket of the hatch actuating device of FIG. 4.

FIG. 10 is an outside perspective view of the first bracket 410 of the hatch actuating device 100 of FIG. 4, and FIG. 11 is an outside perspective view of the second bracket 420 of the hatch actuating device 100 of FIG. 4. One or more of the brackets 410,420 can comprise a mounting panel or first panel 1010, a second panel 1020 angled with respect to the first panel 1010, and a third panel 1030 angled with respect to the second panel 1020. The first panel 1010 and the third panel 1030 can be parallel. The third panel 1030 can be offset from the first panel 1010 by an offset distance 1037. The brackets 410,420 can define respective bores 418,428. The brackets 410,420 can define respective bores 1018, 1028. The brackets 410,420 can define respective slots 1016,1026. A center of a radius R1016,R1026 of each of the slots 1016,1026 can be aligned with a center of the respective bores 1018,1028. The radii R1016,R1026 can be equal to each other.

Figure 12:
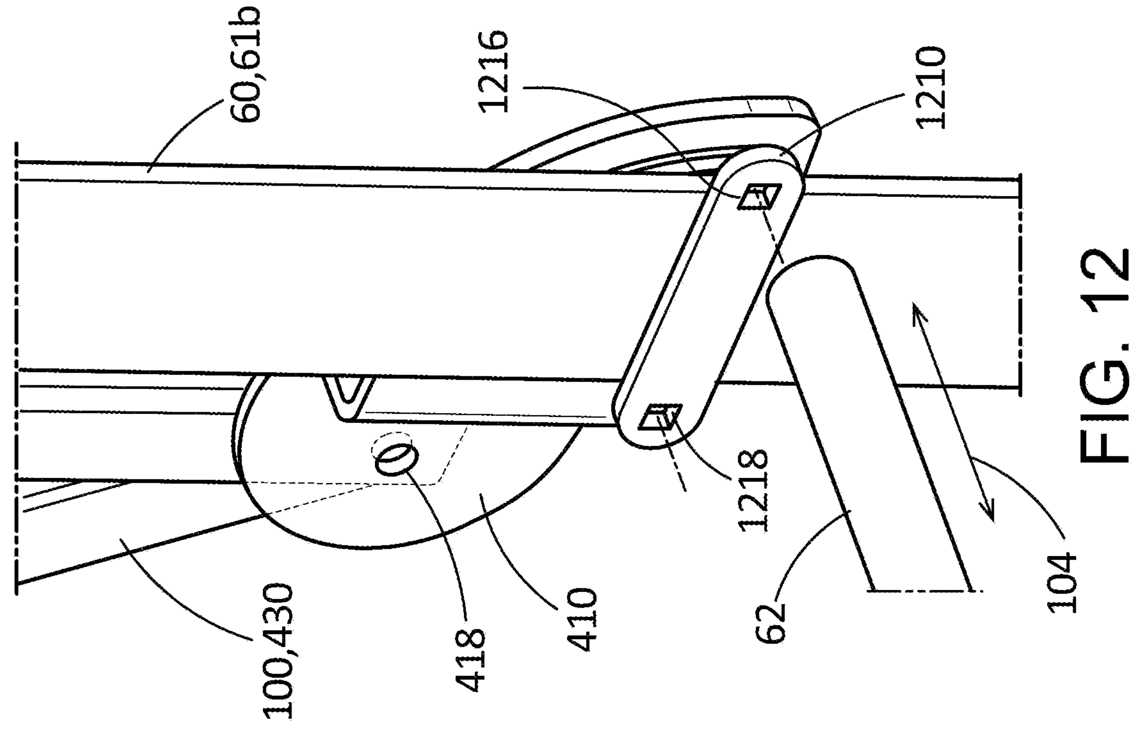
FIG. 12 is an inside perspective view of a portion of the hatch actuating device of FIG. 4 attached to a ladder of the hatch access system of FIG. 1 via a bracket.

FIG. 12 is an inside perspective view of a portion of the hatch actuating device 100 of FIG. 4 attached to the ladder 60 of the hatch access system 50 of FIG. 1 via the first bracket 410, which can be representative of the method of attachment of the second bracket 420 (shown in FIG. 4). A plate or strap 1210 can define openings or bores 1216,1218, which can be spaced apart by the radii R1016,R1026. Fasteners 1739 (shown in FIG. 17A) can secure the bracket 410 to the strap 1210 with the rail 61*b* of the ladder 60 positioned therebetween. For example and without limitation, the fasteners 1739 can be carriage bolts, in which case a square-shaped shoulder under the head can engage with the bores 1218, which can also be square in shape or any other shape as desired.

Figure 13:
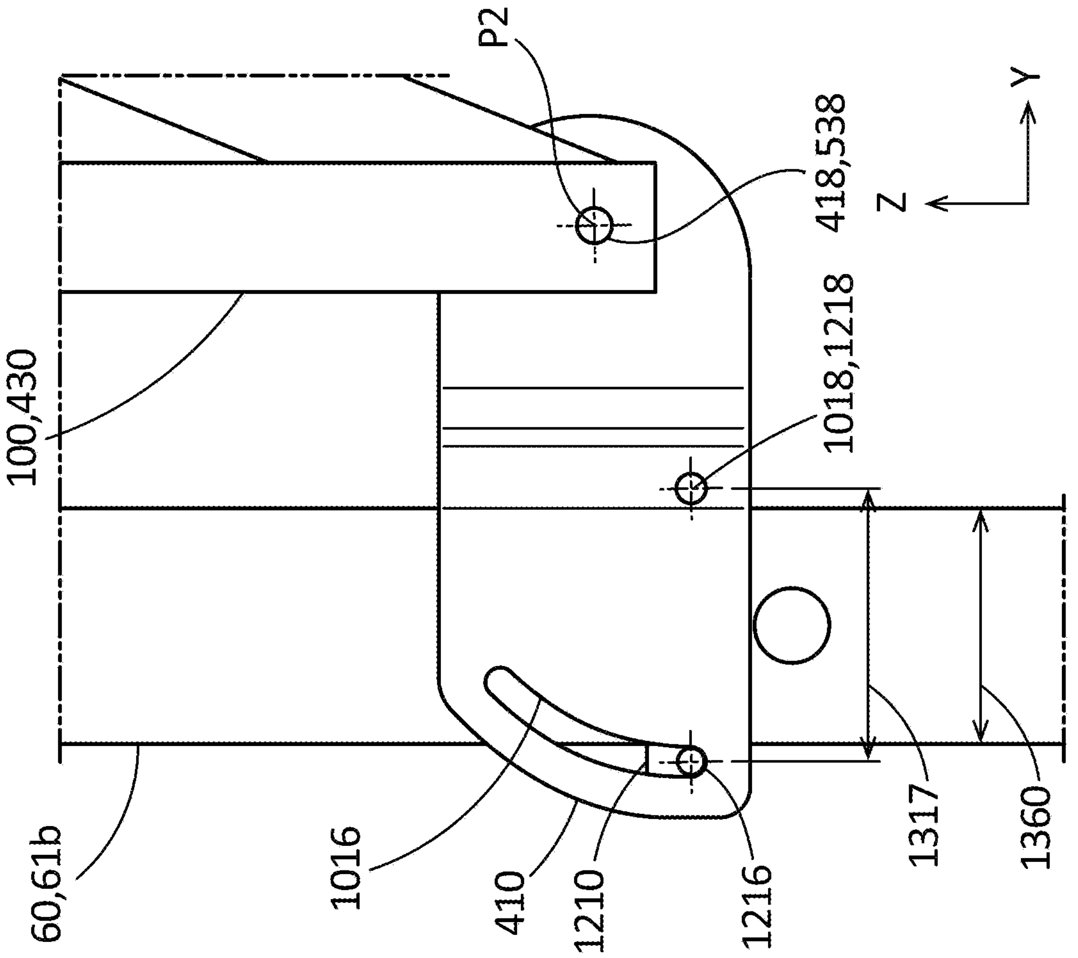
FIG. 13 is an outside perspective view of a portion of the hatch actuating device of FIG. 4 attached to the ladder of the hatch access system of FIG. 1 via the bracket.

FIG. 13 is an outside perspective view of a portion of the hatch actuating device 100 of FIG. 4 attached to the ladder 60 of the hatch access system 50 of FIG. 1 via the first bracket 410. A spacing 1317 between the bores 1216,1218 such as a center-to-center spacing shown can facilitate receipt of the ladder rail 61*a,b* (61*a* shown in FIG. 1) between the fasteners securing the strap 1210. The spacing 1317 can accommodate a width 1360 of the ladder rail 61*b* defining or proximate to a top end of a range of available widths 1360 as the ladder 60 can be typically made by different manufacturers thereof. In some aspects, without necessarily moving or adjusting the first bracket 410, the strap 1210 can be rotated clockwise (from the condition shown) about a center of the bore 1018, raising a vertical position of the bore 1216, and thus a minor positional adjustment of the device 100 can be made to accommodate a narrower width 1360. Thus the strap 1210 can be angled with respect to a direction that is perpendicular to a longitudinal direction of the rails 61*a,b*. More specifically, a distance or spacing measured between the bores 1216,1218 in the same direction (i.e., a direction that is perpendicular to a longitudinal direction of the rails) 61*a,b* can be adjusted and, more specifically, shortened in comparison to the spacing 1317. In some aspects, without necessarily moving or adjusting the strap 1210, the bracket 410—and, similarly, the bracket 420 (shown in FIG. 11)—can be rotated counterclockwise (from the condition shown) about a center of the bore 1018, raising a vertical position of the bores 418,538, and thus a minor positional (e.g. vertical) adjustment of the device 100 can be made. As shown, with the exception of the strap 1210 and any fasteners securing the strap 1210 and, more generally, the hatch actuating device 100 and any other components not interfering with passage of a user of the ladder 60, the hatch actuating device 100 can be positioned outside a space occupied by the ladder 60 in the lateral direction 104 of the ladder 60.

Figure 14A:
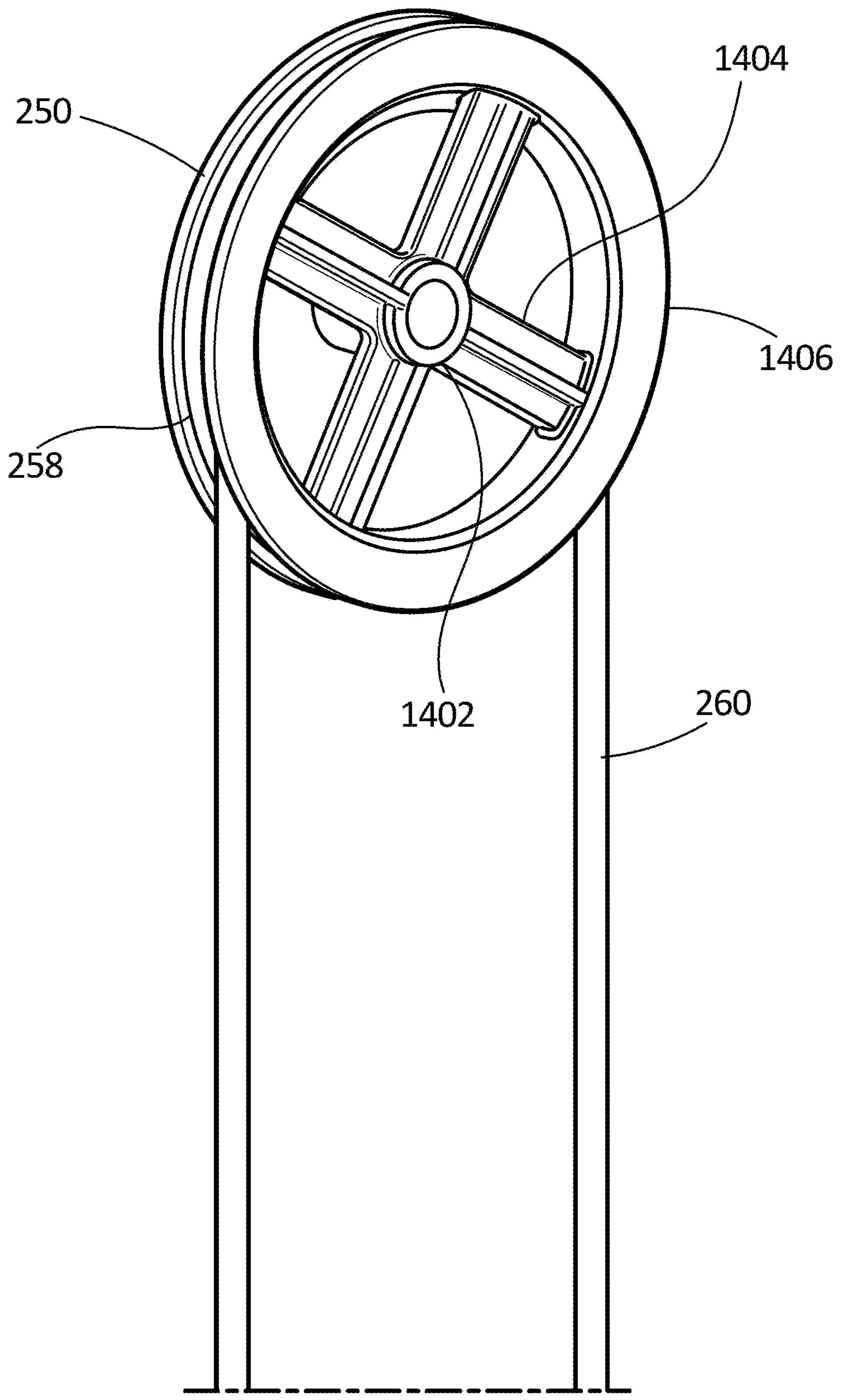
FIG. 14A is a perspective view of a wheel of the hatch actuating device of FIG. 4 shown engaged with a drive element.

FIG. 14A is a perspective view of a wheel and, more generally, the actuator 250, of the hatch actuating device 100 of FIG. 4 shown engaged with the drive element 260 and, more specifically, received within and engaged with the recess 258 defined in the actuator 250. As shown, the actuator can comprise a hub 1402, one or more spokes 1404 extending from the hub 1402, and a rim 1406 joining the spokes 1404.

Figure 14B:
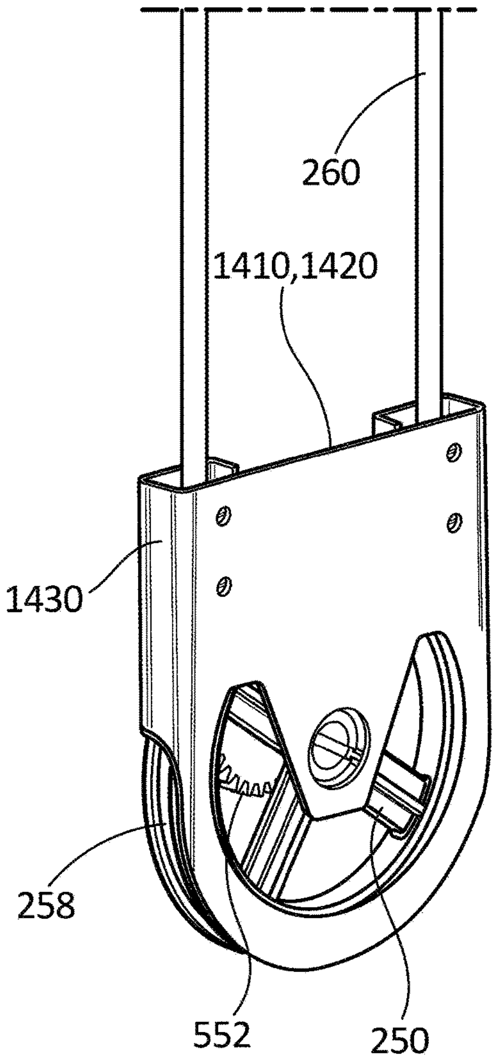
FIG. 14B is a first side perspective view of a wheel of the hatch actuating device of FIG. 4 shown mounted inside a shroud and engaged with a drive element in accordance with another aspect of the current disclosure.
Figure 14C:
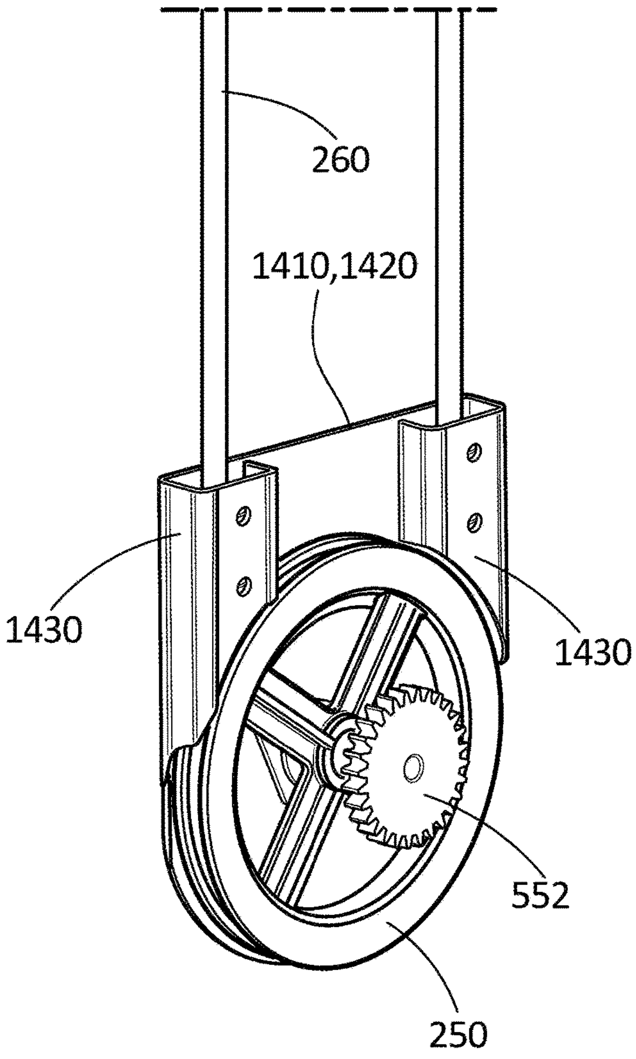
FIG. 14C is a second side perspective view of the wheel of FIG. 14B.

FIG. 14B is a first side perspective view of the actuator 250 of the hatch actuating device 100 of FIG. 4 shown mounted inside a shroud 1410 and engaged with a drive element 260 in accordance with another aspect of the current disclosure, and FIG. 14C is a second side perspective view of the actuator 250 of FIG. 14B. The shroud 1410 can cover or guard some or all of the actuator 250. The shroud 1410 can define a first panel 1420 and one or more flanges 1430, which can be bent with respect to the first panel 1420 or an adjacent flange 1430. One or more of the first panel 1420 and the one or more flanges 1430 can help maintain a position of the drive element 260 inside the recess 258 of the actuator 250. The actuator 250 can be positioned as in previous figures or, as shown in FIGS. 14B and 14C, can be assembled as a second actuator 250 and powered by any method such as, for example and without limitation, the methods disclosed above. More specifically, in some aspects, the second actuator 250 can cause movement of a bottom end of the drive element 260 and thereby cause movement of a first actuator 250 engaged with the gear assembly 450 (shown in FIG. 7). More specifically, a second instance of the first gear 552 can be engaged with and driven by a motor or other machine (not shown). Again, in some aspects, a user of the system 50 can cause such movement by manually and, as desired, continuously pulling on one vertical length or another vertical length of the drive element 260 until a desired position of the hatch actuating device 100 and, more generally, the hatch 70 (shown in FIG. 1) is reached.

Figure 16A:
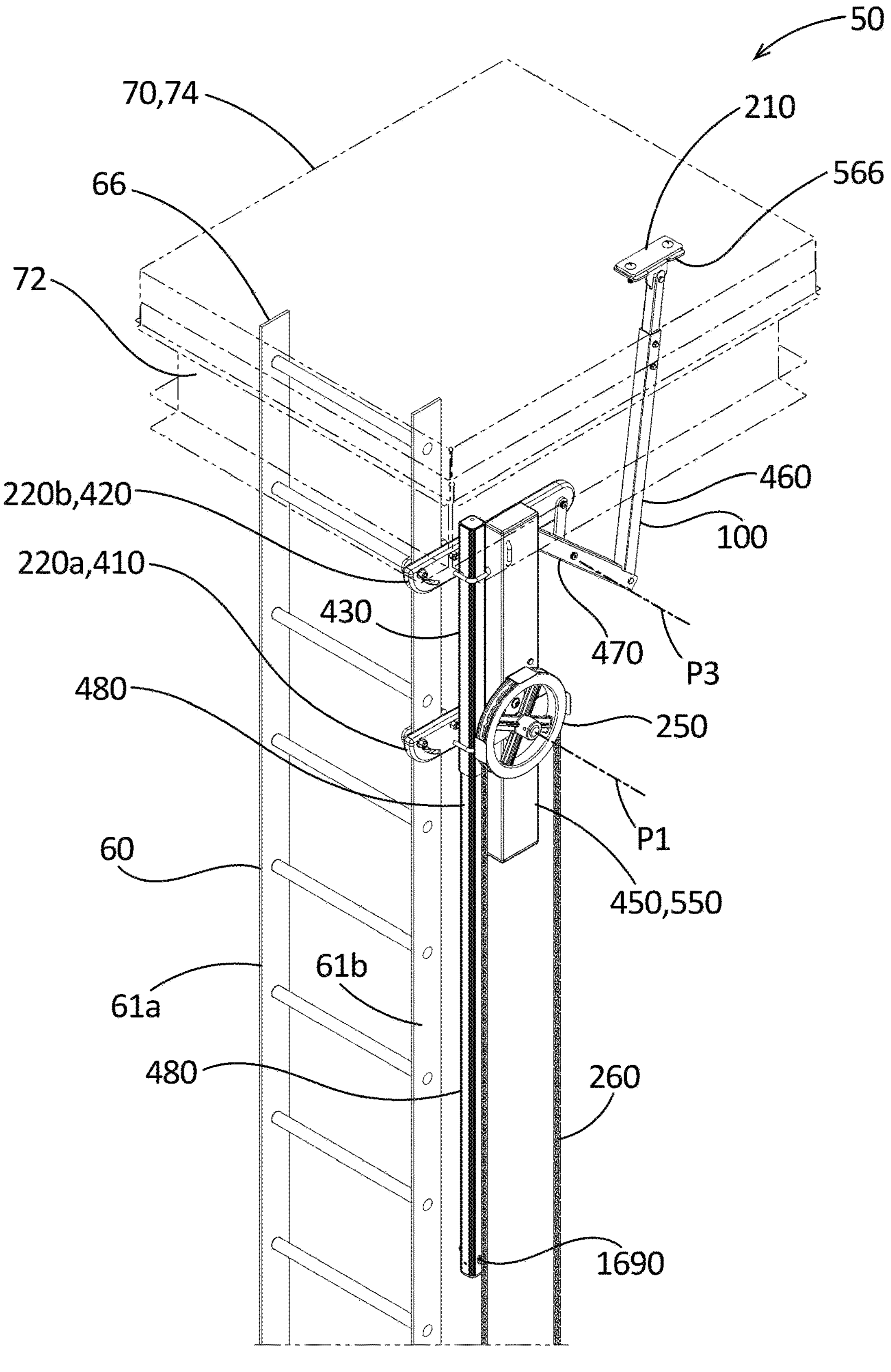
FIG. 16A is a top side perspective view of a hatch access system in accordance with another aspect of the current disclosure showing a first side of a hatch actuating device thereof.

Skipping ahead to later figures, FIG. 16A is a top side perspective view of the hatch access system 50 in accordance with another aspect of the current disclosure showing a first side of the hatch actuating device 100 thereof. Again, the hatch actuating device 100 can be secured to the ladder 60 at the mounting locations 220*a,b* through brackets such as, for example and without limitation, the respective brackets 410,420; and the hatch actuating device 100 can be secured to the lid 74 of the hatch 70 at the mounting location 210 through a brackets such as, for example and without limitation, the mounting bracket 566. The hatch actuating device 100 can comprise the support portion 430, the gear assembly 450, the stay portion 460, the linkage portion 470, and the hand post 480. In some aspects, as shown, the support portion 430 and the gear assembly 450, which can comprise or be housed within a housing 550, can be separately secured to a mounting structure such as the brackets 410,420. More specifically, a longitudinal direction of each of the support portion 430 and the housing 550 can be parallel to each other. Again, the drive element 260 can be wrapped at least partially around the actuator 250 and can drive movement of the actuator 250 about the actuator pivot axis P1. As shown, the hatch actuating device 100 itself can remain stationary and need not pivot about the pivot axis P2. A fastener 1692 can secure the drive element 260 to the hand post 480 at a connection 1690 therebetween. More specifically, movement of the drive element 260 can result in movement of the hand post 480 along a longitudinal direction of the hand post 480.

Figure 16B:
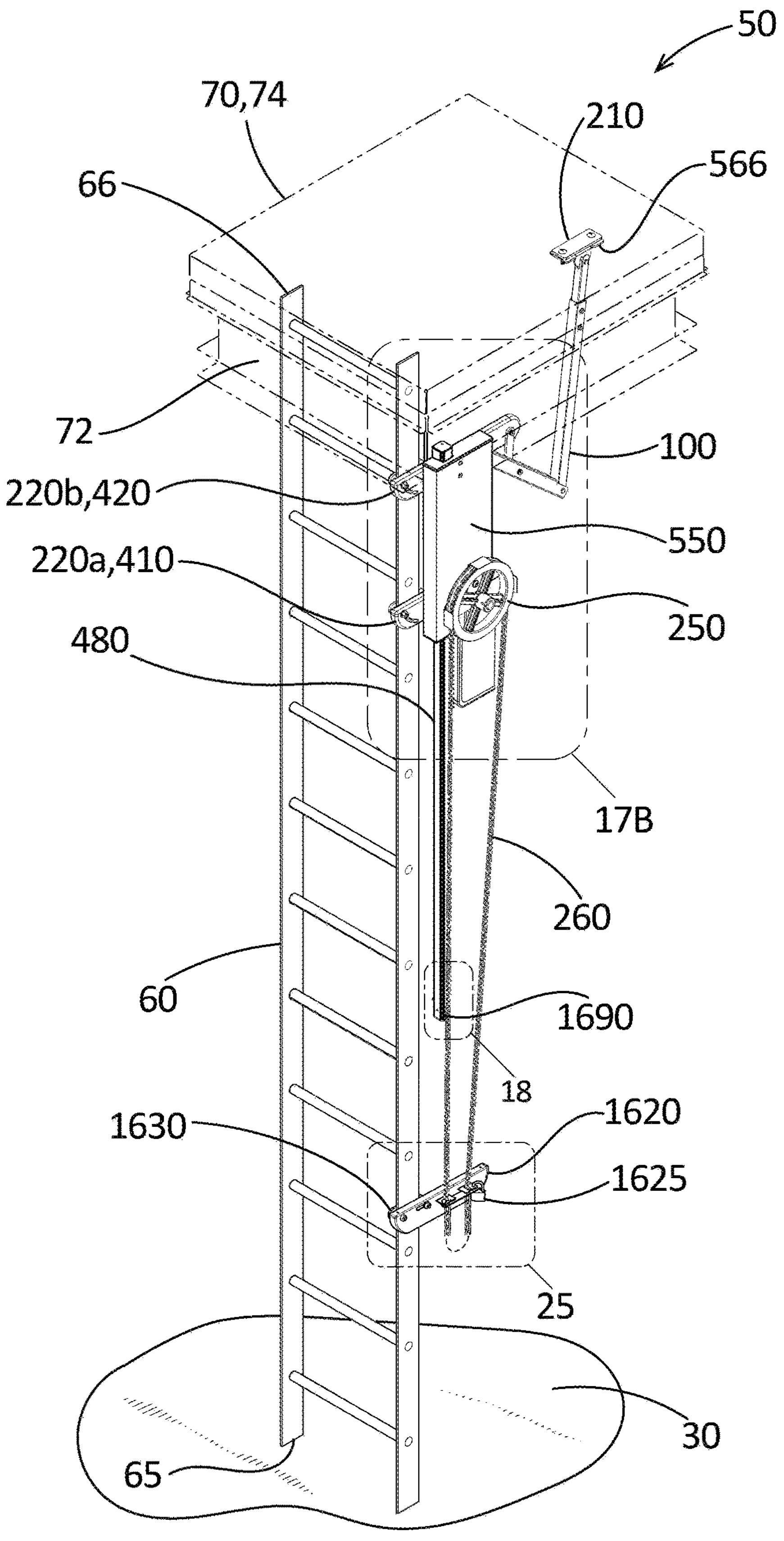
FIG. 16B is a top side perspective view of the hatch access system of FIG. 16A in accordance with another aspect of the current disclosure in which the hatch access system also comprises a system lock.

FIG. 16B is a top side perspective view of the hatch access system 50 in accordance with another aspect of the current disclosure in which the hatch access system 50 also comprises a drive element lock or hatch lock or system lock or lock 1620. The lock 1620 can be a system lock in the sense that it can lock more than just a portion of the system 50 being directly engaged such as, for example and without limitation, the drive element 260. For example and without limitation, the system lock 1620 can at the same time lock movement of the actuator 250, the gear assembly 450, the hatch lid 74 and any of various other parts disclosed herein. As shown, the system lock 1620 can engage and maintain a position of the drive element 260 by maintaining a position of a locking device 1625 thereof (e.g., a padlock). The system lock 1620 can comprise a mounting bracket or bracket 1630, which can be mounted to one of the rails 61*a,b* of the ladder 60. The system lock 1620 can be positioned closer to the bottom end 65 than to the top end 66 of the ladder 60. More specifically, the system lock 1620 can be within reach of and manipulation by the user of the system 50 when the user is standing on the floor 30. In some aspects, as shown, the device 100 need not comprise the support 430 (shown in FIG. 16A) or the housing 550 (shown in FIG. 17B) can function as the support 430 by receiving the hand post 480 therein.

Figure 16C:
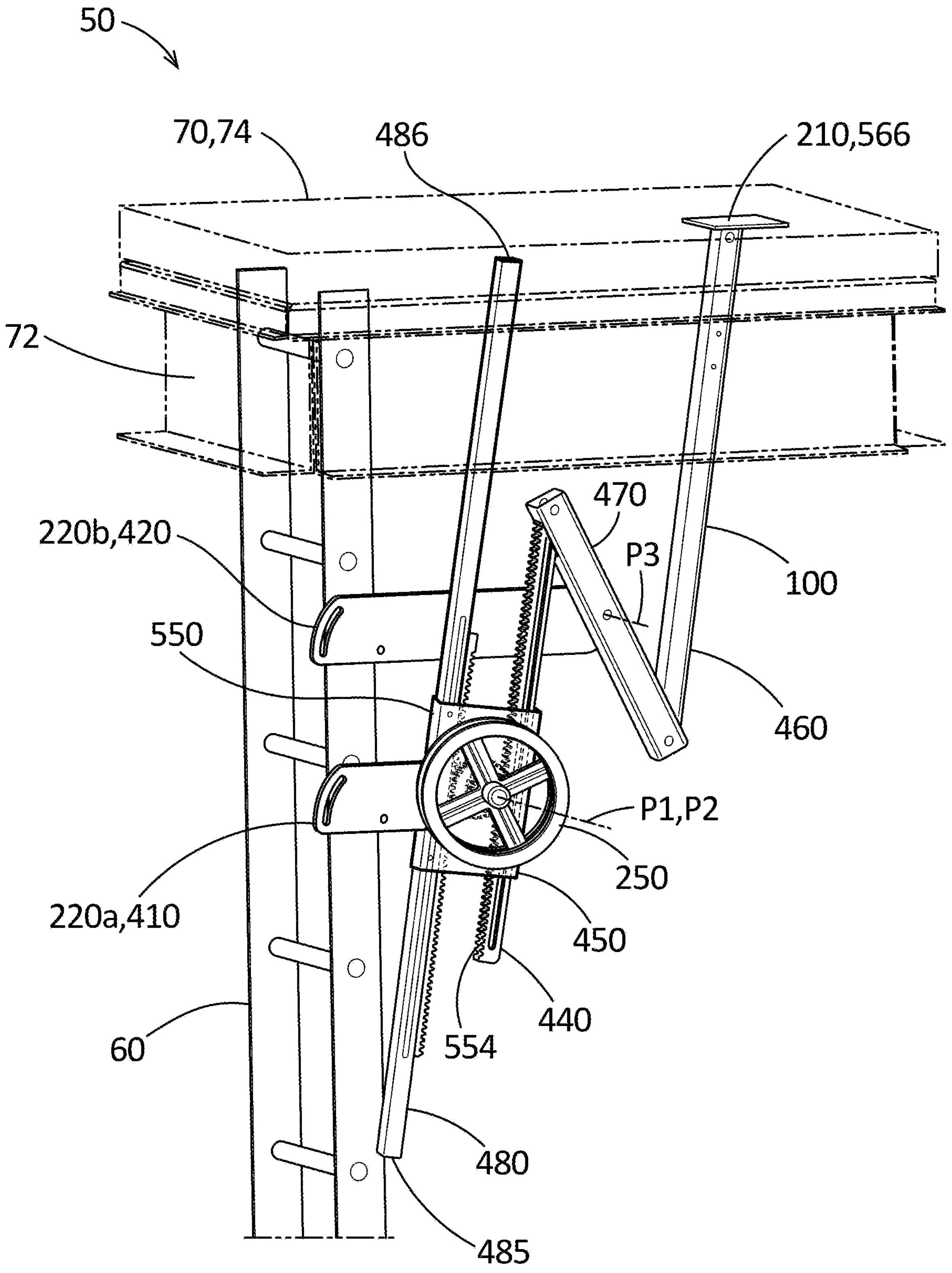
FIG. 16C is a side perspective view of a hatch access system in accordance with another aspect of the current disclosure.

FIG. 16C is a side perspective view of the hatch access system 50 in accordance with another aspect of the current disclosure. Again, as shown and described above, the gear assembly 450 can be secured to the first bracket 410, and the linkage portion 470 can be secured to the second bracket 420. The hand post 480 can extend past the gear assembly 450 above and, in some aspects, also below the gear assembly 450. Described in more detail below, the hand post 480 itself can be engaged to the gear assembly 450 and can be configured to also move respect to the gear assembly 450 upon rotation of the actuator 250. The actuator pivot axis P1 can be aligned and can be collinear with the device pivot axis P2. The linkage portion pivot axis P3 can be offset with respect to the actuator pivot axis P1 and/or the device pivot axis P2 by offset distances in the horizontal and/or vertical directions.

Figure 17A:
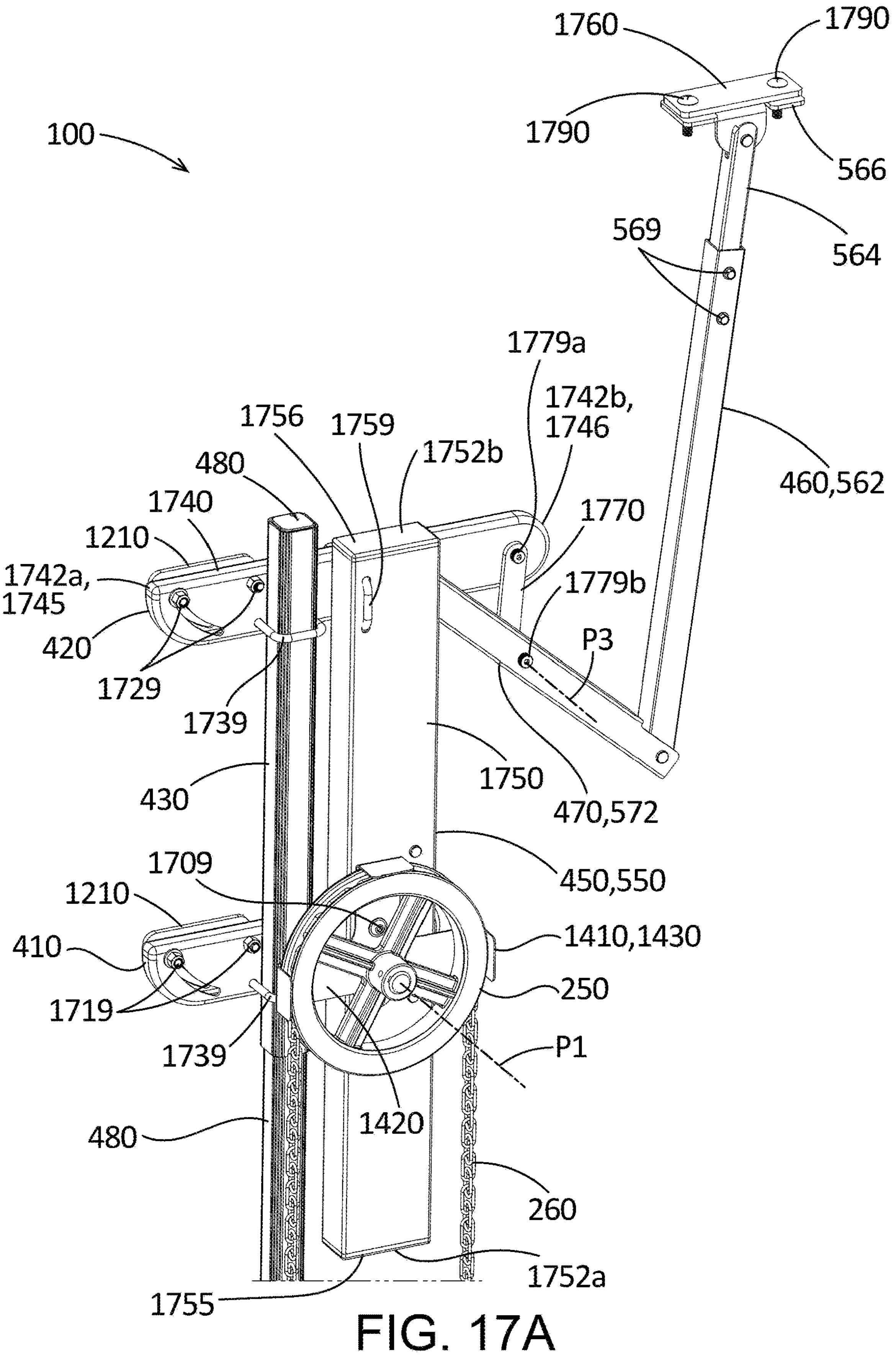
FIG. 17A is a detail top perspective view of the hatch actuating device of FIG. 16A.

FIG. 17A is a detail top perspective view of the hatch actuating device 100 of FIG. 16A. As shown, the hand post 480 can be slideably coupled to the support portion 430. The support portion 430, which can be secured to each of the brackets 410,420 with one or more respective fasteners 1719,1729 (e.g., the U-bolts shown), can be sized and otherwise configured to slideably receive the hand post 480 therein. The housing 550 of the gear assembly 450, which can be secured to the bracket 420 with one or more fasteners 1759 (e.g., the U-bolt shown), can receive the sliding portion 440 (shown in FIG. 21). More broadly speaking, the gear assembly 450 can be a load transfer device. The sliding portion 440 can slide with respect to the housing 550. The linkage portion 470 can comprise only the first member 572. In some aspects, as shown, the linkage pivot axis P3—about which the linkage portion 470 can pivot—can move with respect to the bracket 420. More specifically, the linkage pivot axis P3 can be defined by a joint between the linkage portion 470 and a second linkage portion 1770, which can extend from the bracket 420 to the linkage portion 470. The second linkage portion 1770 can be any solid or hollow structural member such as, for example and without limitation, a plate, strap, bar, or tube. The second linkage portion 1770 can be secured to each of the bracket 420 and the linkage portion 470 with fasteners 1779*a,b*.

One or more of the second linkage portion 770, the brackets 410,420, and the housing 550 can define a hollow structural member, which can be rectangular or substantially rectangular (not considering modifications for manufacturability) in cross-section. For example and without limitation, the housing 550 can be formed from a nominal 2-by-4 inch tube and can be formed from aluminum, and each of the brackets 410,420 can be formed from a nominal 1-by-3 inch tube and can be formed from aluminum. In some aspects, as shown, one or more of the second linkage portion brackets 410,420 and the housing 550 can define a constant cross-section except at ends thereof, in some aspects. The housing 550 can comprise end caps 1752*a,b*, which can be received within a body 1750 of the housing 550 at a first end 1755 and a second end 1756, respectively. Each of or either of the end caps 1752*a,b* and, more specifically, a tab thereof can lockably engage an opening defined in the body 1750 as, for example and without limitation, an end cap 1882 (shown in FIG. 18) can be engaged with a body 1880 (shown in FIG. 18) of the hand post 480. Similarly, each of or either of the brackets 410,420 can comprise end caps 1742*a,b*, which can be received within a body 1740 of the corresponding bracket 410,420 at a first end 1745 and a second end 1746, respectively.

Again, the actuator 250 can be mounted at least partly inside the shroud 1410, which can comprise the first panel 1420 and the flanges 1430 and can maintain a position of the drive element 260 inside the recess 258 (shown in FIG. 6) of the actuator 250. The shroud 1410 and, more specifically, the first panel 1420 thereof can be secured to the housing 550 with a fastener 1709. The mounting bracket 566 can be secured to the hatch lid 74 (shown in FIG. 16A) with a plate or strap 1760 and one or more fasteners 1790, which can extend through the mounting bracket 566, the strap 1760, and the hatch lid 74, which can be sandwiched between the mounting bracket 566 and the strap 1760.

Figure 17B:
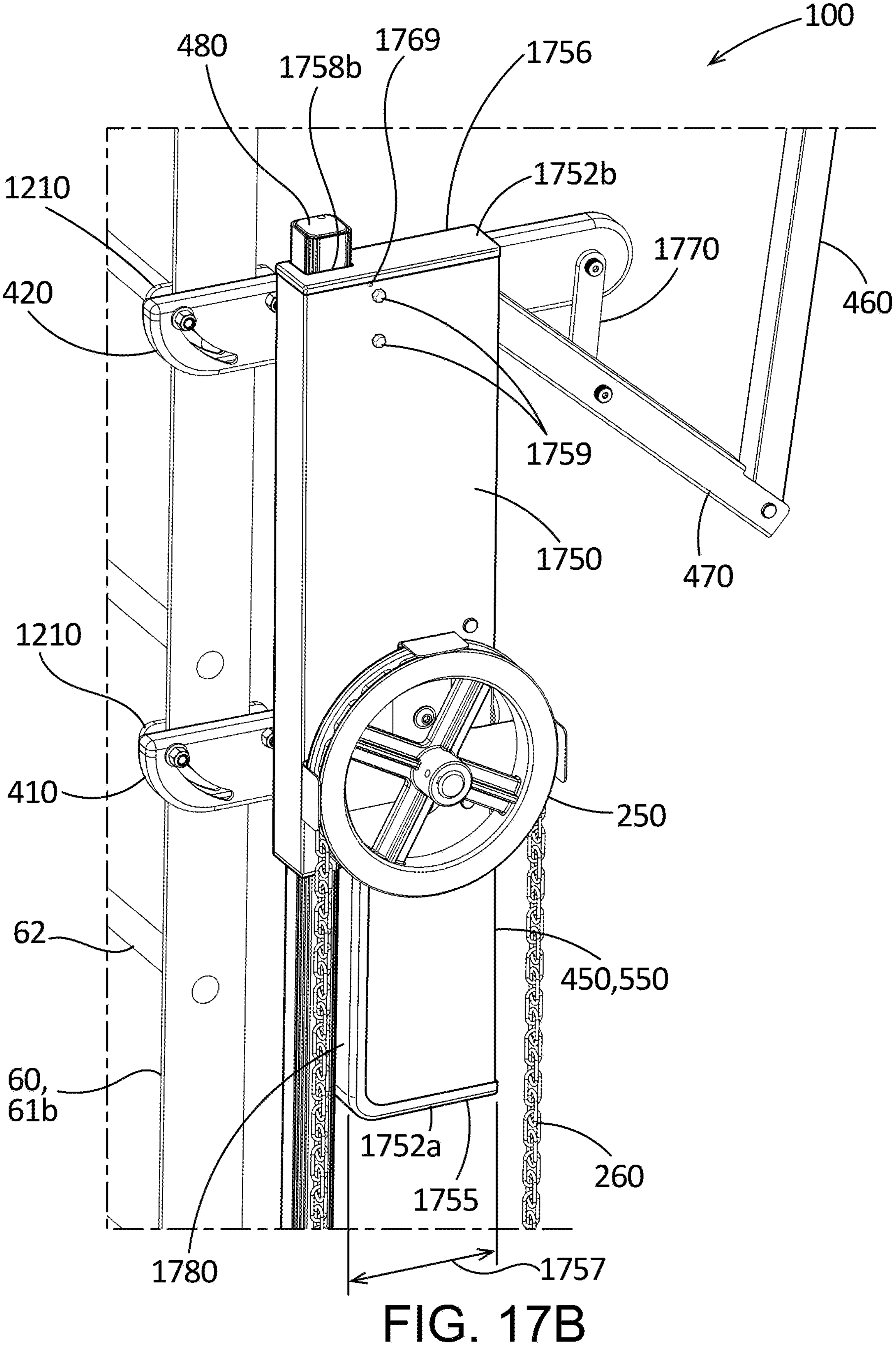
FIG. 17B is a detail top perspective view of a hatch actuating device of the hatch access system of FIG. 16B taken from detail 17B of FIG. 16B in accordance with another aspect of the current disclosure.

FIG. 17B is a detail top perspective view of the hatch actuating device 100 of the hatch access system 50 of FIG. 16B taken from detail 17B of FIG. 16B in accordance with another aspect of the current disclosure. Again, the housing 550 can be secured to one or both of the brackets 410,420 with the fasteners 1759 (e.g., the bolts shown). One or both of the end caps **1952*a*,*b* can be secured to the body 1750 with one or more fasteners 1769**.

In some aspects, as shown, the hatch actuating device 100 need not comprise the support portion 430 (shown in FIG. 17A), and the support portion 430 need not receive the hand post 480 therein. Rather, the housing 550 of the gear assembly 450 can receive the hand post 480 therein. More specifically, the housing 550 can define an opening **1758*a* in the first end 1755 and can define an opening 1758*b* (shown in FIG. 26B) in the second end 1756. The openings 1758*a*,*b* can be defined within end caps 1752*a*,*b* received within the body 1750 of the housing 550. The hand post 480 can be slideably received within the openings 1758*a*,*b*. The housing 550 can define a notch or step 1780, which can facilitate additional movement of the hand post 480 in a positive vertical direction by permitting travel of the connection 1690 (shown in FIG. 16A) and the fastener 1692 (shown in FIG. 16A) past and, more specifically, above the lower end 1755. In some aspects, a width 1757 of the housing 550 can be narrower at one end such as, for example and without limitation, the first end 1755. For example and without limitation, the housing 550** can be formed from a nominal 2-by-6 inch tube and, again, can be formed from aluminum.

Figure 18:
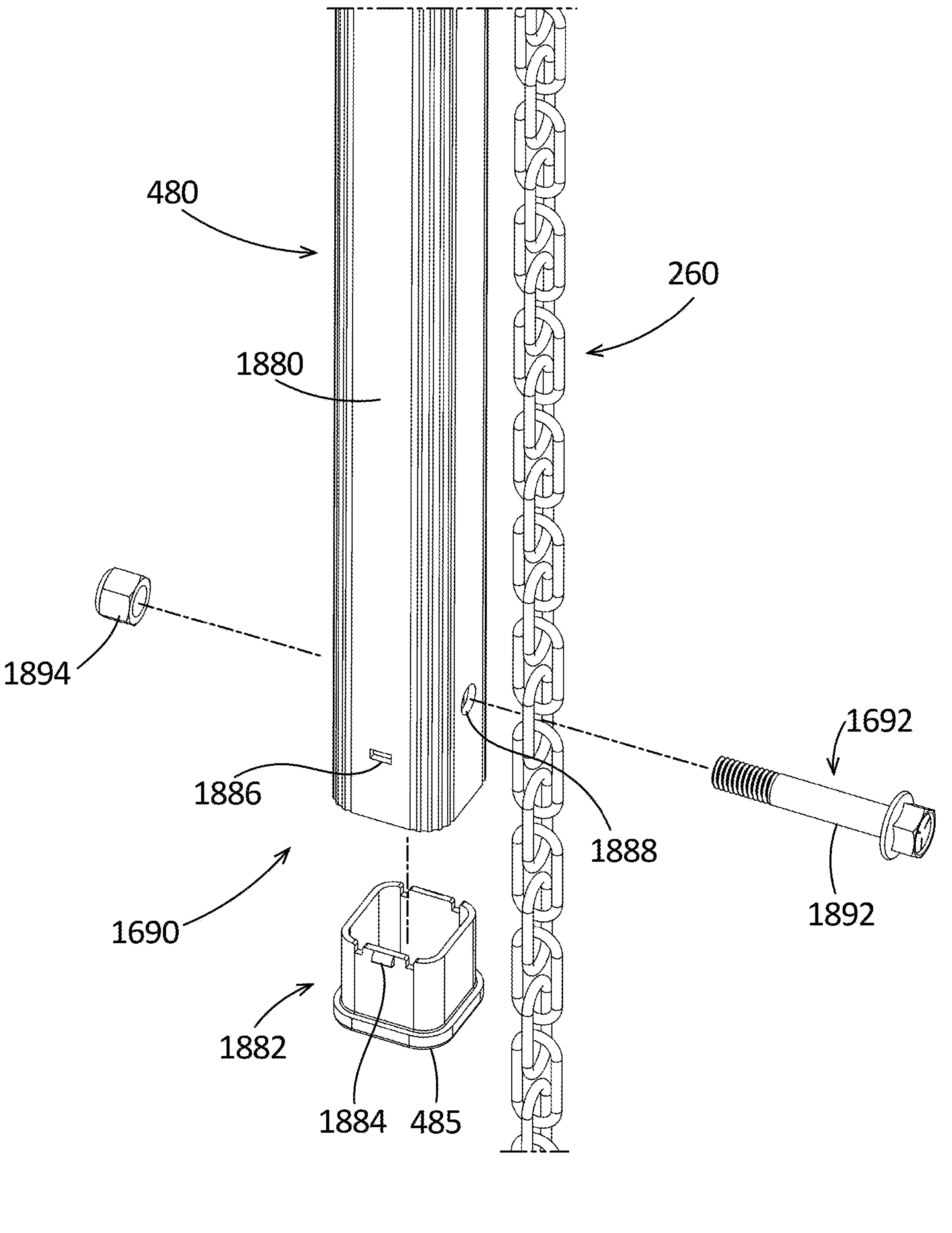
FIG. 18 is a detail top perspective view of a connection between a drive element and a hand post of the hatch access system of FIG. 16B taken from detail 18 of FIG. 16B.

FIG. 18 is a detail top perspective view of the connection 1690 between the drive element 260 and the hand post 480 of the hatch access system 50 of FIG. 16B taken from detail 18 of FIG. 16B. The hand post 480 can comprise the end cap 1882, which can be received within the body 1880 of the hand post 480 and can define the first end 485 thereof. The end cap 1882 and, more specifically, a tab 1884 of the end cap 1882 can lockably engage an opening 1886 defined in the body 1880. A bore 1888, which can be defined in the body 1880 proximate to the first end 485 of the hand post 480, can receive the fastener 1692. The fastener 1692 can comprise a first portion 1892 and a second portion 1894. Each of or either of the first portion 1892 and the second portion 1894 can define threads and can engage with each other through the drive element 260 and the hand post 480.

Figure 19A:
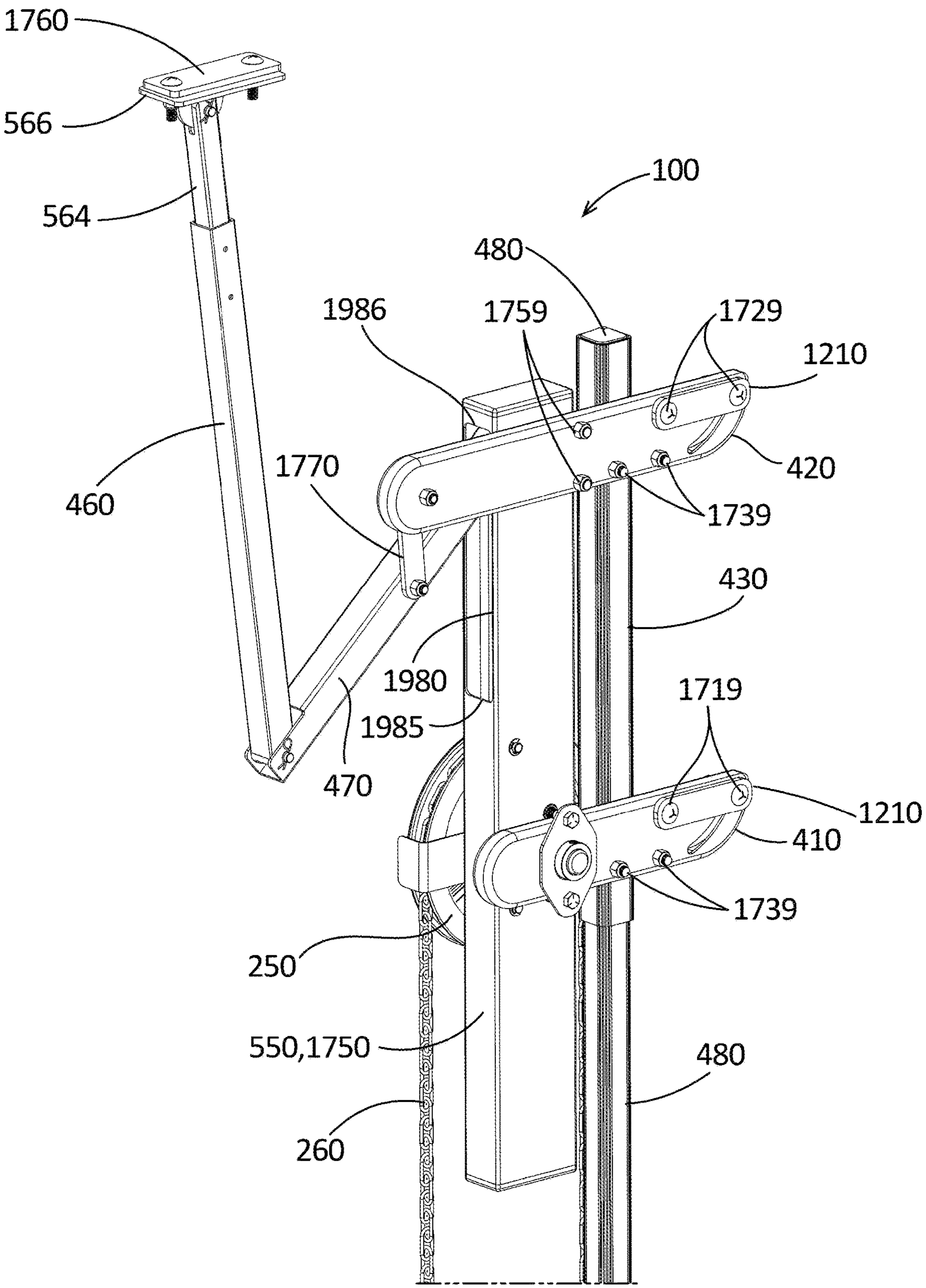
FIG. 19A is a detail side perspective view of the hatch actuating device of FIG. 16A showing a second side that is opposite from the first side shown in FIG. 16A.

FIG. 19A is a detail side perspective view of the hatch actuating device 100 of FIG. 16A showing a second side that is opposite from the first side shown in FIG. 16A. The body 1750 of the housing 550 can define an opening 1980, which can be sized to receive the linkage portion 470 therein. In a closed position of the hatch actuating device 100 shown, the linkage portion 470 can be closer to a top end 1986 of the opening 1980, which can define a bottom end 1985 and the top end 1986. In some aspects, each of the fasteners 1719, 1729 can comprise multiple components such as, for example and without limitation, a bolt-and-nut combination. Similarly, in some aspects, each of the fasteners 1739,1759 can comprise multiple components such as, for example and without limitation, a bolt-and-nut combination. More generally, in any of the aspects disclosed herein, any one or more of various connections between the components of the hatch actuating device 100 such as, for example and without limitation, a connection between the stay portion 460 and the linkage portion 470 can comprise a fastener. In some aspects, any of the connections can comprise a threaded fastener such as, for example and without limitation, a bolt-and-nut combination. In some aspects, any of the connections can comprise non-threaded fastener such as, for example and without limitation, a clevis pin and a cotter pin, as shown connecting the stay portion 460 and the linkage portion 470.

Figure 19B:
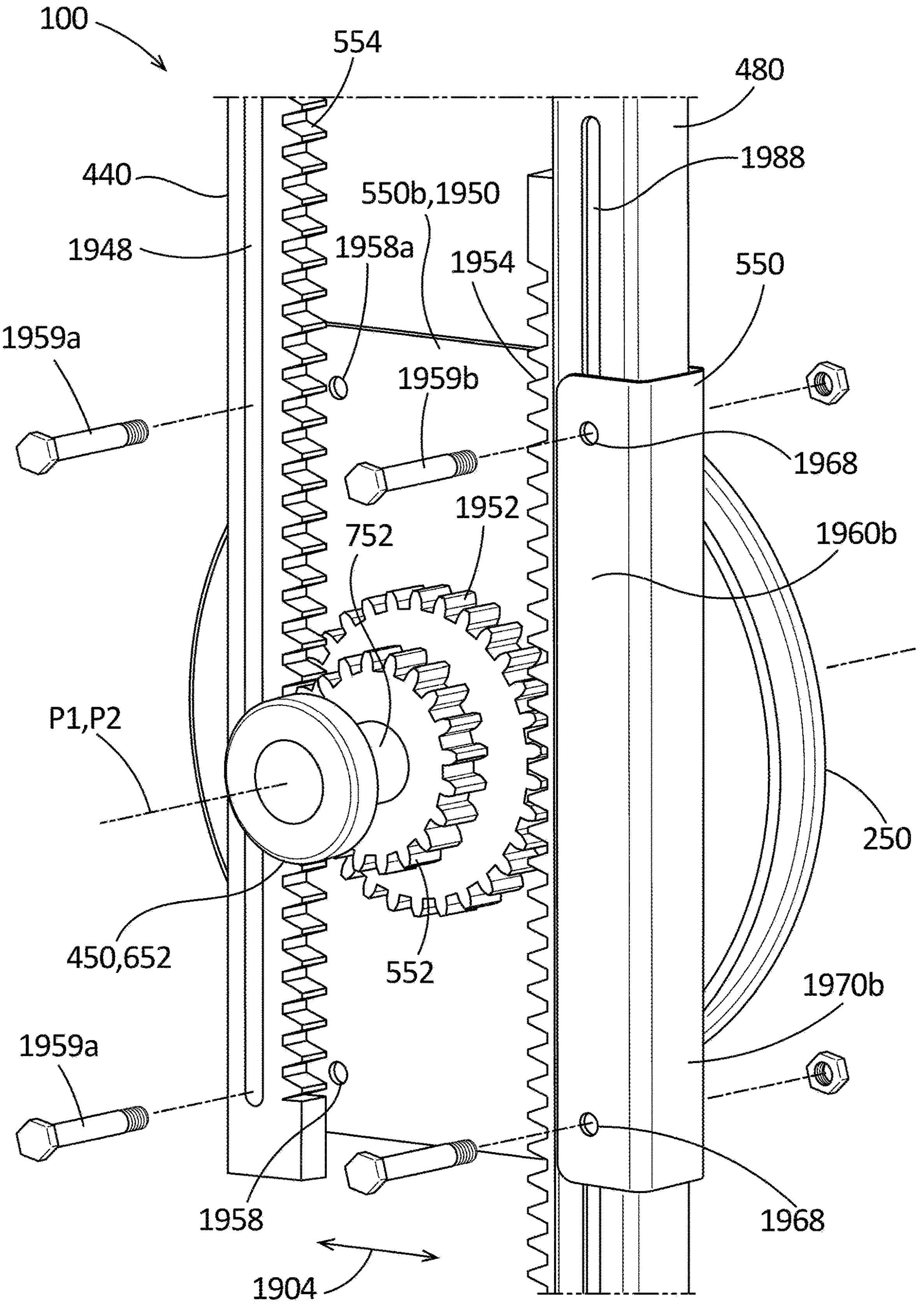
FIG. 19B is a detail side perspective view of the hatch actuating device of FIG. 16C showing a second side that is opposite from the first side shown in FIG. 16C.
Figure 19C:
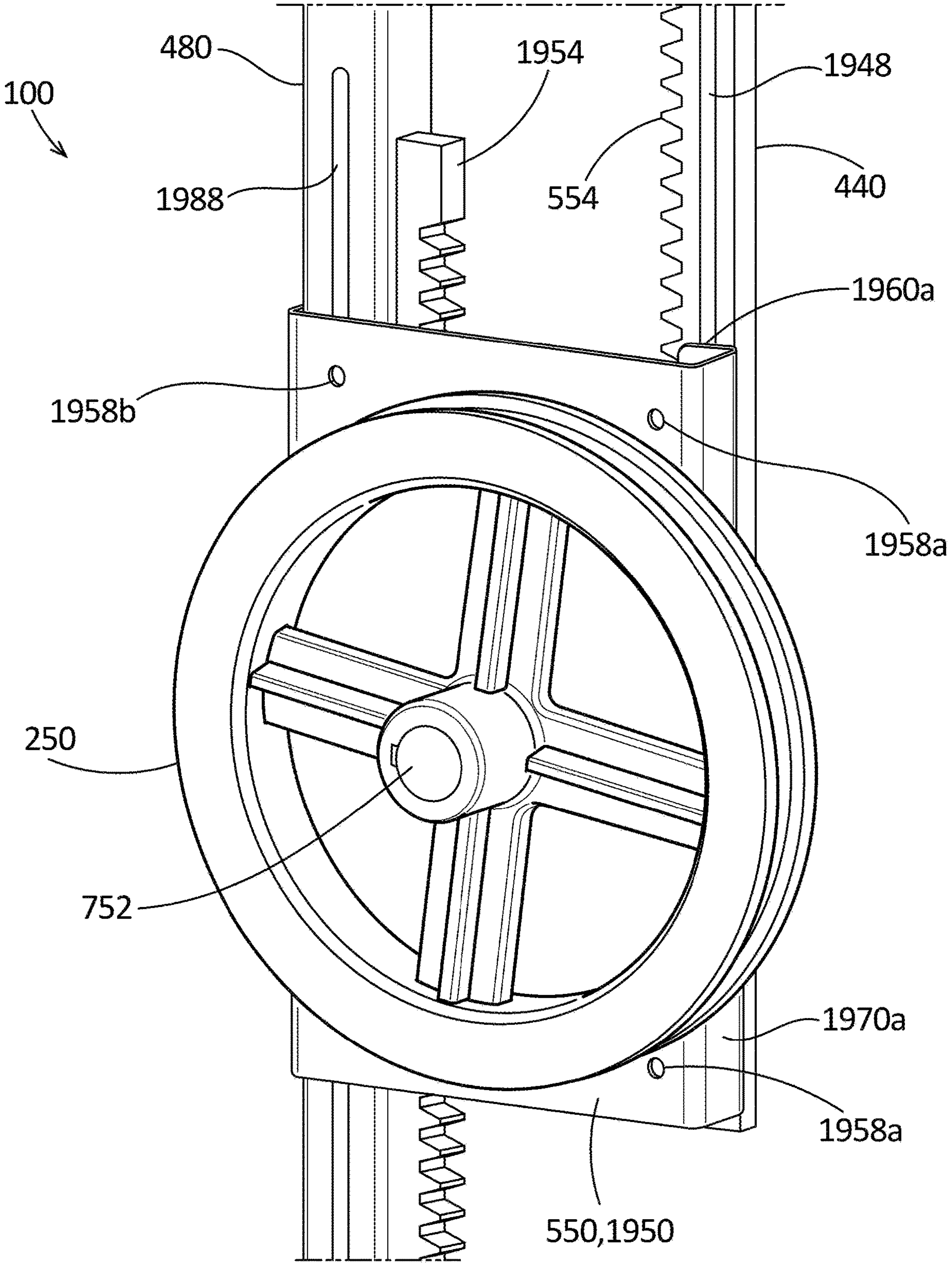
FIG. 19C is a detail side perspective view of the hatch actuating device of FIG. 16C showing the first side shown in FIG. 16C.

FIG. 19B is a detail side perspective view of the hatch actuating device 100 of FIG. 16C showing a second side that is opposite from the first side shown in FIG. 16C, and FIG. 19C is a detail side perspective view of the hatch actuating device 100 of FIG. 16C showing the first side shown in FIG. 16C. In some aspects, as shown, each of the sliding portion 440 and the hand post 480 can be movably secured and, more specifically, slideably secured to the housing 550. More specifically, as shown, the hand post 480 can be received within the housing 550. In some aspects, the housing 550 can comprise the first portion **550*a* and a second portion 550*b*. In some aspects, the housing 550 can comprise a first panel 1950. In some aspects, the housing 550 can further comprise one or more second panels 1960*a*,*b* (1960*a* shown in FIG. 19C), which can be connected to the first panel 1950. More specifically, as shown, the housing 550 can comprise a pair of the second panels 1960*a*,*b*. The first panel 1950 can correspond to the second portion 550*b*, and the one or more second panels 1960 can correspond to the first portion 550*a*. In some aspects, the housing 550 can comprise one or more third panels 1970*a*,*b* (1970*a* shown in FIG. 19C), each of which can join the first panel 1950 to each of the one or more second panels 1960*a*, *b***.

In some aspects, as shown, a length of each of the one or more second panels **1960*a*,*b* in the lateral direction 1904 can be sufficient to maintain a position and orientation of the sliding portion 440 and the hand post 480. In some aspects, one or more fasteners 1959*a* can extend through and engage a slot 1948 in the sliding portion 440 and matchings holes 1958*a* in the first panel 1950. Similarly, fasteners 1959*b* can extend through and engage a slot 1988 in the hand post 480 and matching holes 1958*b* (shown in FIG. 19C) in the first panel 1950. In some aspects, without or without the one or more second panels 1960*a*,*b* or the third panels 1970*a*,*b*, the portions 440,480 can be held in place with the fasteners 1959*a*,*b*, which can comprise washers defining a larger diameter than a width of the respective slots 1948,1988. In some aspects, as shown, the fasteners 1959*a*,*b* can extend through respective holes 1968 in the one or more second panels 1960*a*,*b* of the housing 550 and then engage the respective slots 1948,1988 and the first panel 1950. In some aspects, the sliding portion 440, the hand post 480, and the housing 550 can be otherwise positioned to avoid interference between the second gear 554 and the third gear 1952 and to facilitate engagement between the second gear 554 and the first gear 552 during operation. In some aspects, a bearing (not shown) can be positioned between each of the fasteners 1959*a*,*b* and the corresponding slot 1948,1988 to smooth operation of the gear assembly 450**.

In some aspects, a position of each of the sliding portion 440 and the hand post 480 can be fixed with respect to the housing 550 in at least two axes. More specifically, each of the sliding portion 440 and the hand post 480 can be fixed with respect to the housing 550 in a direction parallel to the pivot axes P1,P2 and can be fixed with respect to the lateral direction 1904 of the hatch actuating device 100 and, more specifically, the gear assembly 450.

As described above, a first gear 552 can be driven by the actuator 250 through the shaft 752 and can engage and cause movement of the second gear 554 and, more generally, the sliding portion 440. In some aspects, the gear assembly 450 can comprise a third gear 1952 and a fourth gear 1954. As shown, the third gear 1952 can be coupled to the shaft 752 and the axes of the third gear 1952 and the shaft 752 can be collinear. The fourth gear 1954 can be a rack gear defining teeth along a linear direction, which can align with a longitudinal direction of the hand post 480. The third gear 1952 can be configured to engage and can engage the fourth gear 1954, and upon rotation of the third gear 1952 about the actuator pivot axis P1 the third gear 1952 can cause translation (i.e., movement in a linear direction) of the hand post 480. The third gear 1952 and the fourth gear 1954 can thus form a rack-and-pinion mechanism configured to regulate translational movement of the hand post 480 with respect to the support portion 430. More specifically, the hand post 480 can rise and fall with, respectively, clockwise and counter-clockwise rotation of the third gear 1952. Diameters of the first gear 552 and the third gear 1952 can vary to create the desired ranges of motion in the sliding portion 440 and the hand post 480, respectively. As such, a single revolution or multiple revolutions of the actuator 250 can result in greater travel of the hand post 480 than of the sliding portion 440. More specifically, the gear ratio can be higher for the gears 552,554 driving motion of the hand post 480 and can be lower for the gears 1952,1954 driving motion of the hatch lid 74.

Figure 20:
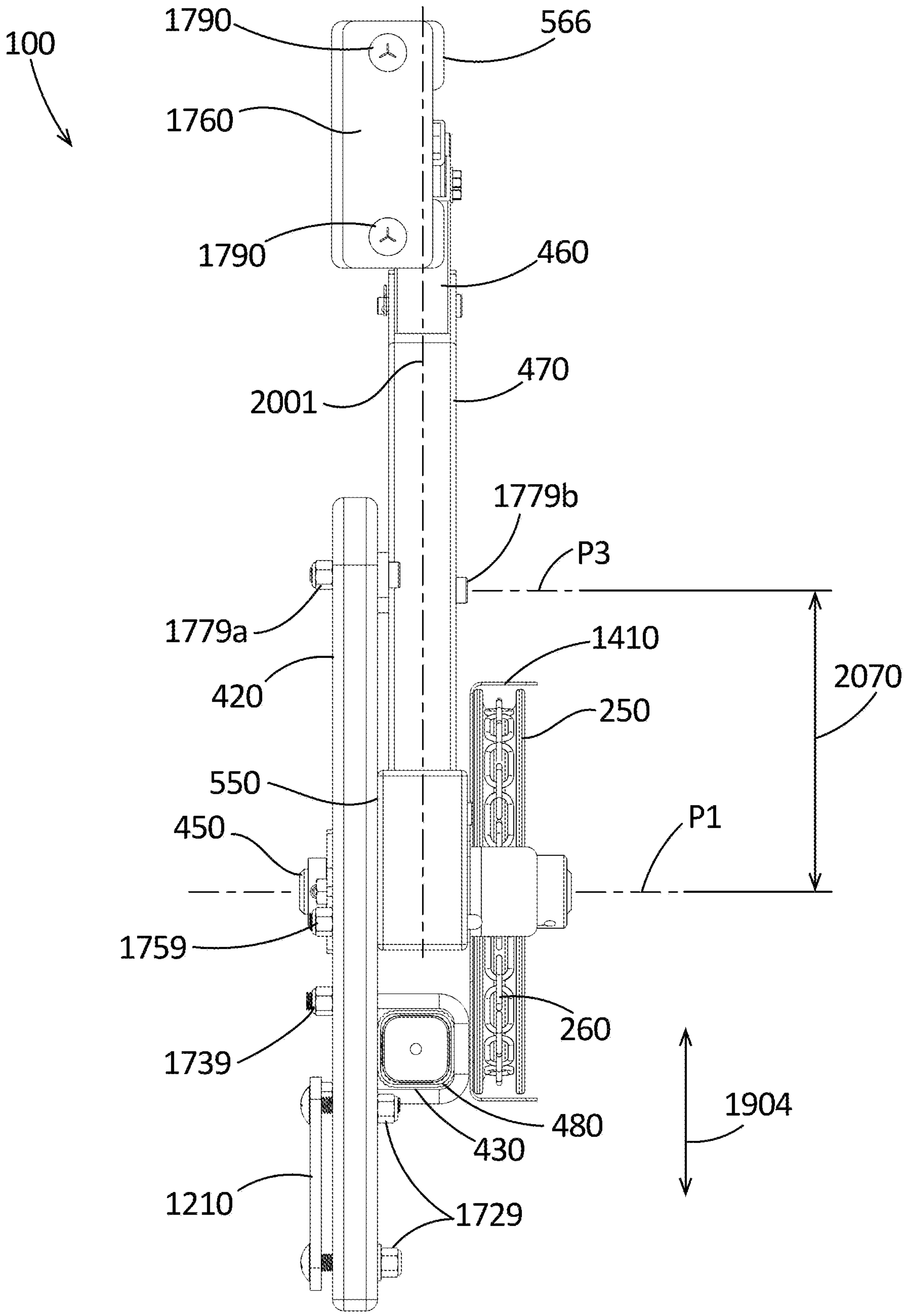
FIG. 20 is a top view of the hatch actuating device of FIG. 16A.

FIG. 20 is a top view of the hatch actuating device 100 of FIG. 16A. As shown, the pivot axes P1,P3 can be offset in the horizontal direction or the lateral direction 1904 by anb offset distance 2070, which can vary during operation of the hatch actuating device 100. As also shown, various portion of the hatch actuating device 100 can be aligned along a common centerline 2001, and forces acting between portions of the hatch actuating device 100 can act along a common centerline 2001.

In some aspects, to discourage opening of the hatch lid 74 from the outside or to discourage or prevent unauthorized removal of other components, any of the fasteners of the hatch actuating device 100 such as, for example and without limitation, the fasteners 1790 can be a tamper-proof or security fastener (not shown), which can be accessed or at least manipulated only by a member of the trade responsible for installing and maintaining the device 100 and not the general public. More specifically, a tamper-proof or security fastener can be any fastener not removable by any of a flat-head screwdriver or equivalent, a Phillips-head screwdriver or equivalent, a standard Allen-head screwdriver or equivalent (e.g., a plain male hex bit without accommodation for a pin), a standard hex-head socket or equivalent (e.g., a plain female hex socket defining a hexagonal shape or otherwise accommodating same, including both 6-point and 12-point hex sockets), a standard TORX screwdriver or equivalent (e.g., a standard TORX bit without accommodation for a pin), and a standard square-drive screwdriver or equivalent (e.g., a standard square-drive male bit). Fasteners that are tamper-resistant include, for example and without limitation, a pin-in-TORX fastener, a pin-in-hex fastener, a pin-in-Philips fastener, a spanner or drilled-spanner fastener, a one-way fastener, a tri-groove fastener, a TRI-WING fastener (as shown), a TP3 triangular recessed-drive fastener, and an OPSIT fastener.

Figure 21:
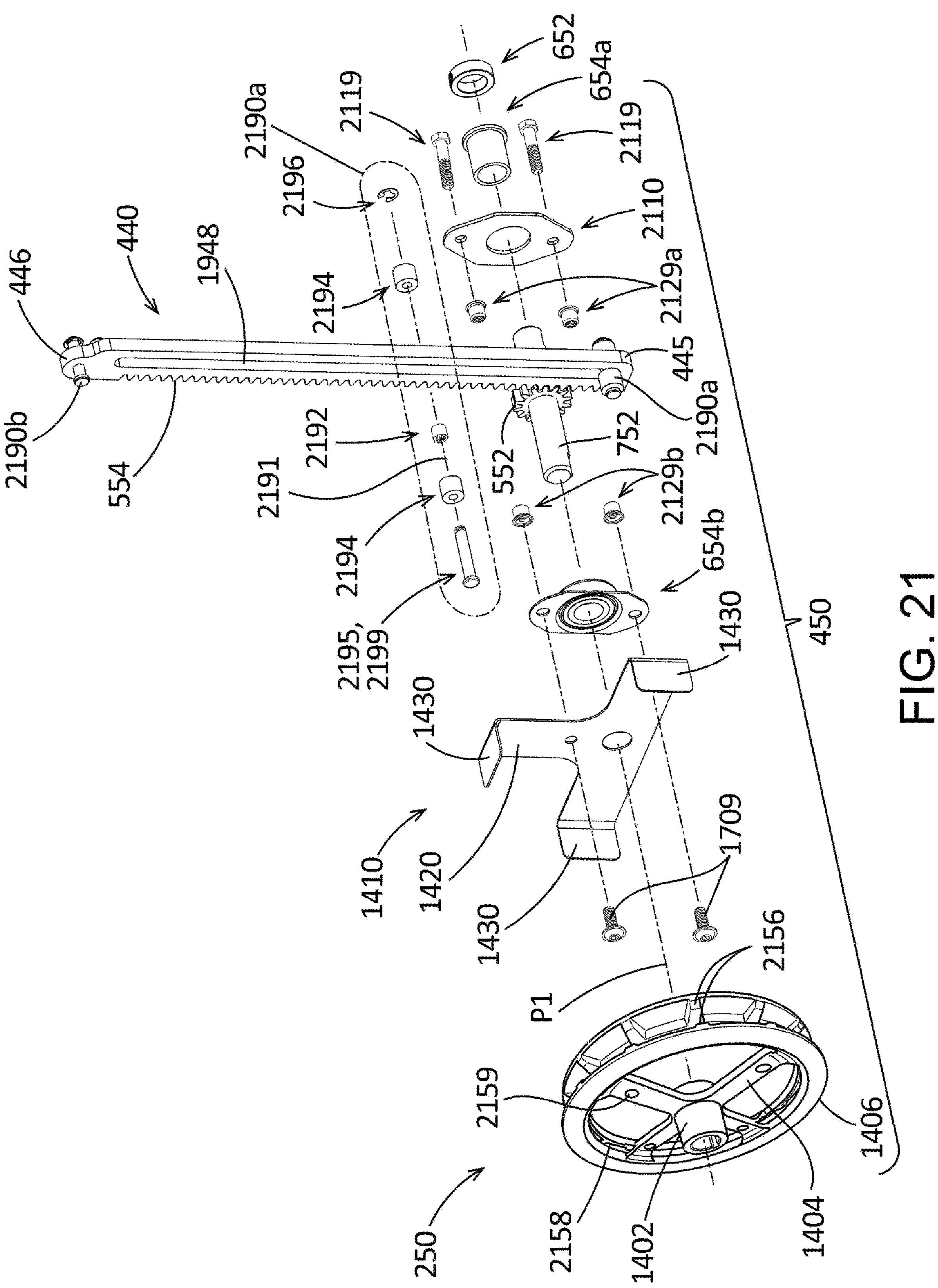
FIG. 21 is an exploded side perspective view of a gear assembly of the hatch actuating device of FIG. 16A.

FIG. 21 is an exploded side perspective view of the gear assembly 450 of the hatch actuating device 100 of FIG. 16A. In some aspects, as shown, the actuator 250 can be formed from two halves 250*a,b*, which can be joined with one or more rivets 2159. A gap 2158 can be defined between the two halves 250*a,b* and can be sized to receive a portion of the drive element 260, which can be a chain. The rim 1406 of the actuator 250 and, more specifically, the halves 250*a,b* thereof can comprise ribs 2156, which can engage portions (e.g., chain links) of the drive element 260 and can thereby prevent slipping of the drive element 260 on the actuator 250. The actuator 250 can be Model 300 series chain hoist available from Re-Source Industries Inc. of Fort Worth, Texas, U.S.A.

The bushing or bearing 654*a* can support one end of the shaft 752, and a bushing or bearing 654*b* can support an opposite end of the shaft 752. Each end of the shaft 752 can define an anti-rotation element such as, for example and without limitation, a flattened portion. Each of or either of the flat on the shaft 752 can be configured to receive a set screw of the actuator 250 or the stop collar 652. As shown, the gear assembly 450 can comprise the bushing 654*a* and the bearing 654*b*. The bushing 654*a* can comprise a body and a flange defining a diameter that is greater than a diameter of the body. The bushing 654*a* can be installed through a plate 2110 and a hole in the body 1750 (shown in FIG. 23) of the housing 550 (shown in FIG. 23) with fasteners 2119. The fasteners 2119 can be engaged with threaded fasteners 2129*a*, which can be threaded inserts and can be installed in a vertical side wall of the body 1750 of the housing 550. The bearing 654*b* can comprise a body and a flange defining a diameter that is greater than a diameter of the body. The bearing 654*b* can be installed through a hole in the body 1750 of the housing 550 with the fasteners 1709. The fasteners 1709 can be engaged with threaded fasteners 2129*b*, which can be threaded inserts and can be installed in a vertical side wall of the body 1750 of the housing 550.

The sliding portion 440 and, more specifically, the second gear 554 thereof can be aligned with along the lateral direction 1904 and engaged with the first gear 552, which can be welded to the shaft 752. The sliding portion 440 can be oriented vertically and can be held in such orientation inside the housing 550 with guides 2190*a*. Each of or either of the guides 2190*a* can comprise a bearing 2192, which can be a needle bearing or roller bearing and can be received within the slot 1948 of the sliding portion 440. Each of or either of the guides 2190*a* can comprise one or more spacers 2194, which can be positioned between the sliding portion 440 and a nearest wall of the housing 550. Each of or either the guides 2190*a* can comprise a fastener 2199, which can comprise any fastener with a shaft such as, for example and without limitation, a clevis pin 2195 and a retaining pin 2196. Each of the components of the guides 2190*a* can be aligned along a guide axis 2191. The top end 446 of the sliding portion 440 can comprise a fastener 2190*b*, which can couple the sliding portion 440 to the linkage portion 470 (shown in FIG. 20).

Figure 22:
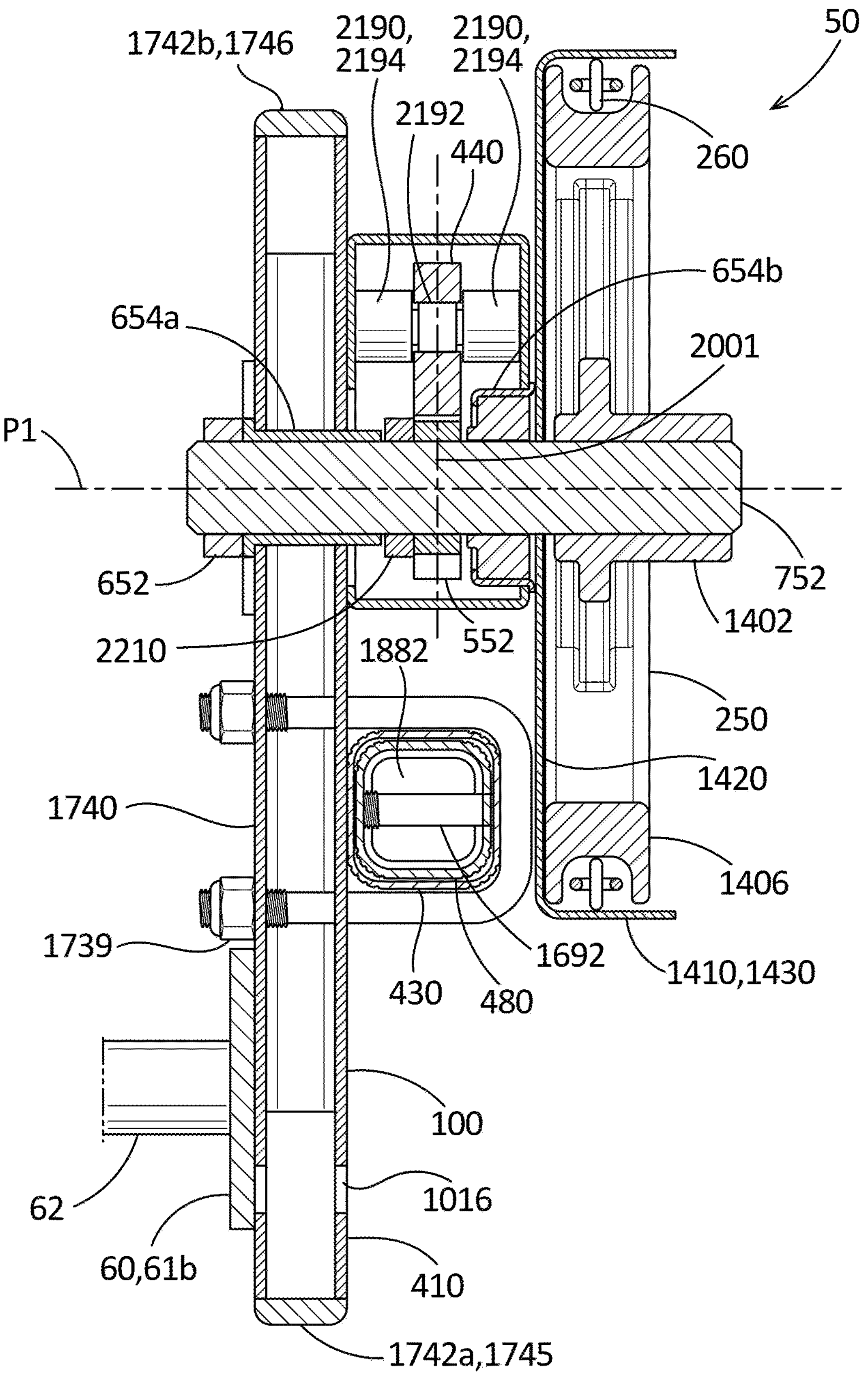
FIG. 22 is a sectional view of the hatch actuating device of FIG. 16A taken from line 22-22 of FIG. 26A.
Figure 23:
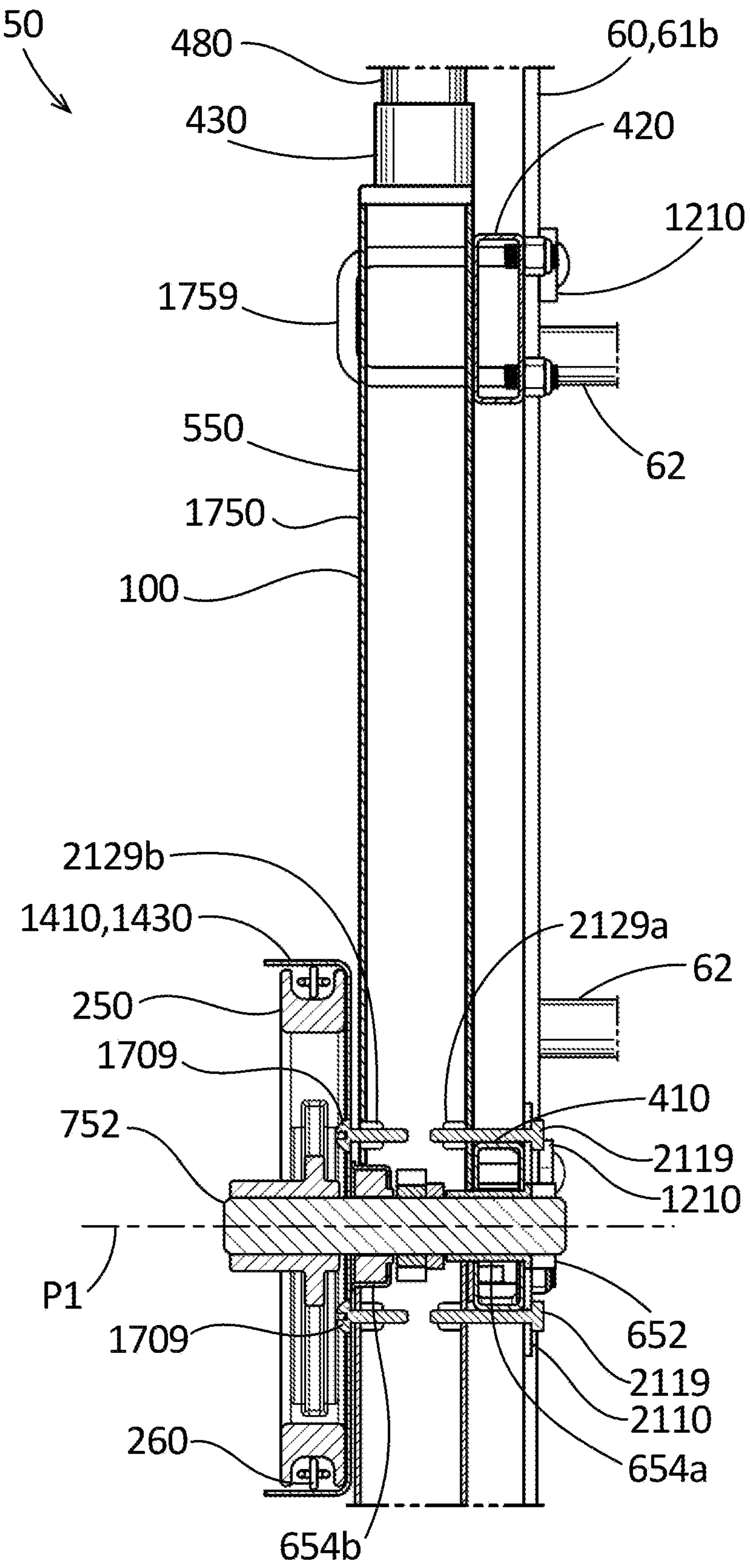
FIG. 23 is a sectional view of the hatch actuating device of FIG. 16A taken from line 23-23 of FIG. 26A.
Figure 26A:
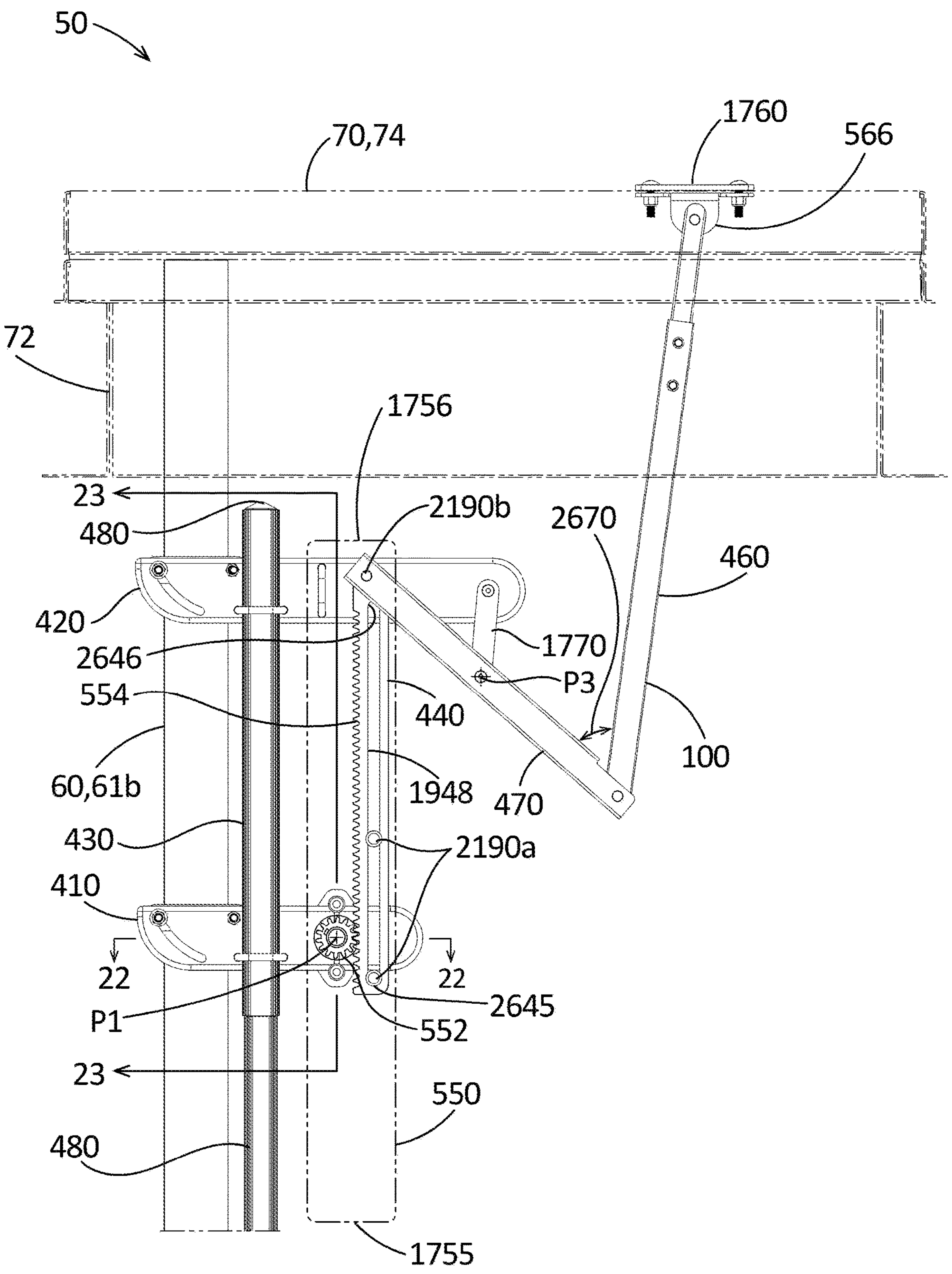
FIG. 26A is a side view of the hatch access system of FIG. 16A showing the hatch actuating device thereof in a first position and the hatch lid in a closed position.

FIG. 22 is a sectional view of the hatch actuating device 100 of FIG. 16A taken from line 22-22 of FIG. 26A, and FIG. 23 is a sectional view of the hatch actuating device 100 of FIG. 16A taken from line 23-23 of FIG. 26A. As a shown, a spacer 2210 can be positioned between the first gear 552 and the bushing 654*a*.

Figure 24:
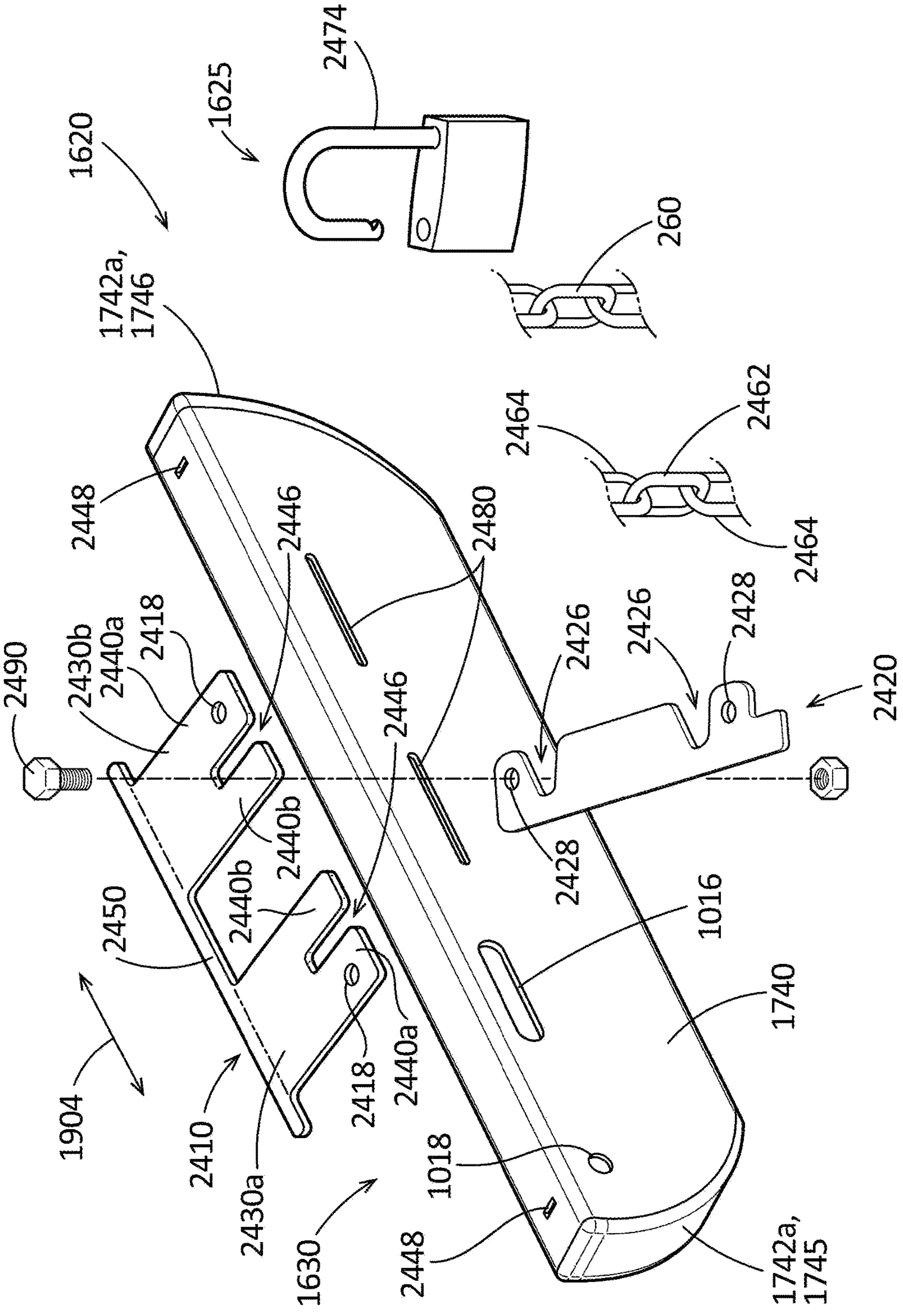
FIG. 24 is an exploded top side perspective view of the drive element lock or hatch lock or system lock of FIG. 16B.

FIG. 24 is an exploded top side perspective view of the system lock 1620 of FIG. 16B. Again, the system lock 1620 can comprise the bracket 1630 and the locking device 1625. The bracket 1630 can be similarly constructed as the brackets 410,420. The bracket 1630 can comprise the end caps 1742*a,b*, which can be received within a body 1740 of the bracket 1630 at a first end 1745 and a second end 1746, respectively. Each of or either of the end caps 1742*a,b* and, more specifically, a tab thereof can lockably engage an opening or locking hole 2418 defined in the body 1740 as, for example and without limitation, the end cap 1882 (shown in FIG. 18) can be engaged with a body 1880 (shown in FIG. 18) of the hand post 480. In some aspects, the opening 1018, which be a round hole, can receive at least a portion of the fastener 1719 (shown in FIG. 25); while the opening 1016, which be an elongated hole or slot, can receive at least another portion of the fastener 1719. The fastener 1719 can secure the bracket 1630 to the corresponding rail 61*a,b* (shown in FIG. 16B) of the ladder 60 (shown in FIG. 16B) to which the system lock 1620 is secured. With the opening 1016, like with the curved slot 1016 shown in FIG. 10, the system lock 1620 can be secured to ladder rails 61*a,b* of various widths 1360 (shown in FIG. 13) by mere adjustment of the spacing 1317 (shown in FIG. 13) and/or position of the fastener 1719 in the lateral direction 1904.

The system lock 1620 can comprise a first engagement portion 2410. The first engagement portion 2410 can comprise a first main tab 2430*a* and a second main tab 2430*b*. Each of the main tabs 2430*a,b* can comprise a pair of subtabs 2440*a,b* defining a slot 2446 therebetween. One or more of the subtabs 2440*a,b* can define a locking hole 2418. More specifically, as shown, a pair of the subtabs 2440*a* can define a locking hole 2418. Meanwhile, the main tabs 2430*a,b* can be joined by a connection portion 2450, which can also function as a stop and thereby prevent passage of the main tabs 2430*a,b* and, more generally, the first engagement portion 2410 completely through the bracket 1630. The first engagement portion 2410 can be sized to be received within and can extend partly through openings 2480 defined in the bracket 1630.

The system lock 1620 can comprise a second engagement portion 2420. The second engagement portion 2420 can define two slots 2426 and two locking holes 2428. A center-to-center spacing in the lateral direction 1904 between the slots 2426 of the second engagement portion 2420 can match a center-to-center spacing between the slots 2446 of the first engagement portion 2410. Similarly, a center-to-center spacing in the lateral direction 1904 between the locking holes 2428 of the second engagement portion 2420 can match a center-to-center spacing between the locking holes 2418 of the first engagement portion 2410. A width of each of the slots 2426,2446 in the lateral direction 1904 upon assembly of the system lock 1620 can be large enough to receive a first portion 2462 (e.g., a particular chain link) of the drive element 260 extending in direction perpendicular to the lateral direction 1904 but can also be small enough to block passage through the slots 2426,2446 of a second portion 2464 (e.g., a chain link that is adjacent to the aforementioned particular chain link defining the first portion 2462) of the drive element 260 that is angled with respect to the first portion 2462.

The system lock 1620 can comprise a fastener 2490, which can extend through and couple the second engagement portion 2420 to the first engagement portion 2410 at the matching locking holes 2418,2428 upon assembly. The locking device 1625 can comprise a body 2472 and a shackle 2474, which can selectably engage and disengage the body 2472 upon insertion of a key or entry of a proper combination. More specifically, the locking device 1625 can engage the matching locking holes 2418,2428 not already engaged by the fastener 2490, which can comprise any fastener comprising a shaft such as, for example and without limitation, a nut-and-bolt combination.

Figure 25:
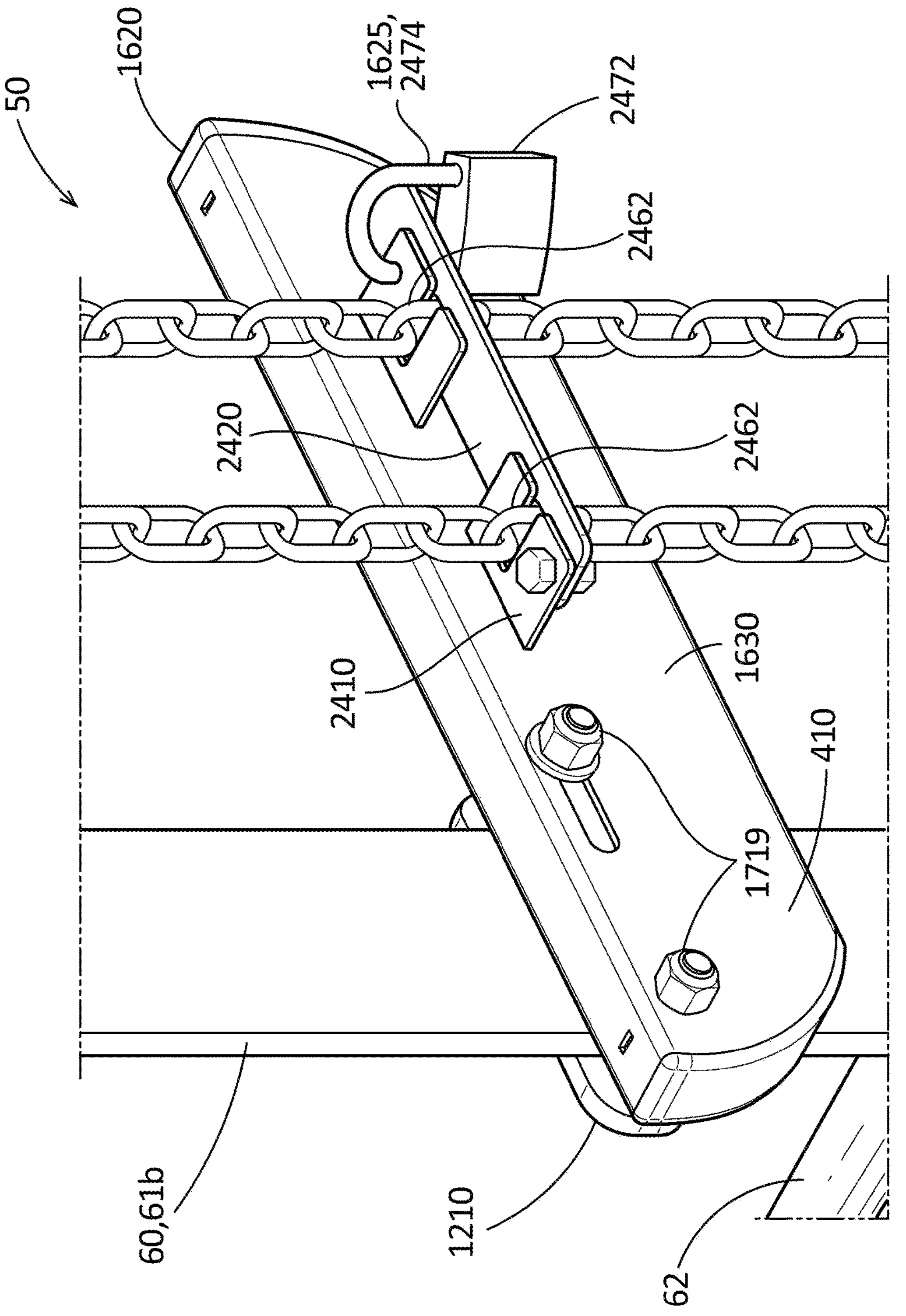
FIG. 25 is a top side perspective view of the system lock of FIG. 16B taken from detail 25 of FIG. 16B and, more generally, the system lock 1620 as incorporated into the hatch access system 50.

FIG. 25 is a top side perspective view of the system lock 1620 of FIG. 16B taken from detail 25 of FIG. 16B and, more generally, the system lock 1620 as incorporated into the hatch access system 50. The first portions 2462 of each of two vertical lengths of the drive element 260 have been lockably received within the slots 2446,2426 upon installation of the fastener 2490 and engagement of the locking device 1625. Movement of the drive element 260 or even removal of the drive element 260 such as would be necessary to open the hatch 70 and, more specifically, the hatch lid 74 can thus be prevented or discouraged.

Figure 26B:
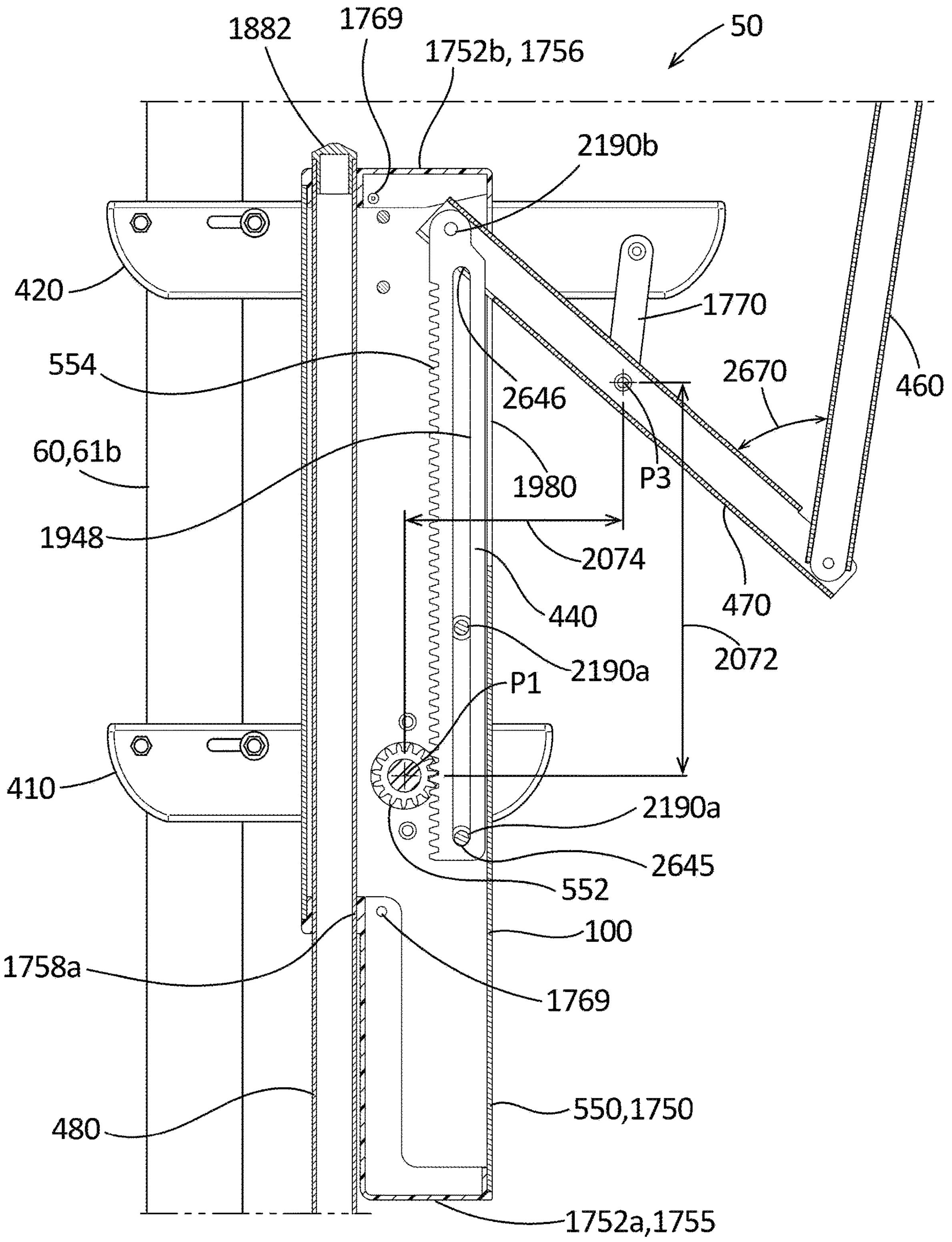
FIG. 26B is a detail side view of the hatch access system of FIG. 16B showing the hatch actuating device thereof in a first position and the hatch lid in a closed position.

FIGS. 26A and 26B are a side view of the hatch access system 50 of FIG. 16A and FIG. 16B, respectively, showing the hatch actuating device 100 thereof in a first position and the hatch lid in a closed position. As shown, the lower of the two guides 2190*a* can contact or can be positioned proximate to a first end or bottom end 2645 of the slot 1948, and an end of the linkage portion 470 secured to the sliding portion 440, e.g., with the fastener 2190*b*, can be at its closest distance to the top end 1756. Meanwhile, the sliding portion 440 itself and the top end 446 (shown in FIG. 21) thereof can be proximate to the top end 1756 of the body 1750 and, more generally, the housing 550.

As shown in FIG. 26B, the end caps 1752*a,b* can be formed from a polymer material. More specifically, the end caps 1752*a,b* can be molded and, again, can be secured to the body 1750 of the housing 550 with the fasteners 1769. Also, by incorporation of the hand post 480 into the housing 550, the support portion 430 (shown in FIG. 16A) and the fasteners 1739 (shown in FIG. 17A) can be eliminated, alignment of the hand post 480 with respect to the sliding portion 440 can be more easily ensured, and the hand post 480 can, as shown, slideably move through only the two openings defined in the end caps 1752*a,b* instead of traveling through a metal tab forming the support portion 430 across the entire length of the support portion 430. Some of the noise associated with operation of the hatch actuating device 100 due to metal-to-metal contact of parts can thus be reduced. As shown, the hand post 480 can extend just slightly above the top end 1756 of the housing 550 and need not interfere with any surrounding structure including the hatch 70 and, more specifically, the hatch lid 74 thereof.

In some aspects, as shown in FIG. 26B, a center of rotation of the linkage portion 470, e.g., the pivot axis P3, can be offset in both a vertical direction (e.g., by an offset distance 2072) and a horizontal direction (e.g., by an offset distance 2074) from a center of rotation of the portion of the gear assembly 450, e.g., the pivot axis P1. In some aspects, as shown in FIG. 15A, a center of rotation of the gear assembly 450, e.g., the pivot axis P1, can be offset in one or both of a vertical direction and a horizontal direction from a center of rotation of the hatch actuating device 100, e.g., the pivot axis P2, and vice versa.

Figure 27A:
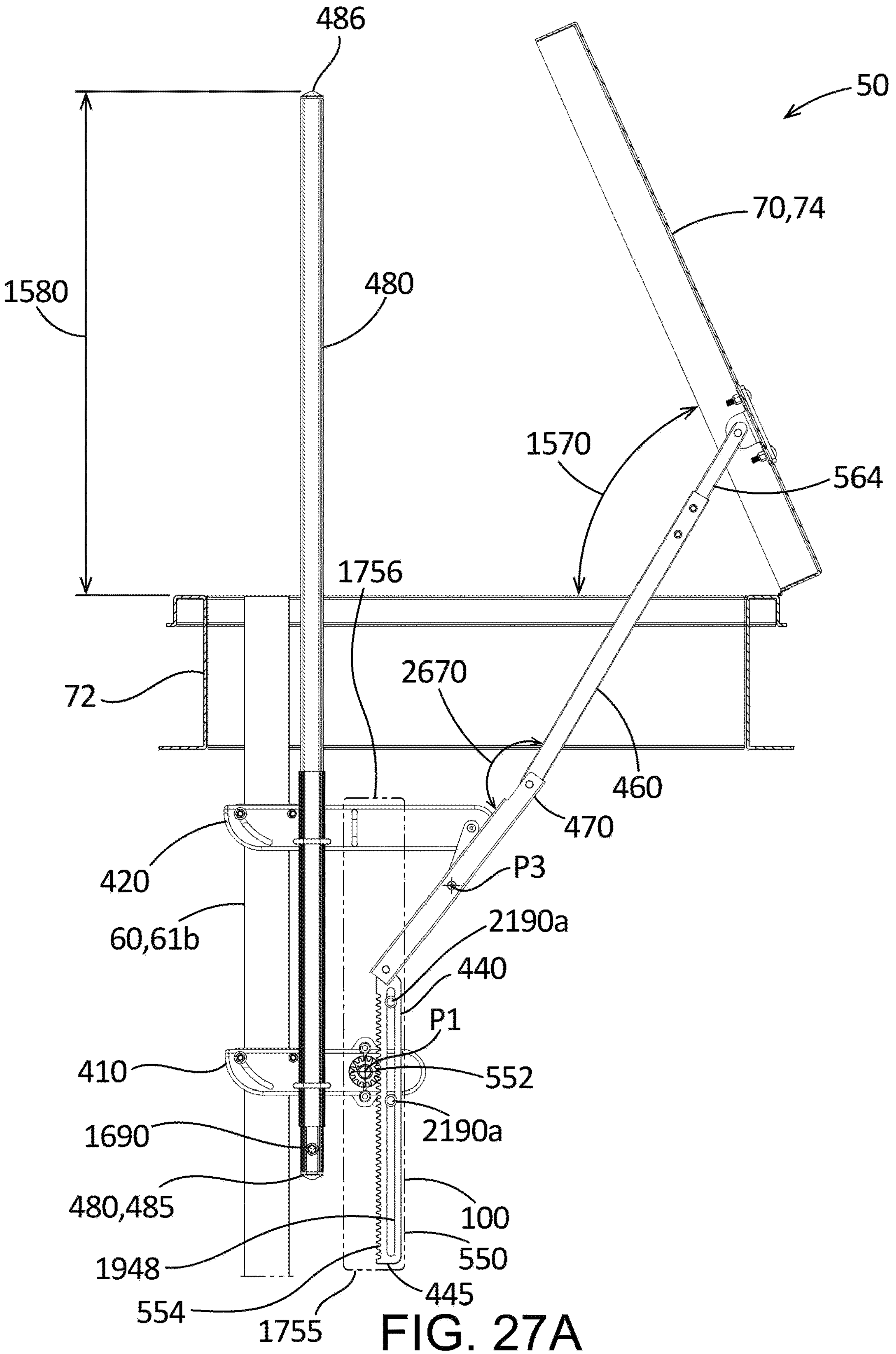
FIG. 27A a side view of the hatch access system of FIG. 16A showing the hatch actuating device thereof in a second position, the hatch lid in an open position, and the hand post in a raised position.

FIG. 27A a side view of the hatch access system 50 of FIG. 16A showing the hatch actuating device 100 thereof in a second position, the hatch lid 74 in an open position, and the hand post 480 in a raised position. As shown, the upper of the two guides 2190*a* can contact or can be positioned proximate to a second end or top end 2646 of the slot 1948, and an end of the linkage portion 470 secured to the sliding portion 440, e.g., with the fastener 2190*b*, can be at its greatest distance from the top end 1756. Meanwhile, the sliding portion 440 itself and the bottom end 445 thereof can be proximate to the bottom end 1755 of the body 1750 and, more generally, the housing 550. The top end 486 of the hand post 480, which can be secured to the drive element 260 (shown in FIG. 16A) with the connection 1690, can in an open position of the hatch lid 74 extend vertically past the hatch curb 72 by the extension distance 1580. Meanwhile, in an open position of the hatch lid 74 an open angle 1570 can measure at least 70 degrees. In the open position, shown, an angle 2670 measured between the stay portion 460 and the linkage portion 470 can measure less than or equal to 180 degrees. In the closed position (shown, in various aspects, in FIGS. 26A and 26B), the angle 2670 measured between the stay portion 460 and the linkage portion 470 can measure less than or equal to 90 degrees. The pivot axis P3 can be a dynamic pivot axis, meaning a vertical and/or horizontal position of the pivot axis P3 can move during operation such as when moving between the closed and open positions. The sliding portion 440 and, more generally, the gear assembly 450 and the housing 550, however, can remain stationary and need not rotate during operation.

Figure 27B:
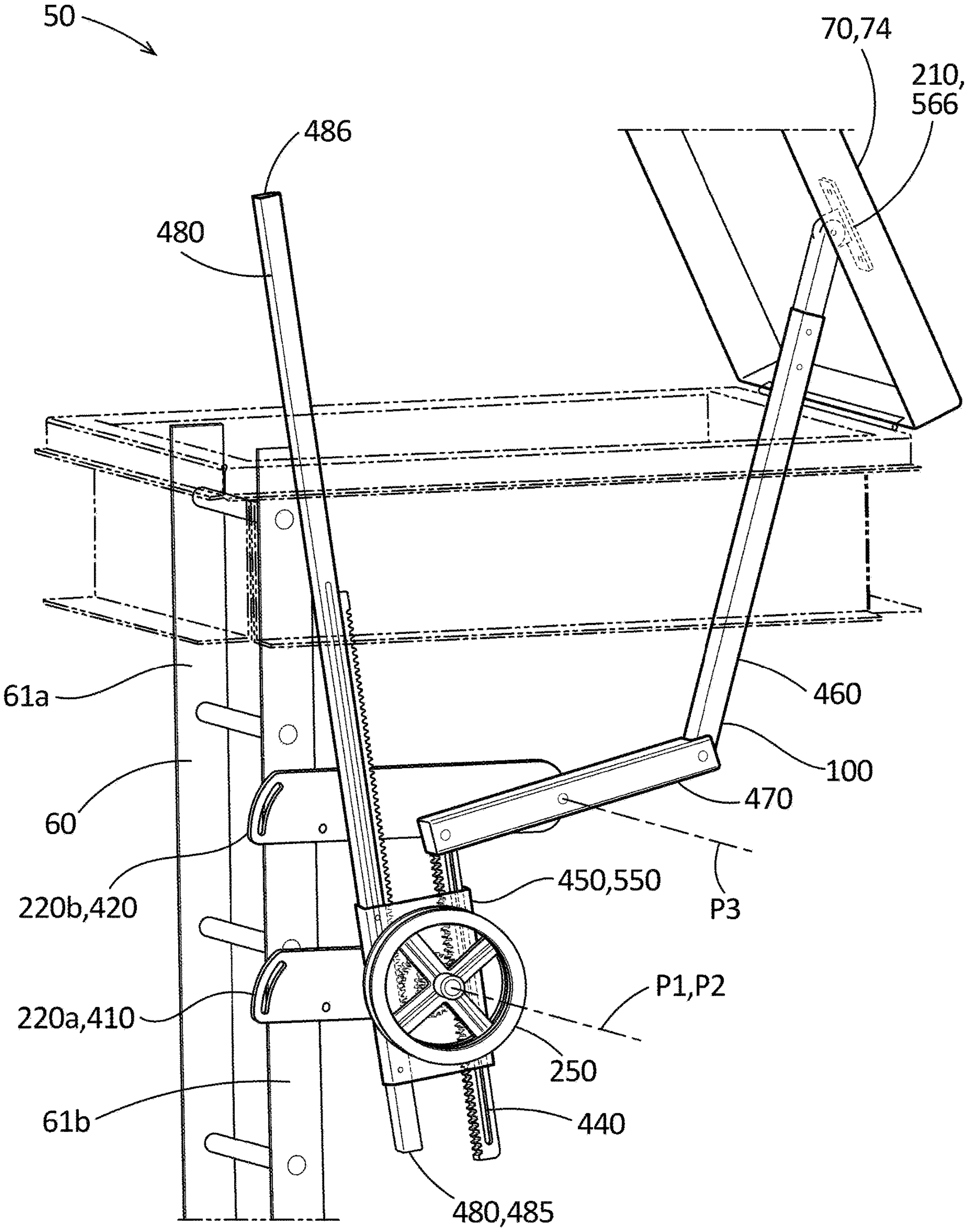
FIG. 27B a side view of the hatch access system of FIG. 16C showing the hatch actuating device thereof in a second position, the hatch lid in an open position, and the hand post in a raised position.

FIG. 27B a side view of the hatch access system 50 of FIG. 16C showing the hatch actuating device 100 thereof in a second position, the hatch lid 74 in an open position, and the hand post 480 in a raised position. As described above, rotation of the actuator 250 can cause sliding movement of the sliding portion 440 with respect to the gear assembly 450, which can cause rotational movement of the linkage portion 470, the stay portion 460, and ultimately the hatch lid 74. Again, in some aspects, the hand post 480 itself can be engaged to the gear assembly 450 and can be configured to also move with respect to the gear assembly 450 upon rotation of the actuator 250. More specifically, rotation of the third gear 1952 (shown in FIG. 19B) can cause linear movement of the fourth gear 1954 and thus movement of the hand post 480 secured to or comprising the fourth gear 1954.

Figure 28:
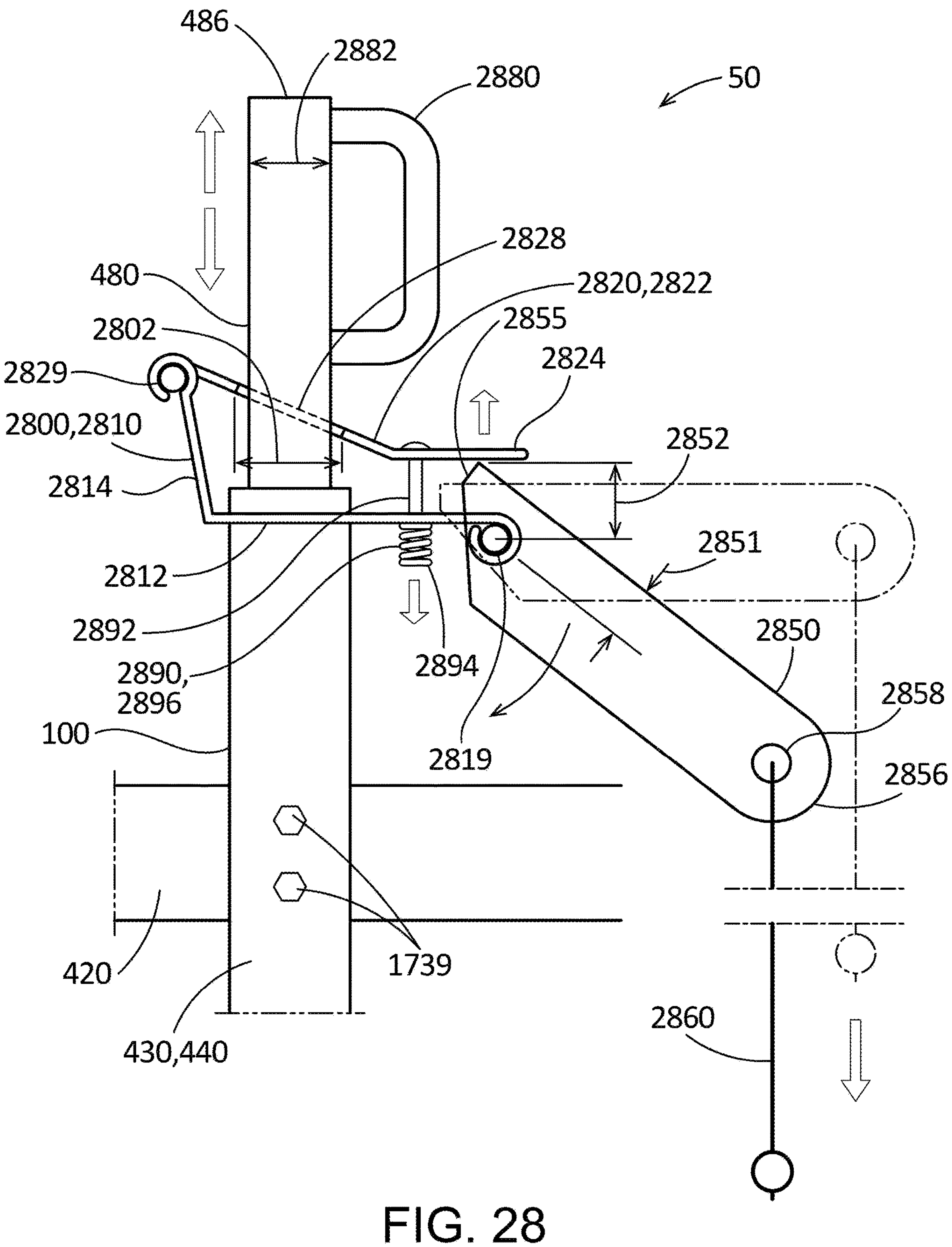
FIG. 28 is side view of a hatch access system comprising a hand post lock.

FIG. 28 is side view of a hatch access system 50, which can comprise a safety stop or hand post lock 2800. The hand post lock 2800 can comprise a first member 2810 and a second member 2820, which can be coupled to the first member 2810. The hand post lock 2800 can selectably engage the hand post 480 and, more specifically, can lock a vertical position of the hand post 480, including with respect to a surrounding structure such as, for example and without limitation, the support portion 430 or the sliding portion 440, depending on which portion 430,440 is utilized in the hatch actuating device 100.

The first member 2810 can comprise a first portion 2812, which can be oriented in a first or horizontal orientation. The first member 2810 can comprise a second portion 2814, which can be oriented in a second or sloped orientation. The second portion 2814 can be angled with respect to the first portion 2812. The first member 2810 and, more specifically, the second portion 2814 thereof can comprise a hinge connection, which can engage with a hinge connection of the second member 2820. The first member 2810 and, more specifically, the first portion 2812 thereof can define an opening (not shown) within which the support portion 430 or the sliding portion 440 can be received. The first portion 2812 of the first member 2810 can comprise a hinge connection, which can be coupled to a bar or lever 2850 as shown.

The second member 2820 can comprise a first portion 2822, which can be oriented in a first or sloped orientation. The second member 2820 can comprise a second portion 2824, which can be oriented in a second or horizontal orientation. The second portion 2824 can be angled with respect to the first portion 2822. The second member 2820 and, more specifically, the first portion 2824 thereof can comprise a hinge connection, which can engage with the hinge connection of the first member 2810. The second member 2820 and, more specifically, the first portion 2822 thereof can define an opening 2828 within which the hand post 480 can be received.

Each of the hinge connections of the respective member 2810,2820 can be formed by bending a portion of the member 2810,2820 into a shape in cross-section that is at least partially closed and configured to engage with the other of the hinge connections. In some aspects, a connecting element 2829 can be received within the hinge connections of each of the first member 2810 and the second member 2820 and can thereby couple the first member 2810 and the second member 2820 to each other. In some aspects, a connecting element 2819 can be received within the hinge connection of the first member 2810 and a hinge connection of the lever 2850 and can thereby couple the first member 2810 and the lever 2850 to each other.

The hand post lock 2800 can comprise a fastener 2890. More specifically, the first member 2810 and the second member 2820 can be coupled to each other with the fastener 2890. The fastener 2890 can extend through and engage each of the first member 2810 and the second member 2820. The fastener 2890 can comprise a first portion 2892 and a second portion 2894. In some aspects, the first portion 2892 can comprise a threaded shaft and the second portion 2894 can comprise a threaded nut. In some aspects, the first portion 2892 and the second portion 2894 need not define threads and can comprise, for example and without limitation, a clevis pin and a cotter pin. The fastener 2890 can comprise a biasing element 2896, which can bias the second member 2820 towards the first member 2810 and towards engagement of the opening 2828 of the second member 2820 with the hand post 480. More specifically, the biasing element 2896 can be positioned between the first member 2810 and the second portion 2894 of the fastener 2890. In some aspects, a washer (not shown) can be positioned between the biasing element 2896 and the first member 2810 and/or between the biasing element 2896 and the second portion 2894 of the fastener 2890.

In some aspects, the hand post lock can comprise the biasing element 2896 without the fastener 2890 and, for example and without limitation, ends of the biasing element 2896 can directly engage the first member 2810 and the second member 2820. In some aspects, the biasing element 2896 can comprise a spring such as, for example and without limitation, a compression spring. The biasing element 2896 thus can be configured to push the first member 2810 and the second member 2820 apart or bias the members 2810,2820 away from each other. In some aspects, the biasing element 2896 can be positioned between the first member 2810 and the second member 2820 and can comprise an elastic member such as, for example and without limitation, an elastic cord or a tension spring, which can be configured to pull the first member 2810 and the second member 2820 together or bias the members 2810,2820 towards each other. More generally, the biasing member 2896 can be configured to bias one of the first member 2810 and the second member 2820 towards engagement with the hand post 480.

The hand post lock 2800 can comprise the lever 2850. The lever 2850 can define a first end 2855 and a second end 2856. The lever 2850 can define an opening 2858 proximate to the second end 2856 and can define the hinge connection proximate to the first end 2855, which can comprise an opening for the connecting element 2819. An actuating element or pull element 2860 can be secured to the lever 2850 through, for example and without limitation, the second opening 2856 or any other attachment. A distance 2851 can be measured between a center of the hinge connection of the lever 2850 and a top edge of the lever 2850 when the lever 2850 is in a relaxed or disengaged position, which can be when the lever 2850 is in a horizontal position. A distance 2852 can be measured between the center of the hinge connection of the lever 2850 and a top edge or corner of the lever 2850 when the lever 2850 is in an active or engaged position, which can be when the lever 2850 is angled with respect to a horizontal position such as when the pull element 2860 is pulled by a user, thereby lowering the second end 2856 of the lever 2850. Conversely, when the pull element 2860 is released, the second end 2856 and, more generally, the lever 2850 can return to its original position under the force of the biasing element 2896.

When the distance 2851 is less than the distance 2852 as shown, the lever 2850 and, more specifically, the first end 2855 can function as a cam. More specifically, when the lever 2850 is in a disengaged position, the second member 2820 can be closer to the first member 2810. A horizontal distance 2802 between edges of the opening 2828 can equal a width 2882 of the hand post 480, and the force exerted by the biasing element 2896 of the fastener 2890 can cause binding of the second member 2820 about the hand post 480, which can lock or hold a position of the hand post 480. A texture or shape of an edge of the opening 2828 of the second member 2820 or of a surface of the hand post 480 can further facilitate a locking engagement of the second member 2820 with the hand post 480. When the lever 2850 is in an engaged position, the second member 2820 can move further away from the first member 2810 and thereby disengage from the hand post 480, which can permit the hand post 480 to drop back into one of the portions 430,440. In some aspects, a top end 486 of the hand post 480 can be plain and without any protruding features to facilitate grasping by a user. In some aspects, as shown, the hand post 480 can comprise a handle 2880, onto which the user can grasp during use to steady himself or herself. The handle 2880 can additionally ensure that the top end 486 of the hand post 480 does not drop too far into one of the portions 430,440.

Skipping back to earlier figures, FIG. 15A is a side view of the hatch access system 50 of FIG. 1 with the hatch actuating device 100 thereof in a first position and the hatch lid 74 in a closed position in accordance with another aspect of the current disclosure. A method of assembling the system 50 and, more specifically, the device 100 can comprise securing the first bracket 410 to a stationary structure below the hatch 70. The stationary structure can be proximate to the hatch 70. The stationary structure can be the ladder 60. The method can comprise securing the second bracket 420 to the stationary structure. The method can comprise securing the device 100 to the stationary structure. More specifically, securing the device 100 to the stationary structure can comprise securing the device 100 to the stationary structure via the first bracket 410, via the second bracket 420, or via the first bracket 410 and the second bracket 420. The method can comprise positioning the device 100 outside a passageway of a user of the ladder 60 and, more generally, the system 50. The method can comprise positioning the device 100 or portions thereof in an X-axis direction outside the rails 61*a,b* of the ladder 60 wherever the device 100 extends past the ladder in a Y-axis direction. This positioning can exclude consideration of the mounting of the first bracket 410 and the second bracket 420.

A method of assembling the device 100 can comprise securing a support portion 430 to the stationary structure. More specifically, the method can comprise hingedly securing and, more specifically, fastening, a support portion 430 to the stationary structure. The method can comprise coupling the sliding portion 440 to the support portion 430. More specifically, the method can comprise movably coupling and, more specifically, slideably coupling the sliding portion 440 to the support portion 430. The method can comprise positioning the gear assembly 450 between the support portion 430 and the sliding portion 440. More specifically, the gear assembly 450 can extend from the support portion 430 to the sliding portion 440. The gear assembly 450 can be configured to cause the sliding portion 440 to slide with respect to the support portion 430. The method can comprise coupling the stay portion 460 to the hatch lid 74. More specifically, the stay portion 460 can extend from the hatch lid 74. In some aspects, the method can comprise hingedly securing or fastening the stay portion 460 to the hatch lid 74. The method can comprise coupling the stay portion 460 to the sliding portion 440 with the linkage portion 470. The method can comprise hingedly securing or fastening the stay portion 460 to the sliding portion 440 with the linkage portion 470. More specifically, the method can comprise hingedly securing or fastening the linkage portion 470 to each of the stay portion 460 to the sliding portion 440. In some methods, as shown, the method can comprise hingedly securing or fastening the linkage portion 470 to the sliding portion 440 with the mounting bracket 576. The method can comprise coupling the hand post 480 to the sliding portion 440. More specifically, the method can comprise slideably coupling the hand post 480 to the sliding portion 440. The method can comprise joining multiple rectilinear members to form one or more of the support portion 430, the sliding portion 440, the stay portion 460, the linkage portion 470, and the hand post 480. In some aspects, more specifically, the method can comprise joining multiple rectilinear members by welding. In some aspects, the method can comprise otherwise joining the multiple rectilinear members.

The method of assembly can comprise adjusting the spacing 1317 between the fasteners 1719 and the spacing 1317 between the fasteners 1729 to match the width 1360 of the rail 60*a,b* of the ladder 60. The method can comprise creating a right-hand version of the device 100 (i.e., a device positioned on a right-hand side of the ladder 60) from a left-hand version shown by reversing and reassembling all non-symmetrical parts. The method can comprise assembly left-hand and right-hand versions of the device 100 using identical parts. The method can comprise assembling the device 100 to any of multiple hatch lids 74 of different sizes and shapes by, e.g., adjustment of the stay portion 460 and other portions of the device 100. The method can comprise rotating the device 100 90 degrees and positioning the device 100 between the ladder 60 and an end of the hatch 70. The method can comprise assembly the device 100 to the ladder 60 at any desired height on the ladder 60 and/or different ladder heights or ceiling heights. More specifically, the method can comprise simply loosening a bracket 410, 420 of the device 100 and moving the device vertically up or down. The method can comprise lengthening or shortening the drive element 260.

Figure 15B:
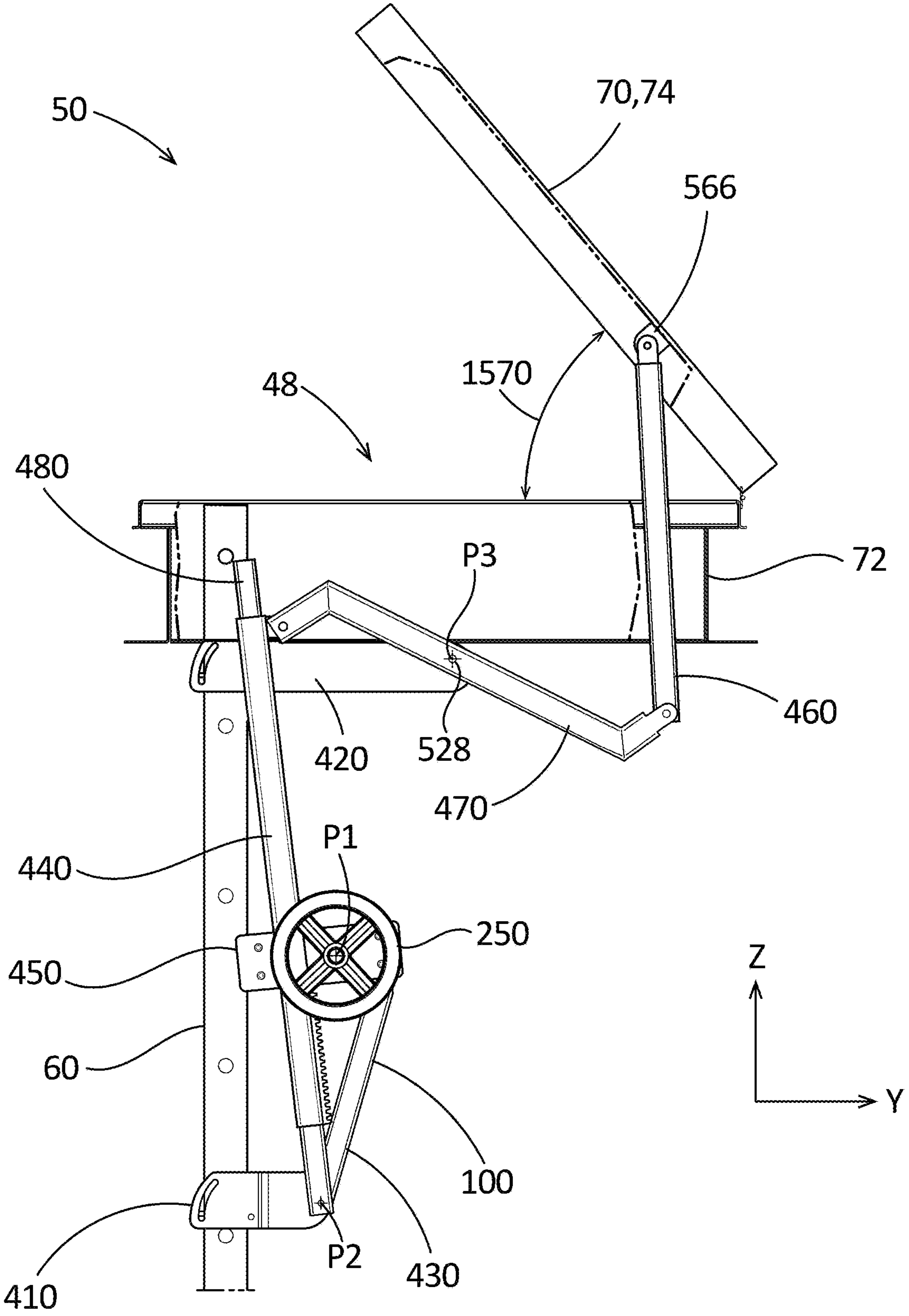
FIG. 15B is a side view of the hatch access system of FIG. 1 with the hatch actuating device thereof in a second position and the hatch lid in an open position.

FIG. 15B is a side view of the hatch access system 50 of FIG. 1 with the hatch actuating device 100 thereof in a second position and the hatch lid 74 in an open position. As noted above, the sliding portion 440 can rise and fall and the hatch lid 74 close and open with, respectively, clockwise and counterclockwise rotation of the first gear 552 and, more generally, operation of the gear assembly 450. A method of using the system 50 and, more specifically, the device 100 can comprise rotating the actuator 250 of the device 100. More specifically, the method can comprise opening the hatch lid 74 with the device 100. The method can comprise converting rotational motion of the actuator 250 into translational motion of the sliding portion 440. The method can comprise converting translational motion of the sliding portion 440 into rotational motion of the linkage portion 470. More specifically, the method can comprise converting translational motion of the sliding portion 440 into rotational motion of the linkage portion 470 with mechanical advantage and, more specifically, mechanical leverage. The method can comprise converting rotational motion of the linkage portion 470 into rotational motion of the hatch lid 74. The method can comprise allowing the device 100 and portions thereof to rotate about the pivot point P2 and, in some aspects, the pivot point P1. The method can comprise opening the hatch lid 74.

Mechanical leverage can comprise applying a force to a portion of the device 100 at a distance from a center of rotation of the part being rotated, e.g., in a Y-Z plane. For example and without limitation, through articulation of the device 100 the sliding portion 440 can apply a force to the linkage portion 470 at a lever distance from a center of rotation of the linkage portion 470. Similarly, through articulation of the device 100, the linkage portion can apply a force to the linkage portion 470 at a lever distance from a center of rotation of the linkage portion 470.

A method of using the system 50 and, more specifically, the device 100 can comprise closing the hatch lid 74 with the device 100. More specifically, the method can comprise reversing one or more of the steps involved in opening the hatch lid 74. The method can comprise driving or power the device 100 with a motor. The method can comprise driving the device via the drive element 260.

Figure 15C:
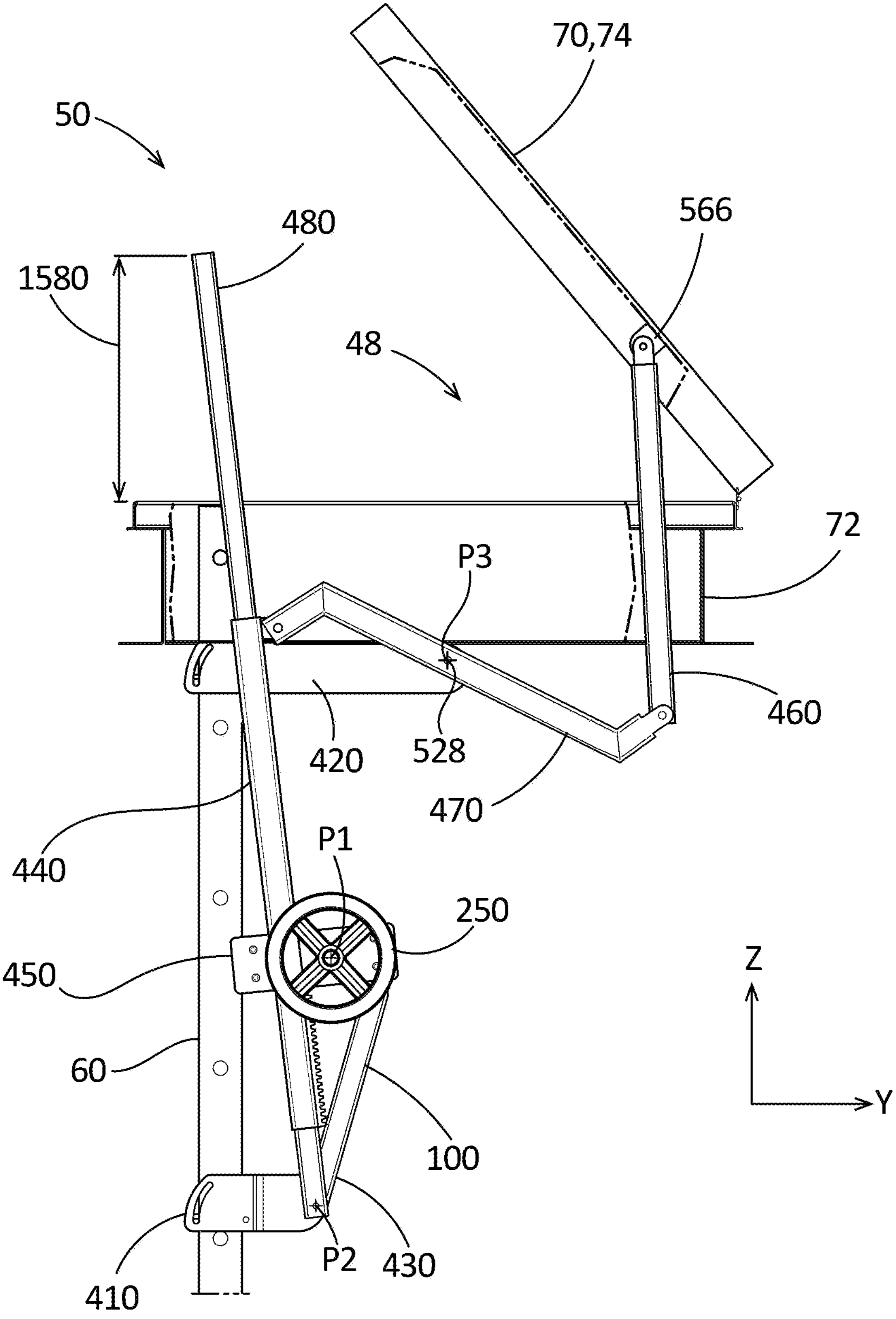
FIG. 15C is a side view of the hatch access system of FIG. 1 with the hatch actuating device thereof in a third position and the hatch lid in the open position.

FIG. 15C is a side view of the hatch access system 50 of FIG. 1 with the hatch actuating device 100 thereof in a third position and the hatch lid 74 in the open position. A method of using the device 100 and, more specifically, the hand post can comprise extending the hand post 480 from a retracted position shown in FIGS. 15A and 15B. More specifically, the method can comprise extending the hand post 480 to an extended position. For example and without limitation, the method can comprise extending the hand post 480 such that the second end 486 extends vertically past the hatch curb 72. In some aspects, the second end 486 can extend vertically past the hatch curb 72 by an extension distance 1580 of at least one foot. In some aspects, the extension distance 1580 can be at least two feet. In some aspects, the extension distanced 1580 can be at least 42 inches. The hand post 480 can be received within and can be grasped by a user or otherwise used to stabilize the user or ease passage of the user through the opening 48 (shown in FIG. 3) and the hatch 70 in either direction (i.e., into or out of the hatch 70). Thus the method can comprise a user holding onto the hand post 480 during passage through the opening 48 and/or into or out of the hatch 70. The method can comprise maintaining a position of the hand post 480 with respect to a surrounding portion of the device 100. In some aspects, the method can comprise maintaining a position of the hand post 480 with a fastener. In some aspects, the method can comprise maintaining a position of the hand post 480 with a friction fit between the hand post 480 and a mating part such as, for example, the sliding portion 440.

Referencing exemplary FIGS. 16A, 16B, and 26A-27A, a method of using the device 100 can comprise raising the hand post 480 by pulling the hand post 480 vertically upwards with the drive element 260. More specifically, pulling the hand post 480 vertically upwards can comprise raising a portion of the drive element 260 and, through the connection 1690 with the hand post 480 raising also the hand post 480. As such, raising the hand post 480 into position need not require "pushing" the hand post 480.

Referencing exemplary FIGS. 16C, 19B, and 27B, a method of using the device 100 can comprise engaging the gear assembly 450 the hand post 480. The method can comprise moving the hand post 480 with respect to the gear assembly 450 upon rotation of the actuator 250. Again, the actuator pivot axis P1 can be aligned and can be collinear with the device pivot axis P2, and the linkage portion pivot axis P3 can be offset with respect to the actuator pivot axis P1 and/or the device pivot axis P2 by offset distances in the horizontal and/or vertical direction.

The method can comprise driving the first gear 552 with the actuator 250 through the shaft 752. The method can comprise engaging and causing movement of the second gear 554 and, more generally, the sliding portion 440. The method can comprise engaging the third gear 1952 with the fourth gear 1954. The method can comprise causing translation (i.e., movement in a linear direction) of the hand post 480 upon rotation of the third gear 1952 about the actuator pivot axis P1. The method can comprise raising and lowering the hand post 480 with, respectively, clockwise and counterclockwise rotation of the third gear 1952. The method can comprise, with a single revolution or multiple revolutions of the actuator 250, causing greater movement of the hand post 480 than of the sliding portion 440.

Referencing exemplary FIGS. 24 and 25, a method of assembling the system lock 1620 can comprise securing the bracket 1630 to one of the rails 61*a,b* of the ladder 60. The method can comprise securing the system lock 1620 to one of the ladder rails 61*a,b* of the various widths 1360 by mere adjustment of the spacing 1317 and/or position of the fastener 1719 in the lateral direction 1904. The method can comprise extending the first engagement portion 2410 partly through the openings 2480 defined in the bracket 1630. The method can comprise preventing passage of the main tabs 2430*a,b* and, more generally, the first engagement portion 2410 completely through the bracket 1630 by joining the main tabs 2430*a*,2430*b* with the connection portion 2450.

A method of using the system lock 1620 and, more generally, the hatch actuating device 100 can comprise receiving a first portion 2462 (e.g., a particular chain link) of the drive element 260 into one or more slots 2446 defined in the first engagement portion 2410. The method of using the system lock 1620 and, more generally, the hatch actuating device 100 can comprise receiving the first portion 2462 (e.g., a particular chain link) of the drive element 260 into one or more slots 2426 defined in the second engagement portion 2420. The method can comprise receiving the first portion 2462 into both the slots 2426 and the slots 2446. The method can comprise engaging one or more locking holes with the locking device 1625. The method can comprise placing the locking device 1625 in a locked condition. The method can comprise lockably receiving the first portion 2462 within the slots 2446,2426 upon installation of the fastener 2490 and engagement of the locking device 1625.

Referencing exemplary FIG. 28, a method of assembling the hand post lock 2800 can comprise coupling the second member 2820 to the first members 2810. More specifically, the method can comprise coupling a hinge connection of each of the first member 2810 and the second member 2820 to each other.

A method of using the hand post lock 2800 can comprise biasing the second member 2820 towards the first member 2810 and towards engagement of the opening 2828 of the second member 2820 with the hand post 480. More specifically, the method can comprise so biasing the second member 2820 towards the first member 2810 by positioning the biasing element 2896 between the first member 2810 and the second portion 2894 of the fastener 2890. The method can comprise, when the lever 2850 is in an active or engaged position, the user pulling the pull element 2860 and thereby lowering the second end 2856 of the lever 2850. Conversely, the method can comprise when the pull element 2860 is released, the second end 2856 and, more generally, the lever 2850 returning to its original position under the force of the biasing element 2896. The method can comprise using the lever 2850 as a cam. More specifically, when the lever 2850 is in a disengaged position, the second member 2820 can be closer to the first member 2810. The method can comprise binding the second member 2820 about the hand post 480 when in a disengaged position of the hand post lock 2800, which can lock or hold a position of the hand post 480. More specifically, the method can comprise a texture or shape of an edge of the opening 2828 of the second member 2820 or of a surface of the hand post 480 facilitating locking engagement of the second member 2820 with the hand post 480. The method can comprise, when the lever 2850 is in an engaged position, the second member 2820 moving further away from the first member 2810 and thereby disengaging from the hand post 480, which can permit the hand post 480 to drop back into one of the portions 430,440. The method can comprise the user grasping the hand post 480 to steady himself or herself. More specifically, the method can comprise the user grasping the handle 2880 of the hand post 480.

In some aspects, various components of the device 100 and, more generally, the system 50 can be formed from or comprise a metal such as, for example and without limitation, steel or aluminum. In some aspects, the various components can be formed from any other material, any of which can optionally be corrosion-resistant or replaceable for serviceability. The various components of the device 100 can be formed from any one or more of a variety of manufacturing processes. For example and without limitation, the components 410,420, 430,440,460,470,480 and other components can be fabricated using subtractive manufacturing processes such as machining, cutting, forging, stamping; additive manufacturing processes such as three dimensional printing; and any other forming and assembly processes such as extruding, bending, and riveting.

In some aspects, the device 100 can be disassembled or knocked down into its subcomponents for shipping and/or storage. In some aspects, the device 100 as built can weigh 35 pounds or less. In some aspects, one or more components of the device 100 can be zinc-coated, anodized, or painted to facilitate corrosion resistance.

The device 100 can yield any one or more of various benefits. Operation of the device 100 need not depend on the strength and/or energy of the user. Again, in some aspects, the force for operation of the drive element 260 and/or the actuator 250 can be reduced by the use of mechanical leverage. In some aspects, the force for operation can be supplied by motorized assist. In some aspects, as shown, the device 100 need not interfere with passage of the user through the hatch 70. In some aspects, through the use of the hand post 480, the device 100 can stabilize a user upon ascent or descent or otherwise during their passage through the hatch 70. In some aspects, the device 100 can facilitate the opening of the hatch lid 74 to a larger open angle 1570.

In some aspects, the device can be universal in at least being able to be assembled to different ladders 60 defining different rail widths 1360 as disclosed herein. In some aspects, the device can be universal in at least being able to be assembled to either a left side or a right side of the ladder 60 by simply reversing and reassembling as needed any non-symmetrical parts. As such, left-hand and right-hand versions of the device 100 can be assembled from identical parts. In some aspects, the device can be universal in at least being able to be assembled to hatch lids 74 of different sizes and shapes by adjustment of the stay portion 460 and other portions of the device 100. In some aspects, the device 100 can even be rotated 90 degrees and positioned behind the ladder 60 and between the ladder 60 and an end of the hatch 70 when a hinge of the hatch lid 74 results in the hatch lid opening in a direction angled with respect to the open orientation disclosed herein (in which, for example, the hinge of the hatch lid 74 is positioned opposite from the ladder on opposite ends of the opening 48 of the hatch 70). In some aspects, the device can be universal in at least being able to be assembled at any desired height on the ladder and/or different ladder heights or ceiling heights, in which case the drive element 260 can be lengthened or shortened as desired.

One should note that conditional language, such as, among others, "can," "could," "might," or "may," unless expressly stated otherwise, or otherwise understood within the context as used, is generally intended to convey that certain aspects include, while other aspects do not include, certain features, elements, and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Many variations and modifications may be made to the above-described aspect(s) without departing substantially from the spirit and principles of the present disclosure. Further, the scope of the present disclosure is intended to cover any combinations and sub-combinations of all elements, features, and aspects discussed above. All such modifications and variations are intended to be included within the scope of the present disclosure, and all possible claims to individual aspects or combinations of elements or steps are intended to be supported by the present disclosure.

That which is claimed is:

1. A hatch actuating device comprising:

a support portion defining a device axis, the support portion configured to rotate about the device axis during operation of the hatch actuating device;

a sliding portion slideably coupled to the support portion;

a gear assembly fixably coupled to the support portion and movably coupled to the sliding portion;

a drive element; and a linkage portion rotatably coupled to the sliding portion, the linkage portion configured to be connected to a hatch lid of a hatch assembled to an elevated structure;

wherein:

the gear assembly is configured to open the hatch lid through a first rotation of a portion of the gear assembly with respect to the support portion; and the portion of the gear assembly is engaged with and driven by the drive element, the drive element being flexible.

2. The hatch actuating device of claim 1, wherein the portion of the gear assembly is an actuator, the actuator comprising a wheel, the wheel engaged with and driven by the drive element.

3. The hatch actuating device of claim 2, wherein the gear assembly comprises a housing and a gear coupled to the sliding portion and coupled to the actuator.

4. The hatch actuating device of claim 2, wherein the drive element comprises a length of chain.

5. The hatch actuating device of claim 1, wherein a center of rotation of the linkage portion is offset in both a vertical direction and a horizontal direction from a center of rotation of the portion of the gear assembly.

6. The hatch actuating device of claim 1, wherein the portion of the gear assembly is configured to rotate with respect to the support portion during operation.

7. A hatch actuating device comprising:

a housing;

a sliding portion received within the housing;

a gear assembly at least partially received within the housing and movably coupled to the sliding portion, the gear assembly comprising a gear and an actuator coupled to the gear, the gear received with the housing; and a drive element coupled to the gear assembly, the drive element being flexible;

wherein the gear assembly is configured to open a hatch lid of a hatch through rotation of the gear of the gear assembly by pulling of the drive element.

8. The hatch actuating device of claim 7, wherein a hand post is received within and moves with respect to the housing.

9. The hatch actuating device of claim 7, further comprising a linkage portion configured to be connected to a hatch lid of a hatch assembled to an elevated structure.

10. The hatch actuating device of claim 9, wherein a center of rotation of the linkage portion is offset in both a vertical direction and a horizontal direction from a center of rotation of the portion of the gear assembly.

11. The hatch actuating device of claim 9, wherein a center of rotation of the linkage portion moves with respect to the housing during operation of the device.

12. The hatch actuating device of claim 7, wherein the portion of the gear assembly is an actuator, the gear assembly further comprising:

a first gear coupled to the actuator; and a second gear coupled to the sliding portion and engaged with the first gear.

13. The hatch actuating device of claim 12, wherein the second gear is a rack gear extending in a direction parallel to the sliding portion along a length of the sliding portion.

14. The hatch actuating device of claim 12, wherein the actuator is driven by a drive element, the drive element comprising a length of chain.

15. A hatch actuating device comprising:

a sliding portion;

a hand post; and a gear assembly movably coupled to each of the sliding portion and the hand post, the gear assembly comprising:

a first gear coupled to an actuator of the hatch actuating device and configured to rotate with the actuator about a device axis;

a second gear movably coupled to the first gear, the second gear being a first rack gear secured to or defining a portion of the sliding portion;

a third gear; and a fourth gear movably coupled to the third gear, the fourth gear being a second rack gear secured to or defining a portion of the hand post;

wherein the gear assembly is configured to open a hatch lid of a hatch through a first rotation of a portion of the gear assembly with respect to a remaining portion of the gear assembly and a second rotation of the hatch actuating device with respect to a stationary structure, the hatch actuating device configured to be mounted to the stationary structure during operation of the hatch actuating device.

16. The hatch actuating device of claim 15, further comprising a linkage portion configured to be connected to a hatch lid of a hatch assembled to an elevated structure.

17. The hatch actuating device of claim 15, wherein a gear ratio between the first gear and the second gear is lower than a gear ratio between the third gear and the fourth gear.

18. A hatch access system comprising:

a ladder; and a hatch actuating device secured to one of the ladder and a stationary structure positioned proximate to the ladder, the hatch actuating device comprising:

a housing;

a sliding portion;

a gear assembly movably coupled to the sliding portion, the gear assembly comprising a gear and an actuator coupled to the gear, the gear received with the housing; and a drive element coupled to the gear assembly, the drive element being flexible;

wherein the gear assembly is configured to open a hatch lid of a hatch through rotation of the gear of the gear assembly by pulling of the drive element.

19. The hatch access system of claim 18, wherein the ladder is stationary with respect to a surrounding structure.

20. The hatch access system of claim 18, wherein the hatch actuating device is secured to the ladder, the sliding portion, the gear assembly, and the drive element are positioned with respect to a lateral direction of the ladder outside of a space occupied by the ladder.

21. The hatch access system of claim 18, further comprising a system lock, the system lock comprising:

a bracket;

a first engagement portion received at least partially within and extending through a width of the bracket; and a second engagement portion secured to the first engagement portion and configured to lockably receive a portion of the drive element therein, at least one of the first engagement portion and the second engagement portion defining a slot sized to receive the portion of the drive element but not allow continuous movement of the drive element past the system lock.

22. The hatch access system of claim 18, further comprising a hand post lock, the hand post lock comprising:

a first member fixably secured to a portion of the hatch actuating device;

a second member rotatably coupled the first member and defining an opening configured to receive a hand post of the hatch access system therethrough; and a biasing member configured to bias the second member towards engagement with the hand post.

23. The hatch actuating system of claim 18, further comprising a mounting bracket, the mounting bracket coupling the hatch actuating device to the ladder, a spacing in a horizontal direction of a pair of fasteners securing the mounting bracket to the ladder being adjustable.

24. A method of using a hatch actuating device, the method comprising:

rotating an actuator of the hatch actuating device with a flexible drive element;

converting rotational motion of the actuator into translational motion of a sliding portion of the hatch actuating device;

converting the translational motion of the sliding portion into rotational motion of a linkage portion of the hatch actuating device; and converting rotational motion of the linkage portion into rotational motion of a hatch lid of a hatch access system to thereby open the hatch lid.

25. The method of claim 24, further comprising raising a hand post of the hatch actuating device by raising a portion of the flexible drive element.

26. The method of claim 25, wherein the flexible drive element is coupled to the hand post with a fastener, the method comprising moving the flexible drive element and the hand post the same distance.

27. The method of claim 24, wherein:

rotating an actuator of the hatch actuating device comprises rotating a gear of a gear assembly of the hatch actuating device; and converting rotational motion of the actuator into translational motion of a sliding portion of the hatch actuating device comprises moving a rack gear of the sliding portion in a linear direction by rotating the gear of the gear assembly of the hatch actuating device.

28. The method of claim 24, wherein rotating the actuator of the hatch actuating device comprises rotating a gear of the hatch actuating device inside a housing of the hatch actuating device, the gear not extending from the housing.

29. A hatch actuating device comprising:

a support portion defining a device axis, the support portion configured to rotate about the device axis during operation of the hatch actuating device;

a sliding portion slideably coupled to the support portion;

a gear assembly fixably coupled to the support portion and movably coupled to the sliding portion; and a linkage portion rotatably coupled to the sliding portion, the linkage portion configured to be connected to a hatch lid of a hatch assembled to an elevated structure;

wherein the gear assembly is configured to open the hatch lid through a first rotation of a portion of the gear assembly with respect to the support portion and a second rotation of the support portion with respect to the elevated structure.

30. The hatch actuating device of claim 29, wherein at least a portion of the support portion is received within the sliding portion.

31. The hatch actuating device of claim 29, wherein the support portion comprises a plurality of members, at least two of the members joined to each other and angled with respect to each other.

32. The hatch actuating device of claim 29, wherein the sliding portion comprises a rack gear engaged with a spur gear of the gear assembly.

33. The hatch actuating device of claim 29, wherein the linkage portion can define a first bore proximate to a first end of the linkage portion, a second bore proximate to a second end of the linkage portion, and a third bore positioned between the first end and the second end, the linkage portion configured to pivot about a pivot point defined by the third bore.

34. The hatch actuating device of claim 33, wherein the pivot point does not move in either a horizontal or a vertical direction during operation of the hatch actuating device.

35. A hatch access system comprising:

a ladder; and a hatch actuating device secured to one of the ladder and a stationary structure positioned proximate to the ladder, the hatch actuating device comprising:

a housing;

a sliding portion;

a gear assembly movably coupled to the sliding portion; and a drive element coupled to the gear assembly, the drive element being flexible;

wherein the gear assembly is configured to open a hatch lid of a hatch through rotation of a portion of the gear assembly by pulling of the drive element; and a system lock comprising:

a bracket;

a first engagement portion received at least partially within and extending through a width of the bracket; and a second engagement portion secured to the first engagement portion and configured to lockably receive a portion of the drive element therein, at least one of the first engagement portion and the second engagement portion defining a slot sized to receive the portion of the drive element but not allow continuous movement of the drive element past the system lock.

36. A hatch access system comprising:

a ladder; and a hatch actuating device secured to one of the ladder and a stationary structure positioned proximate to the ladder, the hatch actuating device comprising:

a housing;

a sliding portion;

a gear assembly movably coupled to the sliding portion; and a drive element coupled to the gear assembly, the drive element being flexible;

wherein the gear assembly is configured to open a hatch lid of a hatch through rotation of a portion of the gear assembly by pulling of the drive element; and a hand post lock comprising:

a first member fixably secured to a portion of the hatch actuating device;

a second member rotatably coupled the first member and defining an opening configured to receive a hand post of the hatch access system therethrough; and a biasing member configured to bias the second member towards engagement with the hand post.

* * * * *